(12) United States Patent
Fanberg

(10) Patent No.: US 6,236,993 B1
(45) Date of Patent: May 22, 2001

(54) COMPUTER FILE COMPARISON METHOD

(76) Inventor: Victor V. Fanberg, 3192 Ebonywood Ct., Dublin, OH (US) 43017

( * ) Notice: Subject to any disclaimer, the term of this patent is extended or adjusted under 35 U.S.C. 154(b) by 0 days.

(21) Appl. No.: 09/103,748

(22) Filed: Jun. 24, 1998

(51) Int. Cl.$^7$ ....................................................... G06F 17/30
(52) U.S. Cl. ............................ 707/6; 707/1; 707/3; 707/4
(58) Field of Search ................................... 707/3, 200, 6, 707/1, 4

(56) References Cited

U.S. PATENT DOCUMENTS

| | | | |
|---|---|---|---|
| 3,633,179 | 1/1972 | Reynolds | 707/1 |
| 5,212,697 | 5/1993 | Morita | 714/820 |
| 5,574,907 | 11/1996 | Jernigan, IV et al. | 707/1 |
| 5,577,248 | 11/1996 | Chambers, IV | 707/1 |
| 5,617,564 | 4/1997 | Tomotake | 707/200 |
| 5,630,138 | 5/1997 | Raman | 717/11 |
| 5,659,730 * | 8/1997 | Kelley et al. | 707/3 |
| 5,794,254 * | 8/1998 | McClain | 707/204 |
| 5,806,073 * | 9/1998 | Piaton | 707/200 |

OTHER PUBLICATIONS

*Computfuz*, "http://world.std.com/~jdveale/Index.html (updated)", by James Veale, No date.
Using Data Commander for Y2K Report Output Testing, Jan. 1997, by Blackstone & Cullen, Inc.

* cited by examiner

*Primary Examiner*—Jack Choules
*Assistant Examiner*—Cheryl Lewis
(74) *Attorney, Agent, or Firm*—Brown, Martin, Haller & McClain

(57) ABSTRACT

A computer-implemented method and computer program product for comparing two data files to find matching data. The comparisons can be between dates, monetary units, or any other quantities. Comparisons are handled between files which differ by any predetermined function such as additive or multiplicative without using file wide delimiters, field boundary or field format information. An example of such a comparison are the additive differences resulting from aging files in a Year 2000 compliance testing method. The method can thus be used to test whether an effort to remediate a Year 2000 problem in a computer program was successful. Another example of such comparisons are the differences resulting from conversion between the monetary units of two countries or regions. The method can thus also be used to verify currency conversions. Data items are read from a first file and a second file and sequentially compared and, if a mismatch exists, it is determined whether the mismatch could be attributable to a difference in format, quantity, or both. An expected difference between two files may be input by a user of the program or may be automatically computed during operation.

61 Claims, 34 Drawing Sheets

```
              638
      WQEJKLWE   QW  JWQ  JJW   WQEQ      636   FIG. 12
      TEW EWQA 125.50QWQW WQW R           640
      FKHJK  LKJ240.0 MJH  NN  MLKF
644 — GNMBB  J  300.00JKH  DSAELLG
      HJK H  JH GH J7U I  UHKKKJK
              643  642
```

```
              640  638        646
      WQEJKLWE \  QW/ JWQ JJW / WQEQ            FIG. 13
      TEW EWQA 125.50  62.75QWQW WQW R   648
      FKHJK  LKJ240.0  120.0 MJH  NN  MLKF
644 — GNMBB  J  300.00 150.00JKH  DSAELLG
                                              652
      HJK H  JH GH J7U I  UHKKKJK
             643  642  650
```

```
                 638
      WQEJKLWE \  QW  JWQ  JJW   WQEQ
      TEW EWQA 125.50QWQW  WQW  R        640       FIG. 14
646 —             62.75                  654
      FKHJK  LKJ240.0 MJH  NN  MLKF      642
648 —             120.0
644 — GNMBB  J  300.00JKH  DSAELLG
                  150.00                 650
      HJK H  JH GH J7U I  UHKKKJK
              643
```

```
           648  646       638
      WQEJKLWE \  QW/ JWQ JJW/  WQEQ         FIG. 15
      TEW EWQA \ 62.75 125.50QWQW WQW R   640
      FKHJK  LKJ120.0  240.0MJH  NN  MLKF
644 — GNMBB  J  150.00 300.00JKH  DSAELLG
                                              656
      HJK H  JH GH J7U I  UHKKKJK
              643  650  642
```

FIG. 16

```
WQEJKLWE  QW JWQ JJW  WQEQ
TEW EWQA  62.75 QWQW WQW R
          125.50
FKHJK LKJ 120.0 MJH NN MLKF
          240.0
GNMBB J 7 150.00 JKH DSAELLG
          300.00
HJK H  JH GH  J7U I UHKKKJK
```

FIG. 17

```
WQEJKLWE  QW JWQ JJW  WQEQ
          62.75
TEW EWQA  125.50 QWQW WQW R
          120.0
FKHJK LKJ 240.0 MJH NN MLKF
          150.0
GNMBB J 7 300.00 JKH DSAELLG
HJK H  JH GH  J7U I UHKKKJK
```

FIG. 18

```
WQEJKLWE  QW JWQ JJW  WQEQ
          125.50
TEW EWQA  62.75 QWQW WQW R
          240.0
FKHJK LKJ 120.0 MJH NN MLKF
          300.00
GNMBB J 7 150.00 JKH DSAELLG
HJK H  JH GH  J7U I UHKKKJK
```

COMPUTER FILE COMPARISON METHOD

A Microfiche Appendix consisting of 2 microfiche, 119 frames, is included in this disclosure. A portion of this disclosure contains material that is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

BACKGROUND OF THE INVENTION

1. Field of the Invention

The present invention relates to comparison of two computer files to determine differences between quantities in each file, particularly differences in dates, monetary currency conversion amounts, length measurement conversion amounts and similar quantities, and also relates to the so-called Year-2000 problem of determining whether a computer program is functionally operable both before and after Jan. 1, 2000.

2. Description of the Related Art

The predominant practice in computer programming has been to omit the leading digits from the year in a representation of a date. In the early 1960s, computer programs were typically written with one digit years in the date. Shortly before the turn of the decade, problems similar to the current year 2000 computer problems began. One digit years did not handle the turn of the decade, as two digit years do not automatically handle the turn of the century. Thus, by the end of the 1960s, dates were commonly represented by six digits; two digits representing the month, two digits representing the day, and two digits representing the year. This practice has minimized memory requirements for storing a date, and all dates manipulated by computer programs of that era could be expected to be within the 20th century. This practice was continued with each succeeding generation of computer to ensure compatibility between generations. Indeed, by 1970 a standard promulgated by the United States Department of Commerce required that federal agencies ensure their computer programs used a six-digit date representation to avoid a repeat of the problems caused by the one digit year and the turn of the decade to 1970. The practice of omitting the first two digits (century digits) from the year in a representation of a date thus became enshrined in mainframe computer programs, and spread from government computing to general business computing.

With the advent of the year 2000, it is becoming necessary for computers to manipulate and distinguish dates in both the 20th and 21st centuries. A common computing task requires computing the difference between two dates to determine, for example, the amount of interest due on a loan, a person's age or retirement benefits, or similar information. A computer program that computes the difference in years by simply subtracting one two-digit representation of the year from another, instead of arriving at a difference of, for example, one year, the computer may arrive at a difference of 99 years. As a result, a computer could, for example, issue an erroneous bill to a borrower for 99 years of interest on a loan. This problem has become known as the "Year 2000 Problem," sometimes abbreviated as "Y2K" problem. Date representations other than those that use two digits to represent the year, two digits to represent the month and two digits to represent the day are, of course, known, such as a representation that represents a month by its name rather than its corresponding number and the Lilian and neo-Julian representations that are actually quite common in mainframe computer software, all but the Lilian date representation suffer from the Year 2000 problem as well.

Programmers and other practitioners in the art have proposed various methods for solving or minimizing the impact of the Year 2000 problem and have focused on various aspects of the problem. Some have focused on rewriting the operating system of a computer to adjust the manner in which operating system represents the date. Others have focused on rewriting application programs to adjust the manner in which they represent dates. Most such remediation efforts involve either changing the date representations from a two-digit format to a four-digit format or the programs to react to the date as if it had a four-digit year. The latter is termed "four-digit date logic".

Another area upon which programmers and other practitioners in the art have focused attention involves determining whether application program remediation efforts have been successful. It is important to determine whether a program that performed certain functions or algorithms and represented dates using a two-digit format performs the same functions or algorithms in exactly the same way after it has been rewritten to represent dates using a four-digit date logic. In other words, it is important to ensure that remediation not only fixes the Year 2000 problem but preserves the functionality of the original program.

The concept of aging a file is central to many of the proposed methods for determining whether Year 2000 application program remediation efforts have been successful. The files at issue are data files containing dates that the computer program processes. In the most general sense, an application program of the type with which Year 2000 remediation efforts are concerned reads input data, including dates, from an input data file, processes the input data, and writes output data, including dates, to an output data or report file. Aging a file is a well-known concept, and software tools or programs have been developed to age files by a number of days specified by a user. A file aging program reads a data file, locates every date in the file, adds the specified number of days or years to each date, and copies the results to an output file. The output or aged data file is thus identical to the input or original data file but for the dates.

A two phase method can be used to determine whether an application program is Year 2000 compliant. The first phase tests whether the remediated program preserves the functionality of the original program for dates within the 20th century. The second phase tests whether the remediated program is Year 2000 compliant, i.e., whether it preserves functionality for dates in the 21st century.

In the first phase of the method, the user executes the original unremediated program by providing it with an input data file having dates within the 20th century. Execution of the program produces an output file. The user then executes the remediated program by providing it with the same input data file, possibly with dates reformatted with four-digit years. Execution of the program produces another output file. The user then compares the output file resulting from execution of the original program with the output file resulting from execution of the remediated program. If the two output files are identical (except for the expected differences in the date fields), the user can infer that the remediated program preserves the functionality of the original program for dates within the 20th century. The expected differences will be limited to dates which have been reformatted, such as changing two digit years to four digit years or changing the ordering of the year, month and day fields.

In the second phase of the method, the user executes the remediated program by providing it with an input data file having dates within the 20th century. Execution of the program produces an output data file. The user then sets the system date of the computer to a date in the 21st century. The user then ages the same input data file by a number of days necessary to set the aged dates to the new system date. With the new system date, the user executes the remediated program by providing it with the aged input data file. Execution of the program produces another output data file. The user then compares the output data files. If the files are identical, except for expected differences in the date fields, the user can infer that the remediated program preserves the functionality of the original program for dates within the 21st century for the range of program functions tested by the input data.

Comparison of the output files in the above-described methods may be performed manually by a user or automatically by a comparison tool or program. Automatic file comparison software tools are well-known, but most only identify mismatches between two files. At least one such tool is known that matches quantities that are equal but expressed in different formats in each file, such as the quantity "125" (a decimal number) and the quantity "1.25E02", which is the same quantity expressed in scientific notation. That same tool can compare any other relationship which can be expressed by a single instance of the relationship $y=mx+b$, where m is the slope of a line and b is its intercept, so would be capable of converting Centigrade to Fahrenheit, but does not compare dates. That same tool also allows specifying a range of deviation from the line expressed as an exact relative or exact absolute range. Exact relative ranges are pre-specified percentages of the answer to $y=mx+b$. Exact absolute ranges are pre-specified values above and below the answer to $y=mx+b$. Although file comparison software tools that identify the difference between two dates have been used in working on the Year 2000 problem, they require that the user identify the location of the dates within the files, the format of each individual dates and how to identify one record type from another in the same file.

Until the present invention, all prior file comparison utilities have required certainty. No tool has dealt with uncertainty of exactly how to interpret the data when there was more than one possible interpretation of the data. If there are no explicit delimiter characters around a field where a mismatch occurs, tools have been unable to compare them unless the user specifies exactly the bounds of the field. If the data could be of multiple formats with no deterministic characteristics within the data to identify the format (such as the "1.25E02" specifying scientific notation format), prior tools required the user to explicitly identify the single format and relationship by which all data is to be interpreted. Comparison of dates is a good example of data with multiple formats. Typical dates could be Julian, Gregorian or Lilian, just to name a few types, and the same character string could represent a date in several of those formats. Even if the dates are all of the same general format type, it may be impossible to offer a definitive interpretation of a date without more information. For example, given the string "01/02/03", the date could be Jan. 2, 1903, Jan. 2, 2003, Feb. 3, 1901, Feb. 3, 2001, Feb. 1, 1903, or Feb. 1, 2003 at a minimum. Prior date comparison tools could not handle such a date without specifying the explicit format of the date. Tools that compare dates further require the user to explicitly identify how to distinguish one record format from another. This is required in at least legacy computer system storage of data and for date comparison of printouts.

It would be desirable to provide an automatic file comparison software tool and Year 2000 compliance testing method that overcomes these problems and deficiencies. The present invention does so in the manner described below.

SUMMARY OF THE INVENTION

The present invention relates to a computer-implemented method and computer program product for comparing two data files to find matching data. The definition of matching is used in a broad sense. Data may match if two data items differ from each other by an expected amount. Data may match if they are two different formats for expressing that same value. Data can be dates, monetary units, units of measurement, or any other quantity. Matching data can be related by an additive operation, in which two quantities differ by their additive difference, a multiplicative operation in which two quantities differ by a multiplicative factor, or any other suitable operation or combination of operations. Matching data can thus include, for example, the additive differences resulting from aging files in a Year 2000 compliance testing method. Matching data between can also include, for example, differences resulting from conversion between the monetary units of two countries or regions. The differences could be, for example, a combination of additive and multiplicative differences such as results from conversion between Centigrade and Fahrenheit.

In accordance with the invention, data items are read from a first file and a second file and compared. If a mismatch exists, it is determined whether the mismatch could be attributable to a difference in format, quantity, field alignment or both. An expected difference in quantity may be predetermined, i.e., manually input by a user of the program, or may be automatically computed during operation.

The data items are read from first and second data files in a predetermined sequence. The data items can be bytes, but the term as used herein includes other suitable units of data, such as words or fields. The sequence can be a byte-by-byte sequence through each file or can be any other predetermined sequence. The file comparison step of comparing bytes or other data items includes directly comparing them to one another and, alternatively, comparing information computed in response to them. For example, a suitable comparison algorithm can include calculating a cyclic redundancy code (CRC) on a group of bytes, and comparing the CRC's to determine if strings match. The data items read from the first file are checked for equivalence to the data items read from the second data file to determine if a mismatch exists. If a mismatch exists, i.e., a data item read from a location in the first file does not compare exactly to a data item read from a location in the second file, a group of one or more data items in at least one of the files is parsed into a list of two or more tokens. For example, if a mismatch was detected at column y in a file and the tokens are four characters long and there is only one format, four potential tokens may be generated beginning in column y−3, y−2, y−1, and y, each four bytes long. Many of these potential tokens may be found invalid when the specified format is applied, and the invalid ones are discarded; the ones which match the format will become tokens for the rest of the process. These data items can be located in corresponding locations in each file, e.g., at the nth byte of each file, or in some other predetermined relation to the location of mismatch. For example, if a mismatch was detected at line x, column y of the first file, a group of bytes beginning at line x, byte y of the first file can be parsed into a token, and a group of bytes beginning at line x+1, byte y of the second file can be parsed into another token. Sometimes a difference between two files may be caused by data being converted and repeated in one of the files. For example, if a computer program has been created that works in inch measurements and is being converted to work in centimeters, one might store both units in a new version of a file to avoid the overhead of calculating differences when needed. The comparison of the file with only inches and the file with both inch and centimeter measurements is one that may be automated if the converted and repeated field occur in some predetermined relationship to each other.

Each token represents a quantity, such as a date, monetary amount or other suitable quantity. Thus, the term "token," which is conventionally used in the art to mean an indivisible lexical unit, is used herein in a broader sense. A group comparison is performed between a quantity corresponding to the group of data items parsed and another quantity corresponding to another group of data items. This other group of data items can be in the same file or in the other file. They can be located at the location at which the mismatch was detected or, alternatively, at a location in predetermined relation to the location of mismatch. As described below, the quantities can be compared by comparing the tokens that represent them or in any other suitable manner.

In embodiments of the invention in which data items are parsed from each file at or in predetermined relation to the location at which the mismatch was detected, the group comparison can be performed by comparing tokens in a first list produced by parsing data items in the first file to tokens in a second list produced by parsing data items in the second file. In such embodiments, the result of the comparison can be the difference between the two quantities. In embodiments in which data items are parsed from only a first one of the files, a similar difference is pre-determined, i.e., provided by the program user. In such embodiments, an expected quantity and a corresponding expected group of data items can be determined in response to this expected or pre-determined difference, and the result of the comparison can be an indication of whether the second file includes the expected group of data items at or in predetermined relation to the location at which the mismatch was detected.

Stated another way, the group comparison involves checking the tokens to see if they fit a pre-defined secondary relationship. An exemplary embodiment of the invention includes two methods of checking for a secondary relationship. The first method is by calculating a difference between the tokens collected from the first file and those collected from the second file. The difference between the quantity represented by the token parsed from the first file and the quantity represented by the token parsed from the second file is then determined. As stated above, this difference can be additive, as in the case of the difference between two dates, multiplicative, as in the case of the difference between a monetary amount expressed in two different currency units, a combination, as in the case of the difference between different temperature measurements, or any other suitable difference. The second method is by using each token from the first file with the difference between the tokens, calculating what the expected data equivalent is for the second file and checking to see if that data equivalent is present in the second file.

The invention can, in certain embodiments, determine the difference between two tokens even if each token has a different format. For example, one token may represent a date in a format such as Jan. 5, 1998, and the other token may represent a date in a format such as 5 Jan. 1998. This is a rules based system. The rules may be as basic as specifying dates fall in fixed formats MM/DD/YY, DD/MM/YY and YY/DD/MM or may be as complicated as the rules for calculating leap years to verify the number of days in February or there may be any number of spaces between the month and year as long as there is at least a single separator between the day and month. The rules are dependent upon the characteristics of the files being compared and the reason for the comparison. Using the simplest rules, i.e. fixed formats for dates, the data items relating to the location of mismatch may parse into different dates depending upon the date format selected and the group of data items selected. In other words, the invention parses data items relating to a location of mismatch into a token in accordance with each format of a predetermined set of such formats. The differences between pairs or unique combinations of such tokens are determined. In certain embodiments of the invention, in which the expected difference is predetermined, possible differences are computed in this manner until one of them matches the predetermined expected difference. In other embodiments of the invention, it may be desirable to present the list of possible differences to the user. In still others, it may be desirable to automatically narrow the possibilities before presenting a (narrowed) list to the user. For example, in a Year 2000 compliance testing method, the user may know the amount by which the dates in the first file are expected to differ from the dates in the second file. Thus, all possibilities that do not differ by the predetermined expected amount can be eliminated. The invention can further include such methods for eliminating some of these differences as possibilities, based on a user's prior knowledge of the expected difference, based on the frequency of occurrence of a certain difference, or based on other suitable factors.

The foregoing, together with other features and advantages of the present invention, will become more apparent when referring to the following specification, claims, accompanying drawings and microfiche appendix.

BRIEF DESCRIPTION OF THE DRAWINGS

For a more complete understanding of the present invention, reference is now made to the following detailed description of the embodiments illustrated in the accompanying drawings, wherein:

FIG. 12 illustrates a file having monetary amounts embedded in text;

FIG. 13 illustrates a file having monetary amounts embedded in text, with an amount represented in one currency following and on the same line of the file as the same amount represented in another currency, the first amount being the same as appears in FIG. 12;

FIG. 14 illustrates a file having monetary amounts embedded in text, with an amount represented in one currency on the next line of the file after the same amount represented in another currency, the first line being the same as appears in FIG. 12;

FIG. 15 illustrates a file having monetary amounts embedded in text, with an amount represented in one currency preceding and on the same line of the file as the same amount represented in another currency, the second amount being the same as appears in FIG. 12;

FIG. 16 illustrates a file having monetary amounts embedded in text, with an amount represented in one currency on the next line of the file after the same amount represented in another currency, the currency value in the second line being the same currency value as appears in FIG. 12, the non-currency characters matching the non-currency characters of FIG. 12 but appearing on the first line;

FIG. 17 illustrates a file having monetary amounts embedded in text, with an amount represented in one currency on the preceding line of the file before the same amount represented in another currency, the second line being the same as appears in FIG. 12;

FIG. 18 illustrates a file having monetary amounts embedded in text, with an amount represented in one currency on the preceding line of the file before the same amount represented in another currency, the currency value in the first line being the same currency value as appears in FIG. 12, the non-currency characters matching the non-currency characters of FIG. 12 but appearing on the second line;

DESCRIPTION OF PREFERRED EMBODIMENTS

Figure 1:
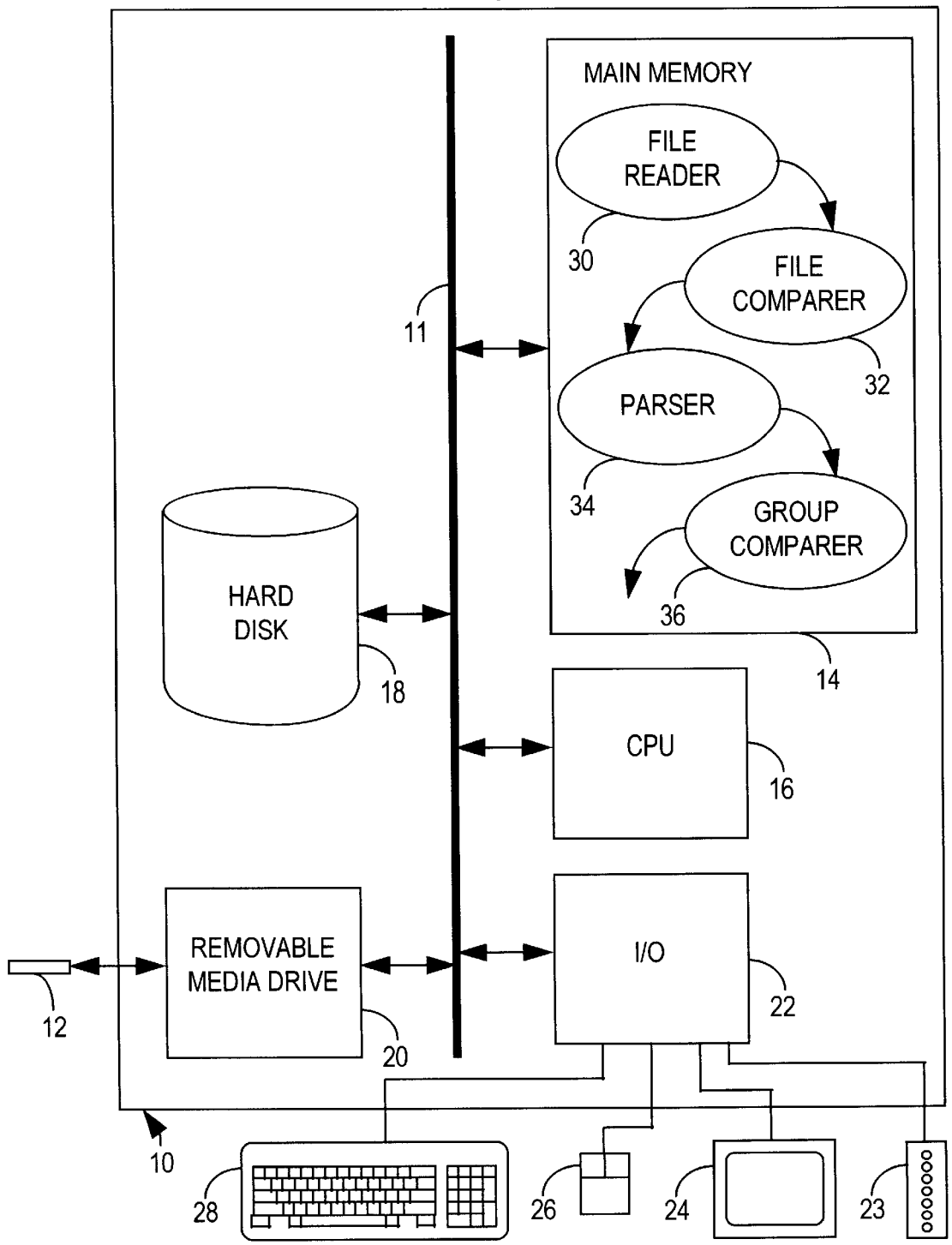
FIG. 1 illustrates a computer system for performing the methods of the present invention.

As illustrated in FIG. 1, a computer 10 can perform the methods of the present invention. The computer can be programmed to perform these methods by loading software from a removable disk 12, such as a floppy disk or CD-ROM, or other suitable computer program product data transfer medium. Alternatively, through a modem 23, software may be loaded electronically over the Internet, a bulletin board or other electronic medium. An exemplary computer program is provided in the Microfiche Appendix. Computer 10 includes hardware elements suitable for providing a general-purpose computing environment for a user, such as a suitable main memory 14, central processing unit 16, hard disk drive 18 or similar non-volatile data store, removable media drive 20 such as a floppy disk or CD-ROM, input/output circuitry 22, video display 24, mouse 26 or similar pointing device, and keyboard 28. The elements of computer 10 are interconnected in the conventional manner, in which each element in the computer communicates with one or more of the others via one or more busses 11. Although computer 10 is illustrated as a stand-alone computer in which the software and methods described below are executed entirely within computer 10, other computing paradigms and architectures, such as the client-server paradigm in which some functions are executed on a client computer and others are executed on a server computer connected to the client computer via a network, would also be suitable.

A program or software tool that computer 10 can execute to perform the methods of the present invention includes a file reader 30, a file compare 32, a parser 34 and a group comparer 36. A user can initiate and control the execution of this software on computer 10 in the conventional manner. (Unless specifically stated otherwise, the terms "software" and "program" are used interchangeably in this patent specification.) In addition to a program comprising the above-listed elements and other programs described below that relate specifically to the present invention, computer 10 can include a conventional operating system (not shown) to facilitate the execution of such programs and other functions typically performed by operating systems. Although the software elements of computer 10 that are principally relevant to the present invention are shown for purposes of illustration as existing or residing in memory 14, persons skilled in the art to which the invention relates will understand that the software is illustrated in this manner because software is typically executed from such main memory and fetched into the main memory on an as-needed basis from other sources such as hard disk drive 18 or a network. As such persons will appreciate, these software elements may or may not actually exist simultaneously or in their entirety in memory 14.

Figure 2A:
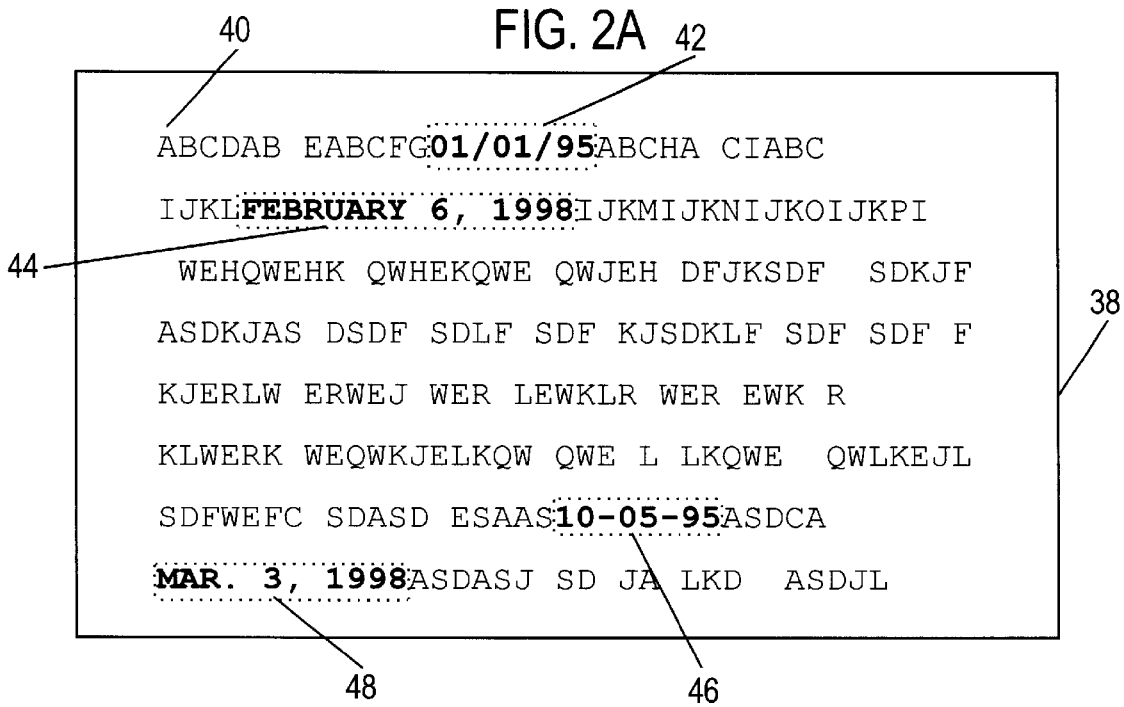
FIG. 2A illustrates an exemplary first file that includes dates embedded in text.
Figure 2B:
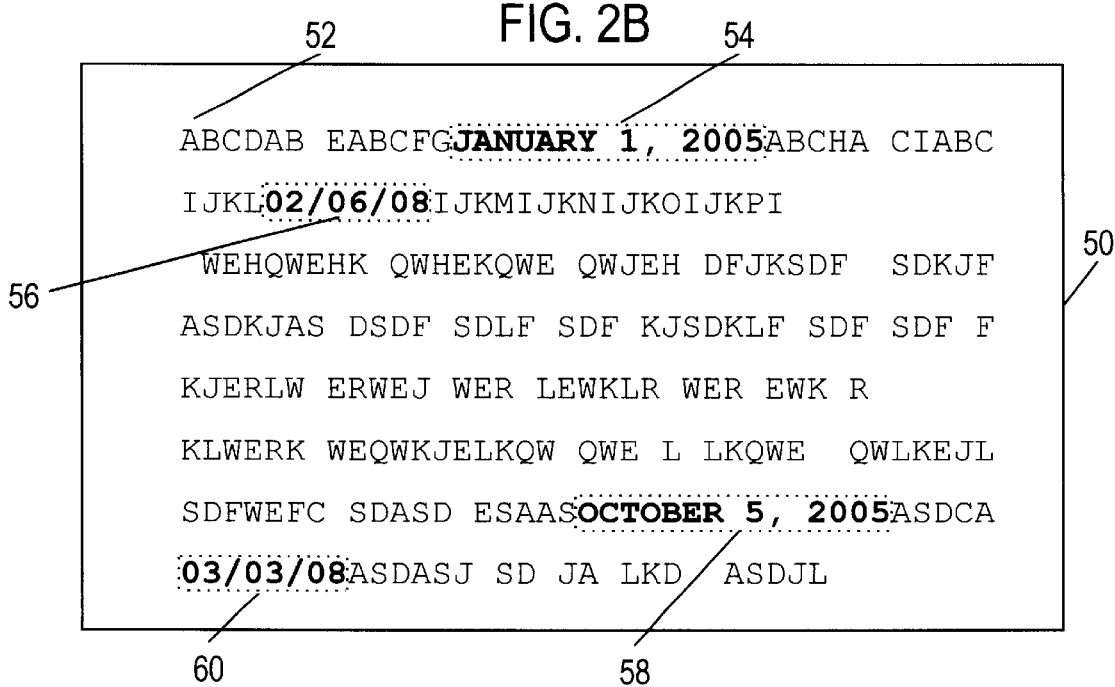
FIG. 2B illustrates an exemplary second file that includes dates embedded in text.

As illustrated in FIGS. 2A and 2B, the present invention can compare two data files 38 and 50 that include dates. FIG. 2A illustrates an exemplary first file 38 that includes any suitable text 40 in which dates 42, 44, 46 and 48, for example, are embedded. Text 40 and its dates 42, 44, 46 and 48 may comprise ASCII characters defined by bytes of data. Although in the illustrated embodiment the invention operates upon ASCII-encoded bytes, in other embodiments the invention may operate upon any other suitable data items. Similarly, FIG. 2B illustrates an exemplary second file 50 that includes text 52 in which dates 54, 56, 58 and 60 are embedded.

Figure 3:
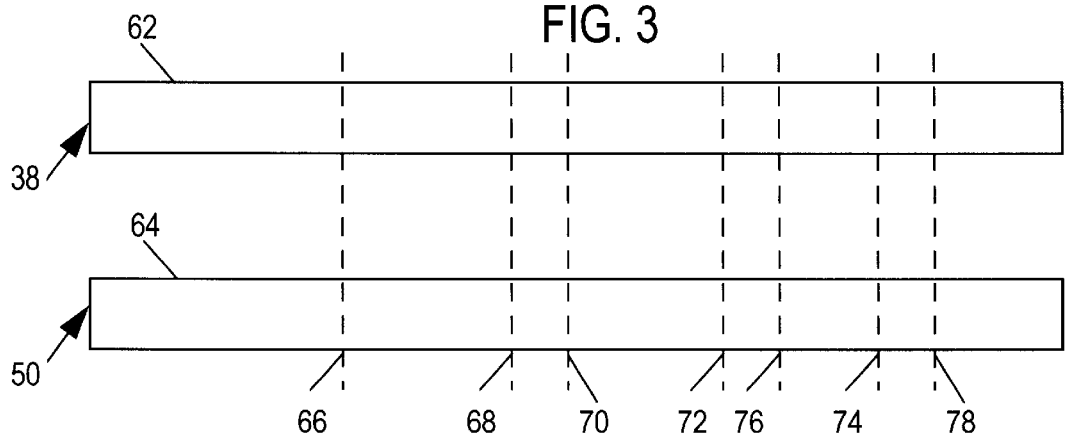
FIG. 3 illustrates two exemplary files that are compared by parsing the bytes into tokens.

FIG. 3 provides a high-level illustration of the principle under which two data files, such as files 38 and 50 in FIGS. 2A–B, are compared by parsing the bytes or other data items into tokens that represent dates or other quantities. Bytes 62 are read in sequence from first data file 38, and bytes 64 are read in corresponding sequence from second data file 50. Each byte 62 read from a location in first data file 38 is compared to a byte 64 read from a corresponding location in second data file 50. If the compared bytes match, these steps of reading and comparing sequential bytes continues. If the compared bytes do not match, it is determined whether the bytes can be interpreted as being part of a date. For example, if the byte at location 66 in first data file 38 does not match the byte at location 66 in second data file 50, then a group of one or more bytes at location 66 in each data file is parsed into a token representing a date. The parsing is described in detail below, but for present purposes it should be noted that the number of bytes parsed in the first data file may be different from the number of bytes parsed in the second data file. For example, in the illustrated embodiment, the bytes between location 66 and location 68 in first data file 38 may define the text "1/1/95" and are parsed into a token representing the date Jan. 1, 1995. Similarly, for example, the bytes between location 66 and location 70 in second data file 50 may define the text "January 1, 2005" and are parsed into a token representing the date Jan. 1, 2005. Then these two dates are compared and a difference of exactly ten years is found. In this example, the difference is the number of days or other temporal units between Jan. 1, 1995 and Jan. 1, 2005. Note that the date in first data file 38 is in the format "MM/DD/YY" (where MM represents the numerical month, DD represents the day, and YY represents the year), but the date in second data file 50 is in the format "<month><space>DD<comma><space>YYYY" and occupies more bytes than the date in first date file 38. The difference is computed despite the different date formats because the invention recognizes all of the date formats commonly used in the United States and other countries.

In the example described above, after the difference has been computed, the process of reading and comparing on a byte-by-byte basis continues from the location of mismatch in each file. Thus, the process continues from location 68 in is first data file 38 and from location 70 in second data file 50 until another mismatch is detected. As described further below, bytes representing spaces and tabs are considered "white space". Consecutively repeating white space characters are considered as a single instance of white space in the comparison process. This is necessary to avoid problems with padding of different length months, for example, the characters in "January" number seven, but the characters in "May" number only three. If some fields have to align between the files, there will be some white space padding between the files that will not match in size. Not eliminating the white space completely allows the tool to re-align every time white space is encountered. Comparison of the byte at location 72 in first data file 38 to the byte at location 76 in second data file 50 reveals another mismatch. Using the technique in a different embodiment of the present invention, a group of bytes beginning at location 72 and ending at location 74 in first data file 38 is parsed into a token representing a date, which, in this example, is Feb 6, 1998. Using the expected difference between the two dates and the expected format of the corresponding date in second data file 50, a character string is generated and checked to see if it is present in the bytes beginning at location 76 and ending at location 78 in second data file 50. In this example, the character string is "Feb. 6, 2008" and is found to match. In the general case, there will be multiple possible formats and multiple possible boundaries. The specifics of dealing with these variables will be explained below. The process then continues from location 74 in first data file 38 and location 78 in second data file 50.

The following is a summary of date formats recognized by the exemplary parser 34 (FIG. 1) and the rules by which it parses the bytes into tokens. The tokens may be represented internally within computer 10 in any suitable manner, i.e., using any suitable data type or data structure, but the tokens are preferably represented in a uniform manner to enable them to be compared and the difference between them quantified. For example, each token can be represented in computer 10 by an integer. It should also be noted that although in the illustrated examples parser 34 parses a group of bytes on a byte-by-byte basis, in which each byte is a data item, parser 34 can alternatively parse packed bytes if the data files represent dates using a packed format. Finally, the process can also handle dates stored in binary format. The following parsing rules are intended only to be exemplary, and alternative or additional rules may occur readily to persons skilled in the art.

Each Gregorian date format generally consists of a month followed by a day followed by a year, a day followed by a month followed by a year, or a year followed by a month followed by a day. A separator between the month, day and year portions of the date can be used to distinguish these portions and can consist of: one or more spaces, possibly broken by a comma in the format of day followed by month followed by year, or a period optionally following a character month, e.g., "Jan."; a hyphen ("-"); a slash ("/"); a period ("."); or no separator at all. If a hyphen or slash appears between the month and day, the same separator character must appear between the other pair of numbers in the date. For a date containing a character month, if a period appears anywhere other than after a character month, a period must also appear after the character month. For a date with a numeric month, if a period appears between the month and day, it must also appear between the other pair of numbers in the date.

The year portion of a date is usually represented by either two digits or four digits. Internally, all years are preferably converted to four digits. To avoid appending the wrong century digits to a two-digit year in this conversion, every possible interpretation of the century is used. Several possible dates can be generated from a single date if the original date contains fewer than four digits in the year. A date having a two-digit year can be converted to two four-digit date possibilities, one having "19" as the century digits and the other having "20" as the century digits. Three-digits years can exist in certain date formats and are also recognized by the parser. In the three-digit year format used by IBM mainframes, the first digit is a code for the century, such that "0" represents a century range of 1800–1899, a "1" represents a century range of 1900–1999, a "2" represents a century range of 2000–2099, etc. Even zero-digit and one-digit years can be recognized. A date having a one-digit year is converted to two possible token interpretations of the date having the year closest to the current date (one decade is before the date, and the other is after the current date). A date having a zero-digit year can be converted to two dates, one having the current year and the other having the next year (or, equivalently, one having the current year and the other having the previous year). If a date having a zero-digit year represents the current date but for the year, it can be converted into three dates, one having the previous year, one having the current year, and another having next year.

The month portion of a date can be represented by one or two digits or by a character field. The character field can be the entire name of the month, e.g., "January", or a portion of it, e.g., "Jan." Other abbreviations or portions are recognized in the parsing step, such as "Janu", "Janu", "Janua", "Januar", etc. Rules for capitalization are also recognized in parsing a month. If the first two characters are capitalized, then all characters must be capitalized for the parser to recognize the characters as a month. If the first character is capitalized and the second is lower case, then all remaining characters must be lowercase for the parser to recognize the characters as a month. If the first character is lower case, then all remaining characters must also be lower case. The parser recognizes that a period may or may not follow the characters representing a month.

The day portion of a date can be represented by a one or two-digit number between "1" and the maximum number of days in a month. If a character month appears in the first portion of a date, the parser recognizes that a comma may or may not exist between the day and year portions. Other formats for the day portion can be recognized, such as in date formats in which the last two digits represent the calendar week and range 1–53 and omit the month, or in date formats consisting of a year followed by a month followed by a week of the month in which the low order digit is in the range 1–5 and the next two digits are in the range 1–12, e.g., a weekly accounting period. Julian dates are also recognized by the parser. A Julian date is number consisting of 3–7 digits with the last three digits indicating the day of the year and omit the month. For a leap year, the day of the year is in the range 1–366. For all other years, the day of the year is in the range 1–365.

To simplify programming, software switches can be included with which the user of the program can indicate whether the files are known to include dates having unusual formats, such as dates with zero or one-digit years, integer dates such as a Lilian date, a calendar week or weekly accounting period. If such a software switch is set, the program parses dates only into possibilities that include the format selected by the set of software switches selected. If no such software switches are set, the program parses dates only into the predetermined default possible formats.

Figure 4:
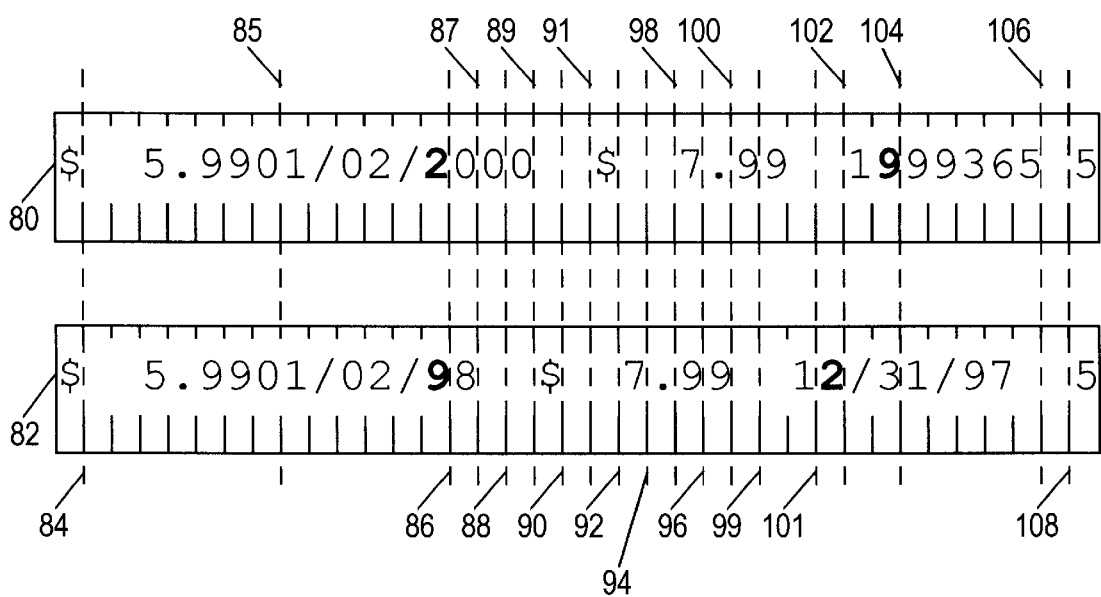
FIG. 4 is similar to FIG. 3 but illustrates in further detail two exemplary files that are compared on a byte-by-byte basis.

FIG. 4 illustrates an example of parsing data items in two files 80 and 82 into tokens representing dates. The comparison proceeds on a byte-by-byte basis from column 84 through successive columns (indicated by vertical dashed lines) until a mismatch is detected at column 86 in each file. The character "2" in file 80 does not match the character "9" in file 82. At that point, a group of characters in each file is parsed into tokens representing a dates. All possible dates are represented. Thus, groups of characters in file 80 are selected and parsed into tokens representing the following possible dates: Jan. 2, 1920, Feb. 1, 1920, Jan. 2, 2000, Feb. 1, 2000, Jan. 2, 2020, and Feb. 1, 2020. The date Feb. 20, 9901 is rejected because the year is too far away from the present to be valid. Similarly, groups of characters in file 82 are selected and parsed into tokens representing the following possible dates: Jan. 2, 1998, Feb. 1, 1998, Jan. 2, 2098 and Feb. 1, 2098.

Group comparer 36 (FIG. 1) computes a difference between each possible date in file 80 and each possible date in file 82. In other words, the difference between each unique combination of quantities is computed. Nevertheless, in certain embodiments the user may input an expected difference that the user has predetermined. If the user input an expected difference of, for example, 730 days, then only Jan. 2, 2000 and Feb. 1, 2000 would be identified as candidate dates for file 80 and the others would be eliminated as candidates. Similarly, only Jan. 2, 1998 and Feb. 1, 1998 would be identified as candidate dates for file 82. In this example, group comparer 36 could not yet conclusively determine the actual difference. It can only compute the set of four possible or candidate differences: the difference between Jan. 2, 2000 and Jan. 2, 1998, the difference between Jan. 2, 2000 and Feb. 1, 1998, the difference between Feb. 1, 2000 and Jan. 2, 1998 and the difference between Feb. 1, 2000 and Feb. 1, 1998. In certain embodiments, as described below, the process is repeated at other points of mismatch between files 80 and 82. At each point of mismatch, a set of possible or candidate differences is computed. The possibilities can be narrowed by exhaustively comparing the sets of candidate differences computed in response to each mismatch and eliminating those candidates that do not appear more than once. Alternatively, the candidate differences can be output or presented to the user for manual analysis.

If the user has input a predetermined expected difference of 730 days, it can be determined that the date in file 80 is represented by the byte group from columns 85 to 89, and the date in file 82 is represented by the byte group from columns 85 to 87. (Note that had the two candidate dates in 1920 not been eliminated in response to a predetermined expected difference, exhaustive comparison with other sets, or other criteria, these candidate dates would have been eliminated as soon as the comparison resumed and a mismatch was detected between the "0" character in column 88 of file 80 and the "$" character in column 90 of file 82.)

Following computation of the difference or set of candidate differences, the comparison resumes. Repeated space and tab characters are skipped and not compared. In this example, column 90 in file 80 is compared to column 88 in file 82. Then the next non-space and non-tab character in file 82, which is the "$" in column 90, matches the next non-space and non-tab character in file 80, which is the "$" is column 92. Following that comparison, the space in column 94 of file 80 is compared to the space in column 91 of file 82. Then the next non-space and non-tab character in file 82, which is the "7" in column 94, matches the next non-space and non-tab character in file 80, which is the "7" is column 96. Similarly, the "." in column 98 of file 82 matches the "." in column 100 of file 80, and the two "9" characters at column 96 in file 82 match the two "9" characters at column 101 in file 80. The space in column 101 of file 80 matches the space of column 99 of file 82. Next, the "1" character in file 82 also matches the "1" character in file 80. The "2" in column 102 of file 82, however, does not match the "9" in column 104 of file 80. Upon computing the possible candidate dates that include the column of mismatch in file 80, it is determined that the only possibility is a Julian date representing the 365th day of the year 1999 (Dec. 31, 1999). Upon computing the possible candidate dates that include the column of mismatch in file 82, it is determined that the only possibility is Dec. 31, 1997. Quantifying the difference between these two dates produces a result of 730 days. The space in column 86 of file 82 is compared to the space in column 108 of file 80. The comparison process then continues with the next non-space, non-tab character after column 108 in file 80 and column 106 in file 82.

Turning briefly to FIGS. 20, 21, 22, 23 and 24, a further step will become important. It is possible for two files to become so far out of synchronization that when a mismatch occurs, one or both files is not pointing to an identifiable token. If this becomes true, additional file comparison techniques can be employed. One technique is to back up one of the pointers to the tokens, as will be shown below. Another technique is to scan portions of the file backwards. Consider two files represented in FIG. 23 where dates are represented by bold print. Upon examination, it will be noticed that the individual bytes of file 726 are exactly the same as the individual bytes of file 728 until position 758 in files 726 and 728 are reached. The "X" in position 760 represents an end of record mark for file 726; there can be more data beyond position 760 in file 726, but any such data is omitted for clarity's sake. Similarly, the end of record mark for file 728 is located at position 762. The Julian date "19191" is at positions 730, 738, 742, 746 and 750. The date "190519", for May 19, 1919, is at position 734. The Julian date "19190", for Jul. 8, 1919, is at position 754. Similarly, in file 728, the Julian date "1919191", for Jul. 9, 1919 is at positions 732, 740, 744 and 748. At position 752 is "07091919", also for Jul. 9, 1919 and is equal to the Julian date "19191". The date at position 736 is "05191919" for May 19, 1919. The date at position 756 is "070819" for Jul. 8, 1919 which is equal to the Julian date "19190". The careful reader will note that there is a one-to-one correspondence between the dates in file 726 and file 728 such that the date at position 730 matches the date at position 732, the date at position 734 matches the date at position 736, the date at position 738 matches the date at position 740, the date at position 742 matches the date at position 744, the date at position 746 matches 748, the date at position 750 matches the date at position 752, and the date at position 754 matches the date at position 756. Furthermore, the bytes between each of those corresponding pairs also match, therefor, the files match exactly when the dates are properly interpreted. However, without the position and format of the tokens properly identified, a tool such as the present invention would miss the fact that these two files are identical because the arrangement of bytes between and within dates hide the presence of the date.

Figure 23:
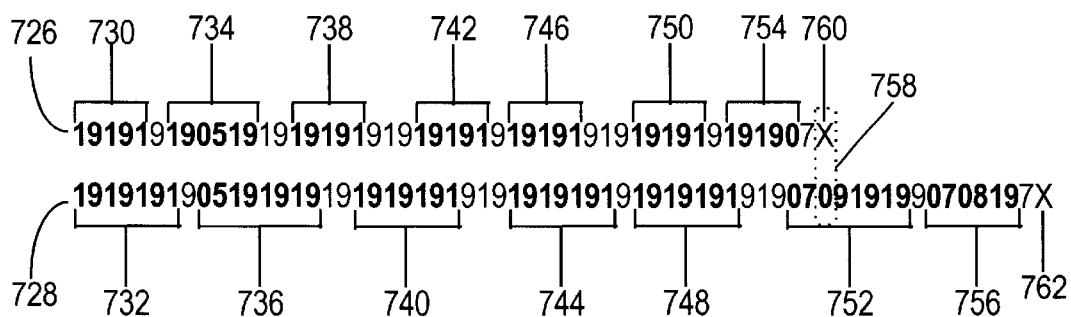
FIG. 23 illustrates a specific instance of the synchronization problem illustrated in FIG. 20.
Figure 24:
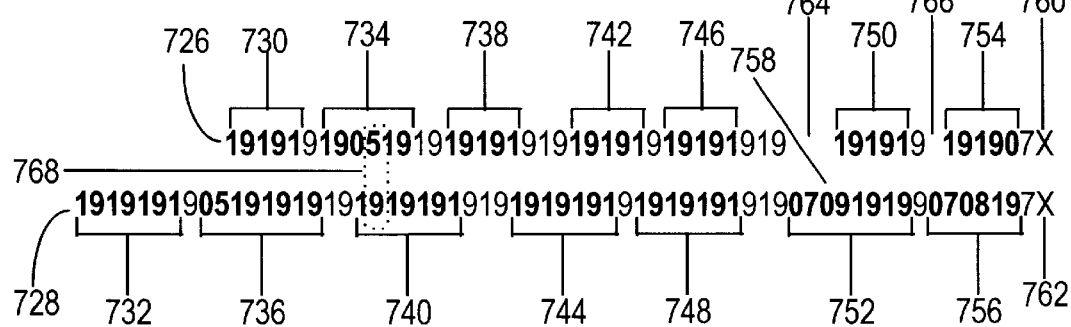
FIG. 24 is similar to FIG. 23 and illustrates an instance of overcoming the synchronization problem illustrated in FIGS. 20 and 23 by scanning in a reverse direction.

By scanning portions of the file backwards this alignment problem can be solved as shown in FIG. 24. In FIG. 24, end of record 760 for file 726 and end of record 762 for file 728 are aligned. After being taught the methods of this invention, a person skilled in the art of file processing will realize that it is very possible to use some unit other than a single record for aligning files such as multiple records or rare characters. From this point, the records are scanned backwards using the same process as scanning forward, except the direction the file pointers advance in file comparer 32 (FIG. 1) and group comparer 36 (FIG. 1) is opposite that described above with respect to FIG. 23. A date token is identified at position 754 which matches the token at position 756. Because the date at position 756 has an extra character, the files are re-aligned at position 766 and the process of scanning continues. Another date token is identified at position 750 which matches the date token at position 752. Because date token at position 752 has three extra bytes, the file are re-aligned at position 764 and scanning continues until bytes at position 768 is reached, the bytes of and between the dates at positions 746, 742 and 738 match the bytes of and between the dates at positions 748 and 744. When comparing tokens at positions 734 and 740, at position 768 there is no way to reconcile the two dates, and the scanning process stops. The tokens at positions 730, 732 and 736 are not looked at when going backwards.

Next the overlap in coverage is examined. In file 726, when going forward, all the bytes in file 726 matched. Going backwards, 38 bytes matched between positions 760 and 768. The overlap in coverage between these two are the 38 bytes between positions 760 and 768.

For file 728, consider the overlap in coverage. Going forward, all the bytes from the start of position 732 matched until position 758 was reached. Going backwards, all the bytes matched from positions 762 to 768. The overlap between these two is 28 bytes between positions 768 and 758. As long as the longest expected token is less than the minimum overlap, the records are considered to match. Specifically, when using numeric dates (since this record was all numeric), the longest date would be eight digits long. Since this is less then the overlap, the two records can be considered to match and processing continues with the first character after position 760 in file 726 and position 762 in file 728.

Figure 20:
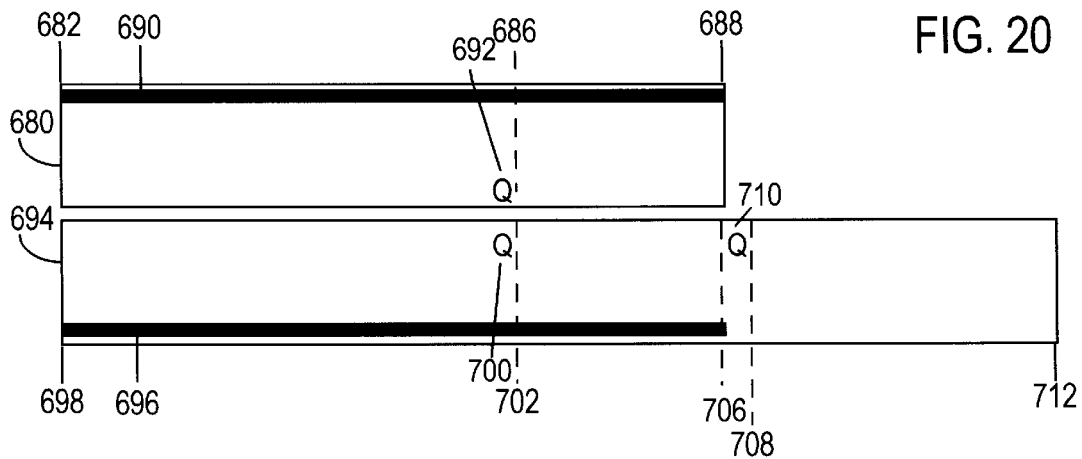
FIG. 20 illustrates two exemplary files that cause the file reader and compare to lose synchronization between them.

From a high level, the process in FIGS. 23 and 24 begins in FIG. 20. Here, two files 680 and 694 are compared. A convenient reference point always available in both files are end of record markers 688 in file 680 and 712 in file 694. A person skilled in the art of file processing will realize that end of record marks may be explicit or implicit. Both files may have additional data before and after the identified end of record marks and the start of record, but these additional data are not shown for purposes of clarity. The record currently being compared in file 680 begins at byte 682 and ends at byte 688. One specific byte is identified in file 680 at reference position 686, the "Q" is identified as reference character 692 and is a rare character in the record. In practice, reference character 692 is any single or combination of characters in a file that occurs relatively few times in both files. The best reference characters are those which are believed to not be a part of the object being searched for. Since the letter "Q" does not appear in any month, that character was chosen for this example. Several such characters may be identified which are common to both files and may be scattered through the record. These will be used as reference points for alignment and insure like portions of the file are compared. File 694 is similarly identified with a beginning of record at position 698, ending of record at position 712. The reference character 700 appears at position 702. An identical reference character 710 is also found at position 708.

When files 680 and 694 are compared by file comparer 32 (FIG. 1) and group comparer 36 (FIG. 1), all the data included in coverage area 690 are found equal to the data included in coverage area 696. At the end of coverage area 690, a byte is found which can not be reconciled with the byte at the end of coverage area 696. In this specific example, position 688 is also the end of coverage area 690. The end of coverage area 696 is at position 706.

When the comparison process discovers that the coverage area can not be extended past position 706, a check is made to see if a user controlled software switch (not shown) permits record level approximations on the file. If the records contain enough diversity in data or other delimiters, it should be unnecessary to activate that software switch. If the software switch is activated, it will be possible for some records to pass as equal, even when they are not. However, with sufficient data, other records should be caught by the comparison process. This record level approximation software switch will insure that records which are equal will pass, even if a few records which are not equal pass the comparison process.

Figure 21:
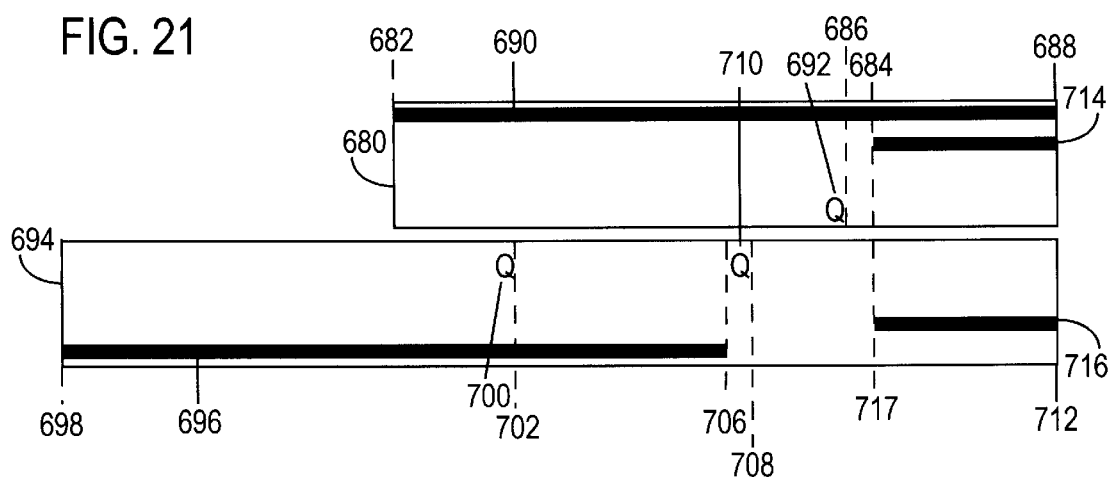
FIG. 21 is similar to FIG. 20 and illustrates a record-level approximation relating to overcoming the synchronization problem illustrated in FIG. 20.

FIG. 21, begins the record level approximations step. File 680 has its associated beginning position 682, end of record 688, reference position 686, reference position 692 and previous coverage area 690. File 694 has its associated beginning position 698, end of record 712, reference positions 702 and 708, reference characters 700 and 710, previous coverage area 696 and previous end of coverage position 706. In this step, the end of record 688 is aligned with the end of record 712. The same processing as described elsewhere in this patent specification is applied to the records from this position, except going backwards through the records. The coverage areas 714 and 716 for this pass is marked beginning at the end of the records 688 and 712 and continuing until a mismatch can not be reconciled by file comparer 32 (FIG. 1) and group comparer 36 (FIG. 1) at end of coverage positions 684 and 717.

At this point the coverage is checked. A criterion for coverage is that the coverage levels must, in this embodiment, overlap by at least the length of a token to be consider one continuous coverage from the start of the record to the end. When coverage is complete from the beginning to end of the record of both files, then the two records are considered to match. In the case of file 680, the coverage is complete by virtue of coverage area 690. File 694 however has a gap in coverage area from end of coverage position 706 to end of coverage position 717.

If user software switches (not shown) are set for an appropriate level of approximation, the process continues. A check is made for a reference point in or near the area that lacks coverage. In this case between end of coverage positions 706 and 717, reference point 710 appears. The same reference character appears in the other file at reference position 686. To proceed, the reference position 686 is aligned with the reference position 708. This is shown in FIG. 22.

Figure 22:
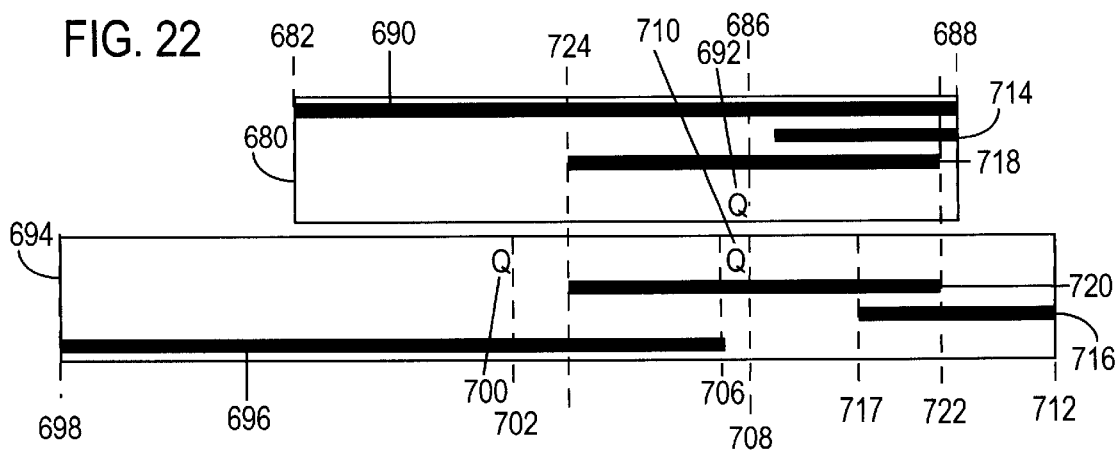
FIG. 22 is similar to FIGS. 20 and 21 and illustrates a bi-directional scanning method for overcoming the synchronization problem illustrated in FIG. 20.

In FIG. 22, the previously identified files 680 and 694 are shown. File 680 is shown with its associated beginning of record position 682, ending position 688, reference position 686, reference point 692 and previous coverage areas 690 and 714. File 694 has its associated beginning of record position 698, ending position 712, reference positions 702 and 708, reference characters 700 and 710, previous coverage areas 696 and 716 and previous end of coverage positions 706 and 717. For this comparison level processing begins at the reference positions 686 and 708 and proceeds in the forward direction until processing can no longer continue or the then end of record is found. In the present example, the coverage ends at position 722. Processing then continues in the reverse direction also. Coverage in this direction continues to end of coverage 724 where the matching can no longer proceed. The complete coverage area found in the current step is shown by coverage areas 718 and 720. A person skilled in the art of programming will realize that it is arbitrary whether the forward scanning is performed before or after the backwards scanning. Furthermore, such a person will also realize it is usually possible to pick a reference character which requires one to scan only in one direction after being taught the material of this present invention.

At this point, total coverage is once again checked. For file 680, complete coverage has been obtained by virtue of coverage area 690. For file 694, a form of total coverage has been achieved by virtue of the overlap of these coverage areas 696,716 and 720. To determine if this constitutes sufficient coverage for the records to be considered equal, the current coverage rule must be checked. An example of a coverage rule is that the overlap must be at least as large as the size of an expected token. Another example of a coverage rule is that the minimum overlap is set by a user parameter. Another example of a coverage rule is that the minimum overlap may vary by the quantity of coverage areas being used to establish the coverage, thus to obtain coverage, the computer is forced to use a minimum number of repetitions of the algorithm.

This algorithm can be repetitively applied to create a larger quantity of overlapping coverage areas. Furthermore, different reference characters may be tried to increase coverage.

FIGS. 5, 6, 7A, 7B, 8A, 8B, 8C, 8D, 8E, 8F, 9A, 9B, 10, 11A, 11B, 11C, 11D, 11E, 11F, 11G, 11H, 11I, 11J, 19, 25, 26A and 26B are sheets of a flowchart illustrating the method in further detail. As noted above, the method is implemented in software executable on computer 10 (FIG. 1). The software may be written in any suitable programming language. For example, the exemplary software provided in the Microfiche Appendix is written in the C programming language. It should be noted that there is not a one-to-one correspondence between the flowchart steps and steps implemented by the exemplary software in the Microfiche Appendix. Rather, the flowcharts are constructed with the goal of clearly describing how to make and use the invention, whereas the exemplary software represents an experimental prototype that the inventor created.

Figure 5:
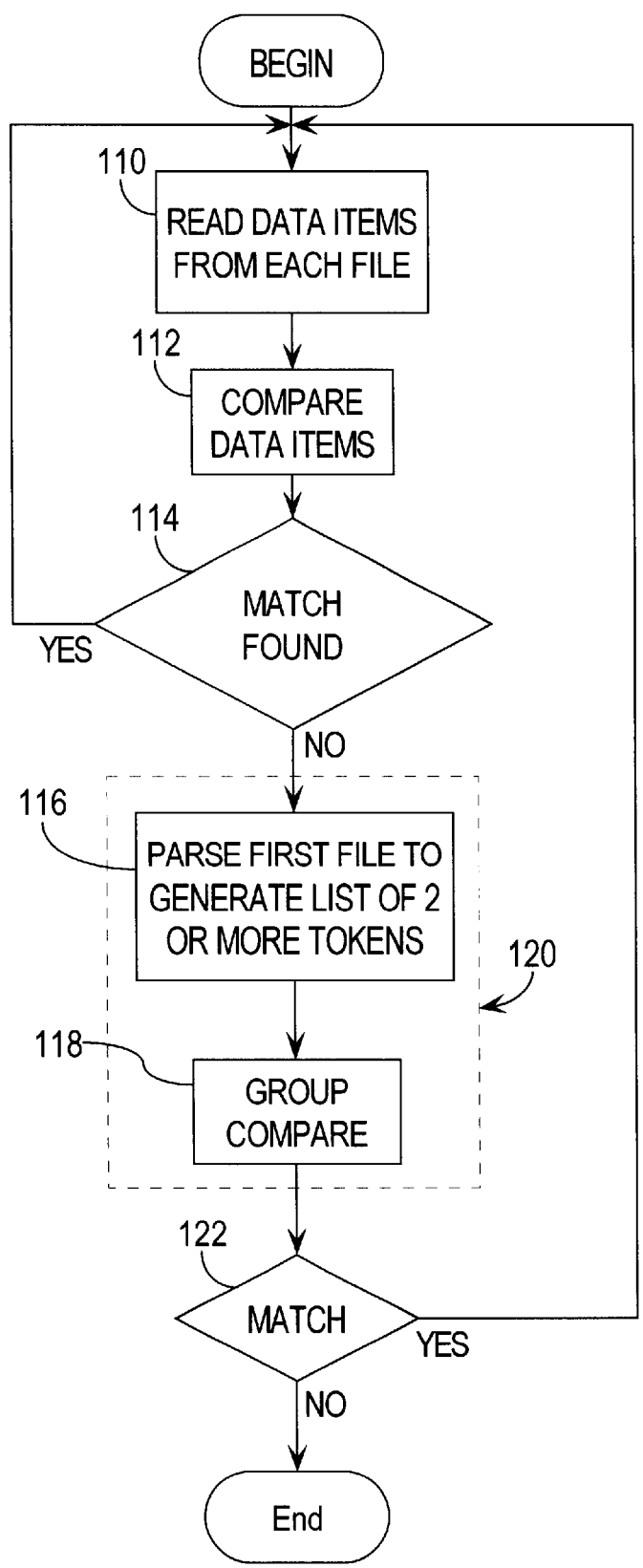
FIG. 5 is a high-level flowchart illustrating the comparison method of the present invention.

At step 110 in FIG. 5 data items are read from each of two files. As described above, bytes defining repeated space and tab characters are preferably considered a single instance of white space, regardless of how many tabs or spaces appear together. The term "data items" includes within its scope values computed in response to bytes read, such as a cyclic redundancy code (CRC) or similar checksum computed in response to a group of bytes. Thus, not only can bytes in one file be compared to bytes in the other file to determine a mismatch between the two files, but a CRC computed in response to bytes in one file can be compared to a CRC computed in response to bytes in the other file to determine a mismatch.

All other characters are considered significant. Nevertheless, in other embodiments, additional or alternative sets of characters may be selected to be skipped. As also mentioned above, although in the illustrated embodiment the files are read on a byte-by-byte basis, in other embodiments multiple bytes may be read at this step. Furthermore, any headers or footers in report type files may be skipped in cases when the number of lines on a page would be expected to change, such as would be expected in currency conversion when the converted currency values are vertically aligned. Finally, arrangements may be necessary to skip time stamps as it is unlikely for test runs to match these. To accomplish this skipping, formats and range values need to be specified and they can be recognized in the group compare step 118. At step 112 the data items read from the first file is compared to the data items read from the second file. If it is determined at step 114 that the data matches, the process returns to step 110 and the next data items are read from each file. If the data items do not match, at step 116 the data items from the first file are parsed into tokens. The tokens may represent dates, currency amounts or other values being tested. At step 118, various alternate group comparison techniques described elsewhere in this specification are used to compare the two files. Each of these group comparison techniques involve multiple interpretations of the tokens parsed from the first file. Parsing step 116 and group compare step 118 are interrelated in the preferred embodiment, as indicated by the combined step 120. If more than one byte is included in the data items, it should be obvious to a person skilled in the art that there may be an implied looping through each successive byte in the data items within combined step 120. The flow chart is simplified in this respect for purposes of clarity. The rest of the details of the combined parsing and group compare step 120 are described below. If it is determined at step 122 that no alternate group comparison technique accounted for the mismatch between the files, the process terminates. Otherwise, the process returns to step 110. Because the techniques of detecting and processing end of file conditions are well understood by a person skilled in the art of file processing, it is omitted from this description.

Figure 6:
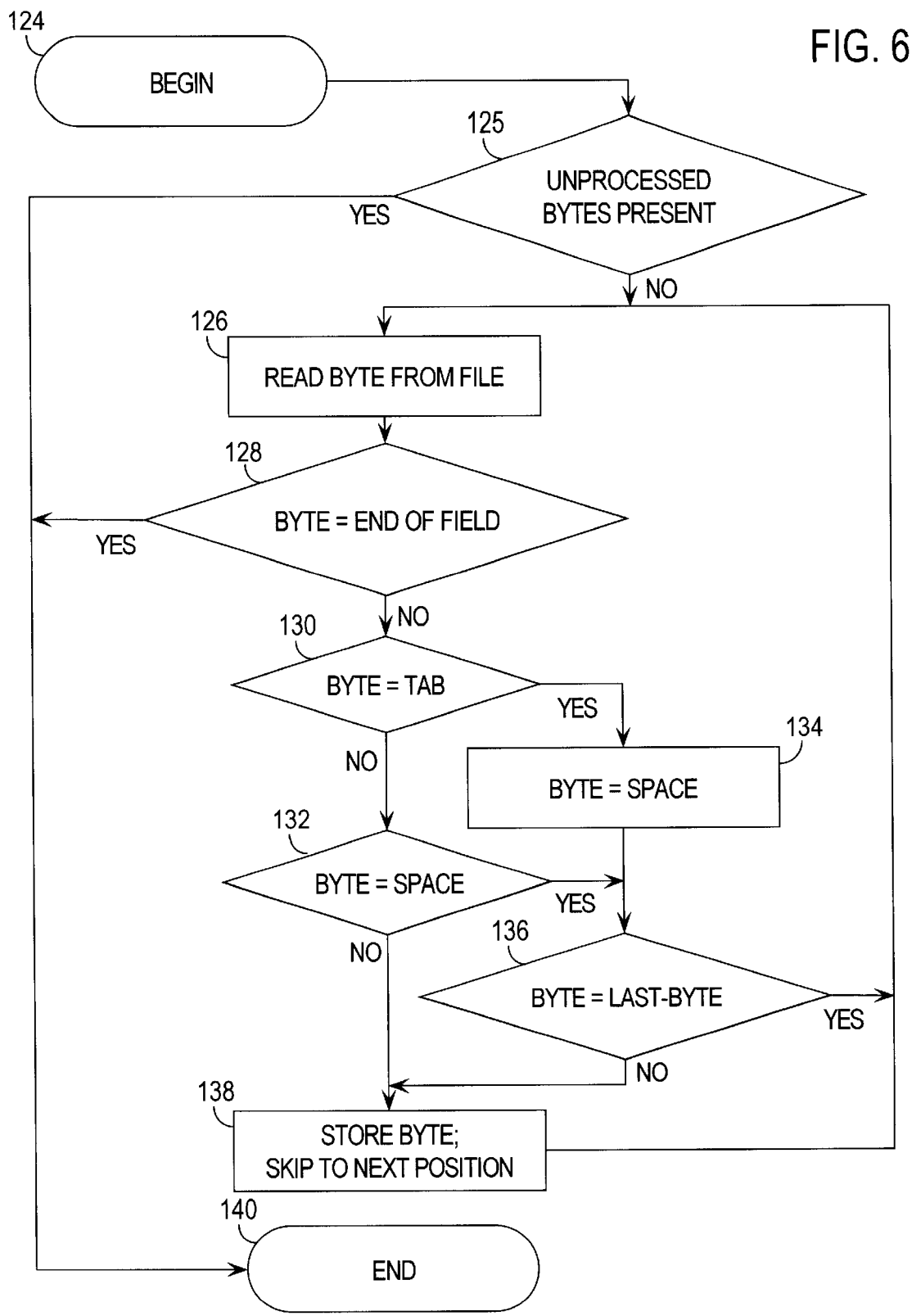
FIG. 6 illustrates the step of reading data items from the files.

The method that, as stated above, is performed at step 110 (FIG. 5) is illustrated in FIG. 6 and begins at step 124. At step 125, it is determined if unprocessed data exists from the prior execution of this step. If data already exists, perhaps from reading whole records at a time and processing individual bytes, then further reading in this step is prohibited and control passes to step 140. At step 126, a single byte is read from a file. At step 128, it is checked if the file that byte is read from indicates the end of the current field has been reached. The current field is determined by software switches. It may be that each individual byte is considered the end of field, it could be that the end of field is determined to be a constant number of bytes, it could be that the end of field is determined to be the end of record marks, etc. If the end of the current field has been reached, the read loop exits, at step 140.

Step 130, 132, 134 and 136 assume that the file does not contain packed or binary numbers. If this is not true, these steps would be removed from implementation and additional steps may be required in steps 112, 116 and 118 (FIG. 5) to compensate for differences in white space. At step 130, it is checked if the byte is equal to a tab. If it is equal to a tab then it is changed to a space at step 134 and control then passes on to step 136. If it is not a tab as determined at step 130, then it is checked if the byte is a space at step 132. If, at step 132, the byte is equal to a space, then control passes to step 136. If, at step 132, the byte is found not equal to a space, then control passes on to step 138.

At step 136, the byte is checked if it is equal to the last byte that was processed. If so, then the byte is not stored in the final output, but instead control passes on to step 126 to read the next byte. If, at step 136, it is found that the last byte processed was not a space then control passes on to step 138.

At step 138, the byte is stored in the output buffer for further processing by step 112 (FIG. 5) and beyond.

At step 140, control is returned to the calling process, step 110 (FIG. 5) for processing the buffer read. The details of how many bytes to read in the loop, file opening and closing are well within the scope of practice of a person skilled the art and so are omitted for clarity.

Figure 8A:
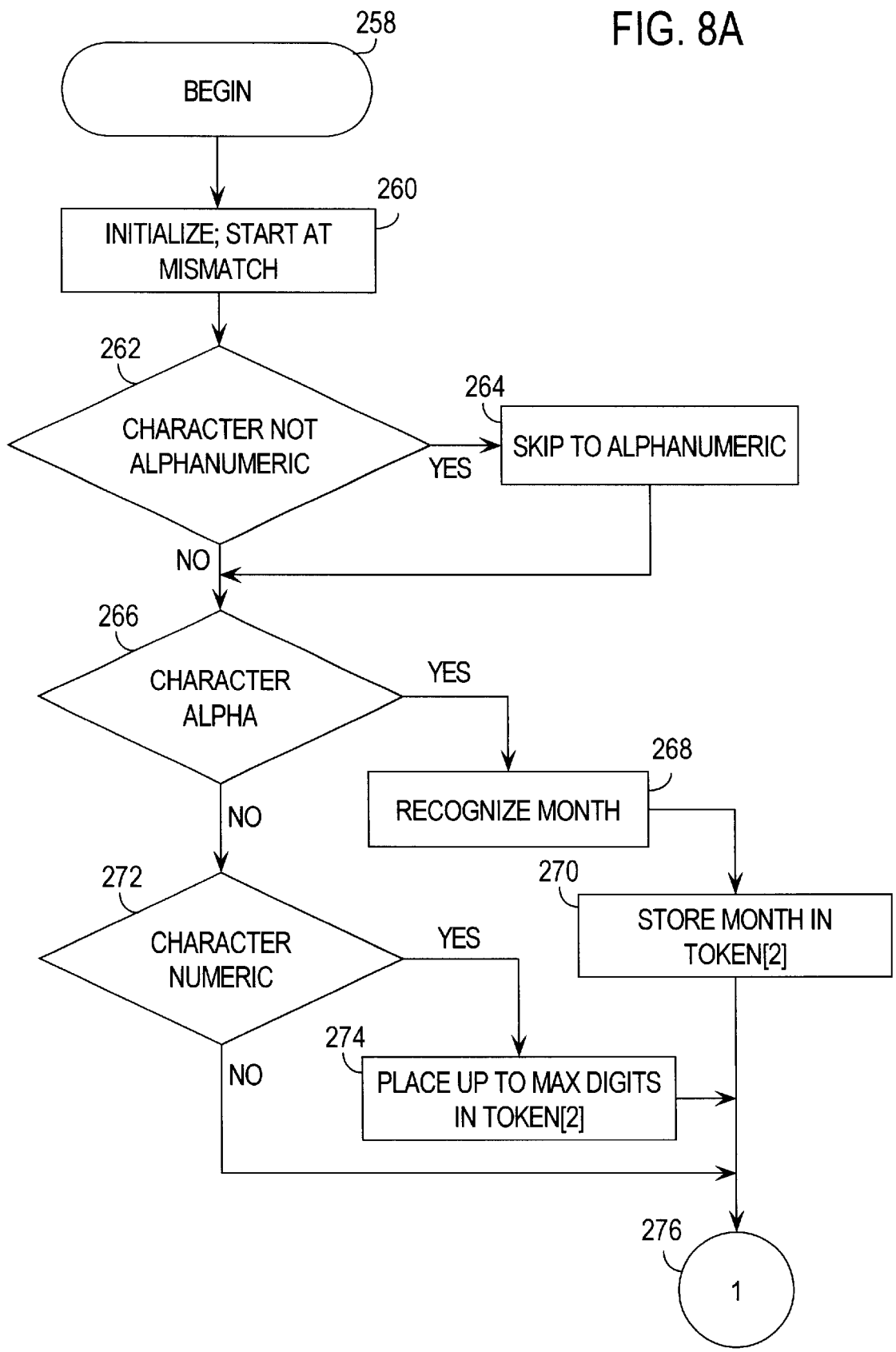
FIG. 8A illustrates the parsing step.

The method that, as stated above, is performed at step 116 (FIG. 5) is illustrated in FIG. 8A and begins at step 258. Steps 260 through 338 (FIG. 8D) substantially parallel the function "fill" set forth in the Microfiche Appendix. Steps 340 (FIG. 8D) through 392 (FIG. 8F) substantially parallel the function "generate_dates" set forth in the Microfiche Appendix. The correspondence is not exact, but similar, as the flowchart steps have been simplified for clarity. At step 260, a token structure is initialized to hold the values read from the file. For date processing, the structure should be able to hold digits, separators and types of sufficient size to contain up to two sets of numbers before and after the set of numbers that include the mismatch, a set could contain a maximum of eight digits. For an example of such a structure, see the structure "get_token" set forth in the Microfiche Appendix. Step 260 makes explicit that processing will begin with the character that was identified as a mismatch (the "identified mismatch character"). In step 262, it is checked if that the identified mismatch character is alphanumeric. If it is not, alphanumeric, then the pointer is advanced to the first character which is alphanumeric in step 264.

Either way, processing continues at step 266 where it is checked if the current character is an alphabetic character. If it is an alphabetic character, then at step 268, the characters are attempted to be interpreted as a month. As illustrated by the exemplary functions set forth in the Microfiche Appendix, it is possible to map two or three characters anywhere within a month to a month, if the characters fit the standard names of a month or its abbreviation, then check the remaining characters to see the full month name is present. At step 270, the numeric interpretation of the month is stored in the structure at the second position. As is the standard practice in the C programming language, positions or subscripts will begin with the number zero in this specification, but as the skilled person will note, this is subject to change for different programming languages.

If step 266 determined that the character was not alphabetic, then it is checked to see if it is numeric in step 272. The only way it could fail this test is if it were at the end of a file, as step 262 guaranteed that it was alphanumeric, and alphabetic characters have already been eliminated. If it is determined to be numeric, then at step 274 digits are copied from the place that the pointer points until the maximum number of characters are reached. The maximum number of characters for the second position is eight. This is calculated as the remaining number of digits that it would take to make a date of a total of eight digits, with the restriction that one of the digits must include the point of initial mismatch.

Figure 8B:
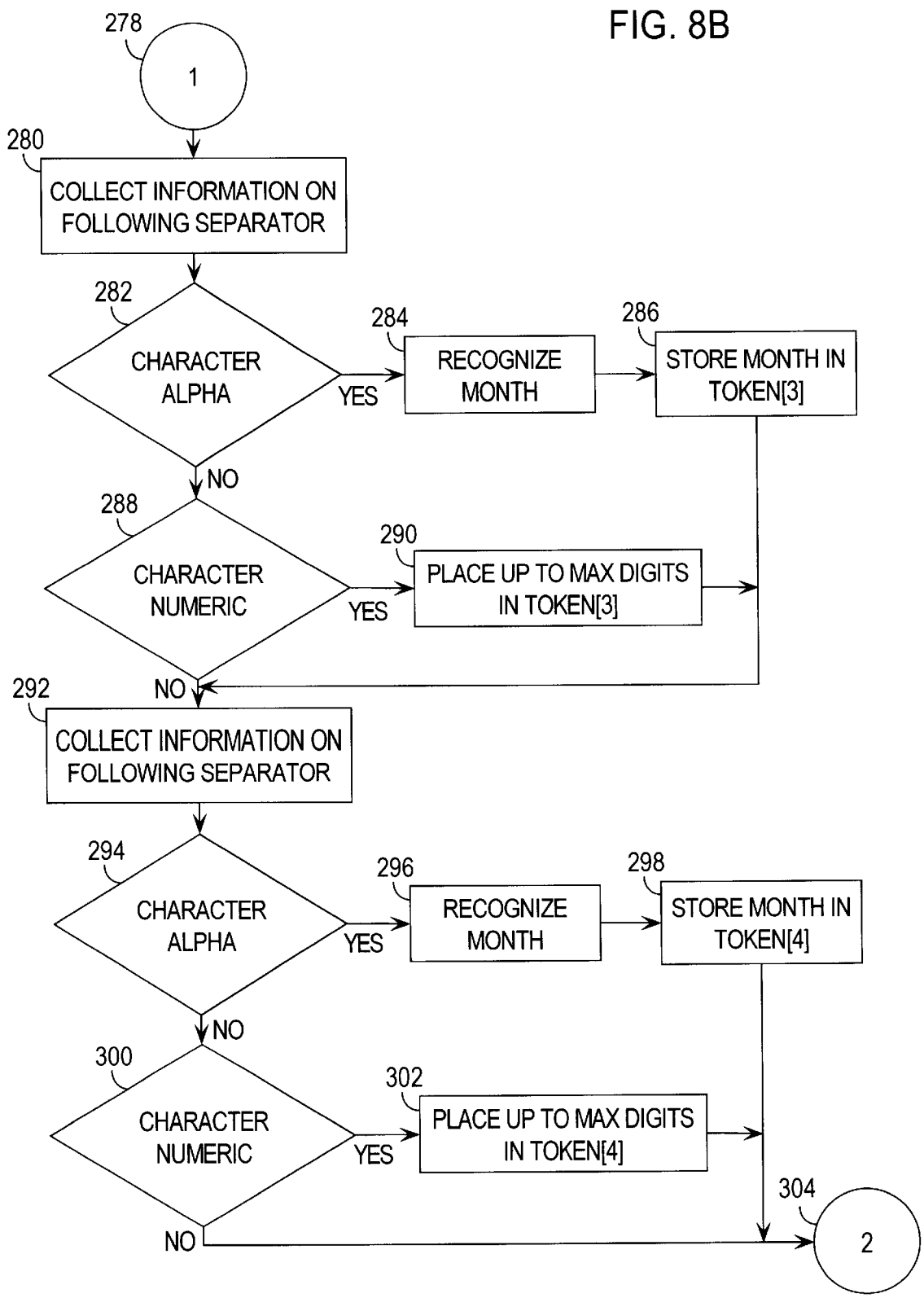
FIG. 8B illustrates the parsing step and is a continuation of FIG. 8A.

Under any condition, processing continues at step 280 as indicated by the connection ("1") and the off-page connector 276 and an off-page connector 278 in FIG. 8B. At step 280, the pointer is advanced past any spaces, periods (following a character month) and commas checking for a slash, dash or period (following a numeric) which is stored at the second position for future use. At 280, this skipping continues until the next an alphanumeric is encountered.

Processing continues at step 282 where it is checked if the current character is an alphabetic character. If it is an alphabetic character, then at step 284, the characters are attempted to be interpreted as a month. At step 286, the numeric interpretation of the month is stored in the structure at position 3.

If step 282 determined that the character was not alphabetic, then it is checked to see if it is numeric in step 288. If it is determined to be numeric, then at step 290 digits are copied from the place that the pointer points until the maximum number of characters are reached. The maximum number of characters for the third position is eight minus the number of characters stored in the second position.

Under any condition, processing continues at step 292. At step 292, the pointer is advanced past any spaces, periods (following a character month) and commas checking for a slash, dash or period (following a numeric) which is stored at the third position for future use. At step 292, this skipping continues until the next an alphanumeric is encountered.

Processing continues at step 294 where it is checked if the current character is an alphabetic character. If it is an alphabetic character, then at step 296, the characters are attempted to be interpreted as a month. At step 298, the numeric interpretation of the month is stored in the structure at position 4.

If step 294 determined that the character was not alphabetic, then it is checked to see if it is numeric in step 300. If it is determined to be numeric, then at step 302 digits are copied from the place that the pointer points until the maximum number of characters are reached. The maximum number of characters for the fourth position is eight minus the number of characters stored in the second position and the third position.

Figure 8C:
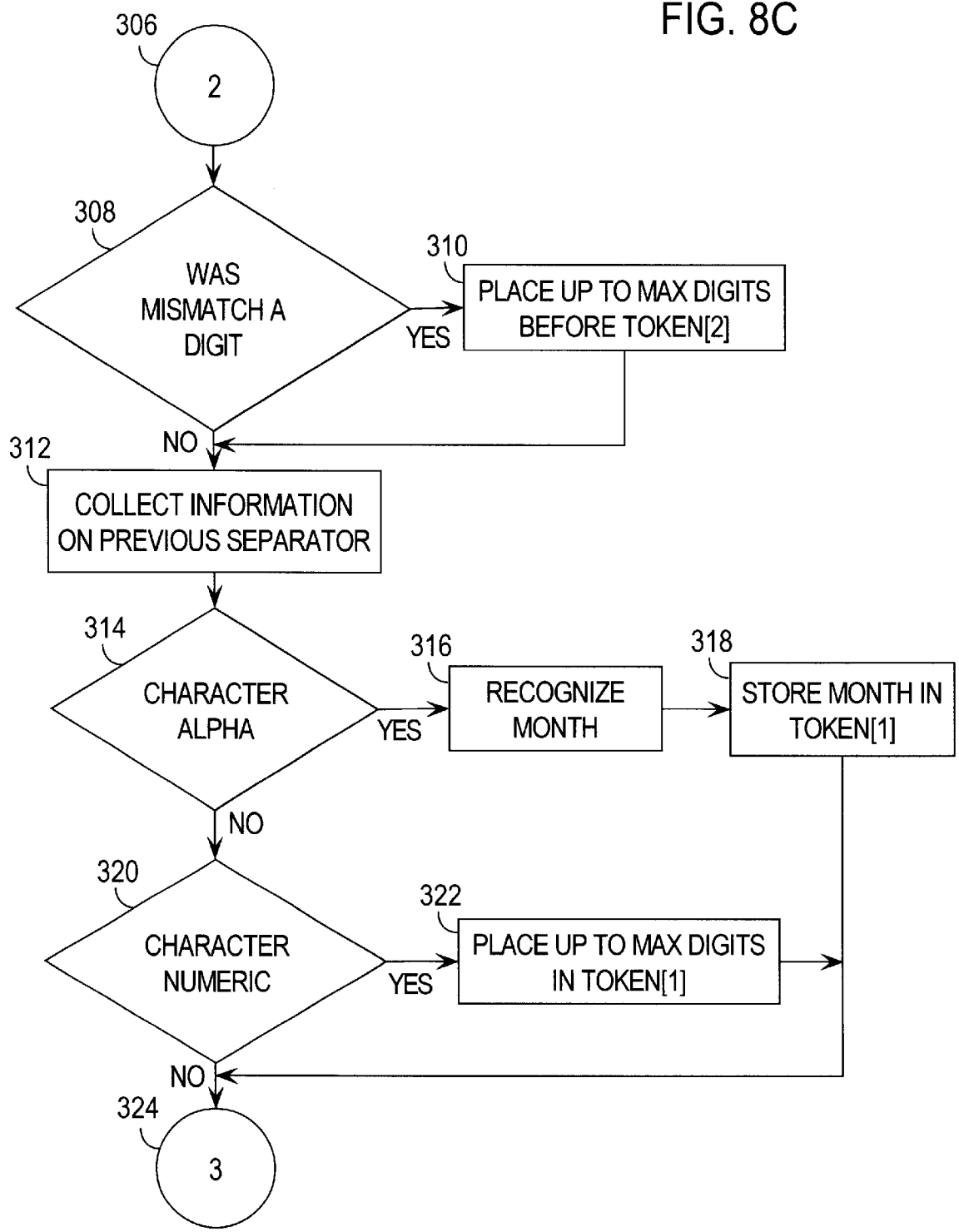
FIG. 8C illustrates the parsing step and is a continuation of FIG. 8B.

Under any condition, processing continues at step 308 (FIG. 8C) as indicated by connection ("2") and off-page connector 304 and an off-page connector 306 in FIG. 8C. At step 308, it is checked whether the initial mismatch character was a digit. If it was a digit, then there is a chance that there could be other digits immediately before that mismatch point and processing proceeds with step 310. In step 310, those digits are checked for and inserted before the digits already in token position 2.

Under any condition, processing continues at step 312. At step 312, the pointer is advanced toward the front of the token past any spaces, periods (following a character month) and commas checking for a slash, dash or period (following a numeric) which is stored at the first position for future use. At 312, this skipping continues until the next an alphanumeric is encountered.

Processing continues at step 314 where it is checked if the current character is an alphabetic character. If it is an alphabetic character, then at step 316, the characters are attempted to be interpreted as a month. At step 318, the numeric interpretation of the month is stored in the structure at the first position.

If step 314 determined that the character was not alphabetic, then it is checked to see if it is numeric in step 320. If it is determined to be numeric, then at step 322 digits are copied from the place that the pointer points until the maximum number of characters are reached. The maximum number of characters for the first position is seven minus the number of characters stored in step 310 if any characters were stored in step 310, and six if there were not any characters before point of mismatch.

Figure 8D:
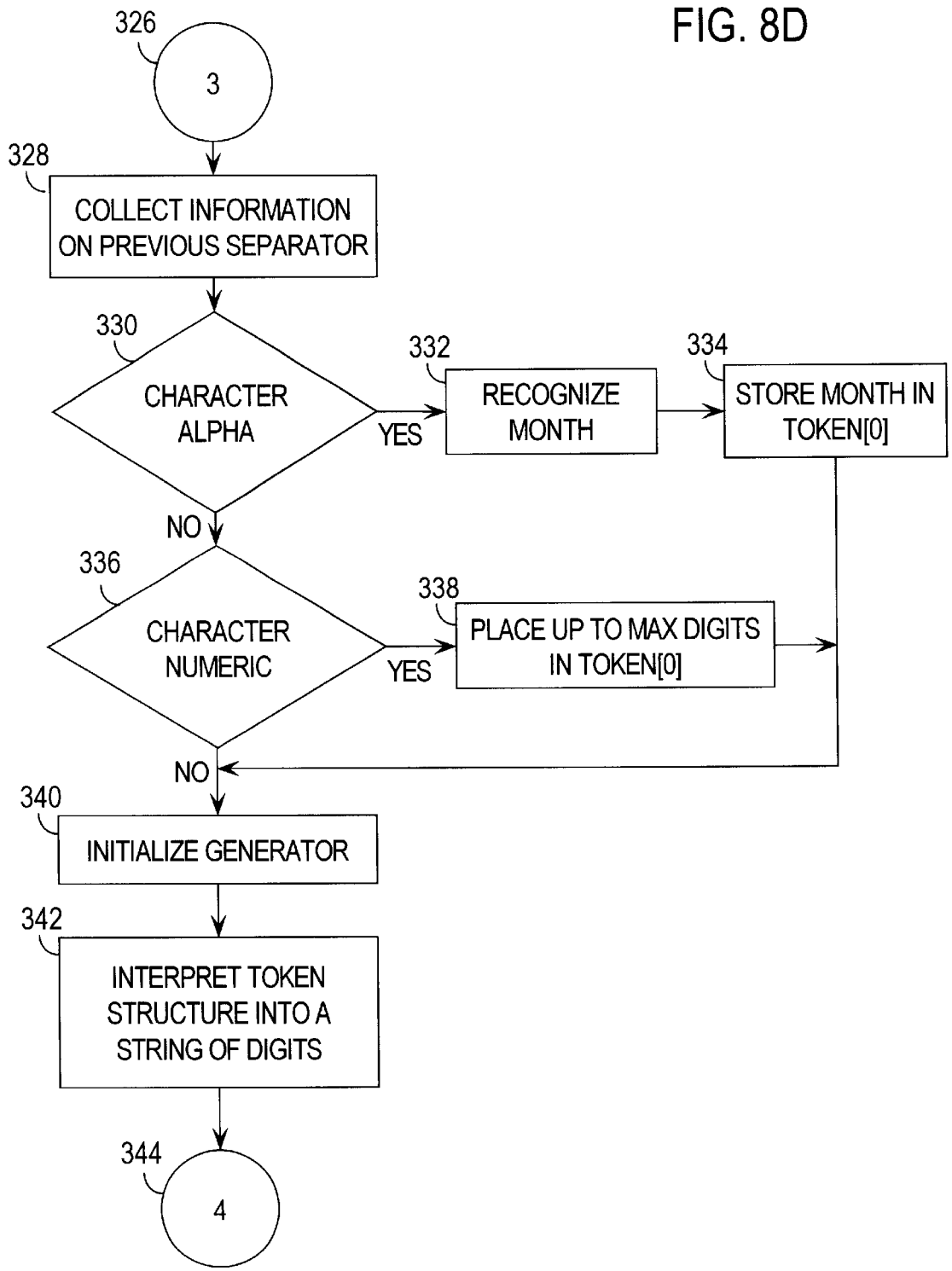
FIG. 8D illustrates the parsing step and is a continuation of FIG. 8C.
Figure 8E:
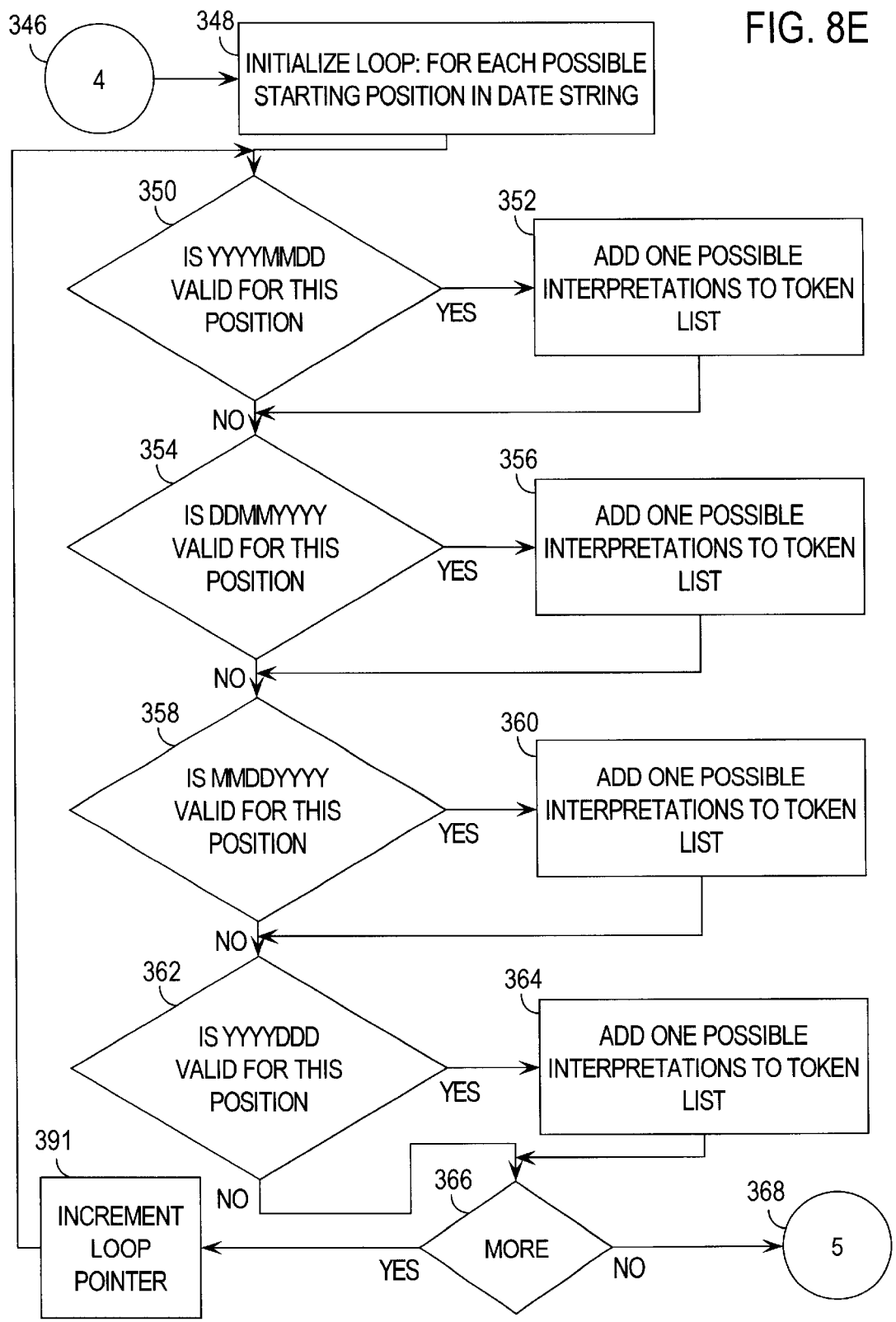
FIG. 8E illustrates the parsing step and is a continuation of FIG. 8D.
Figure 8F:
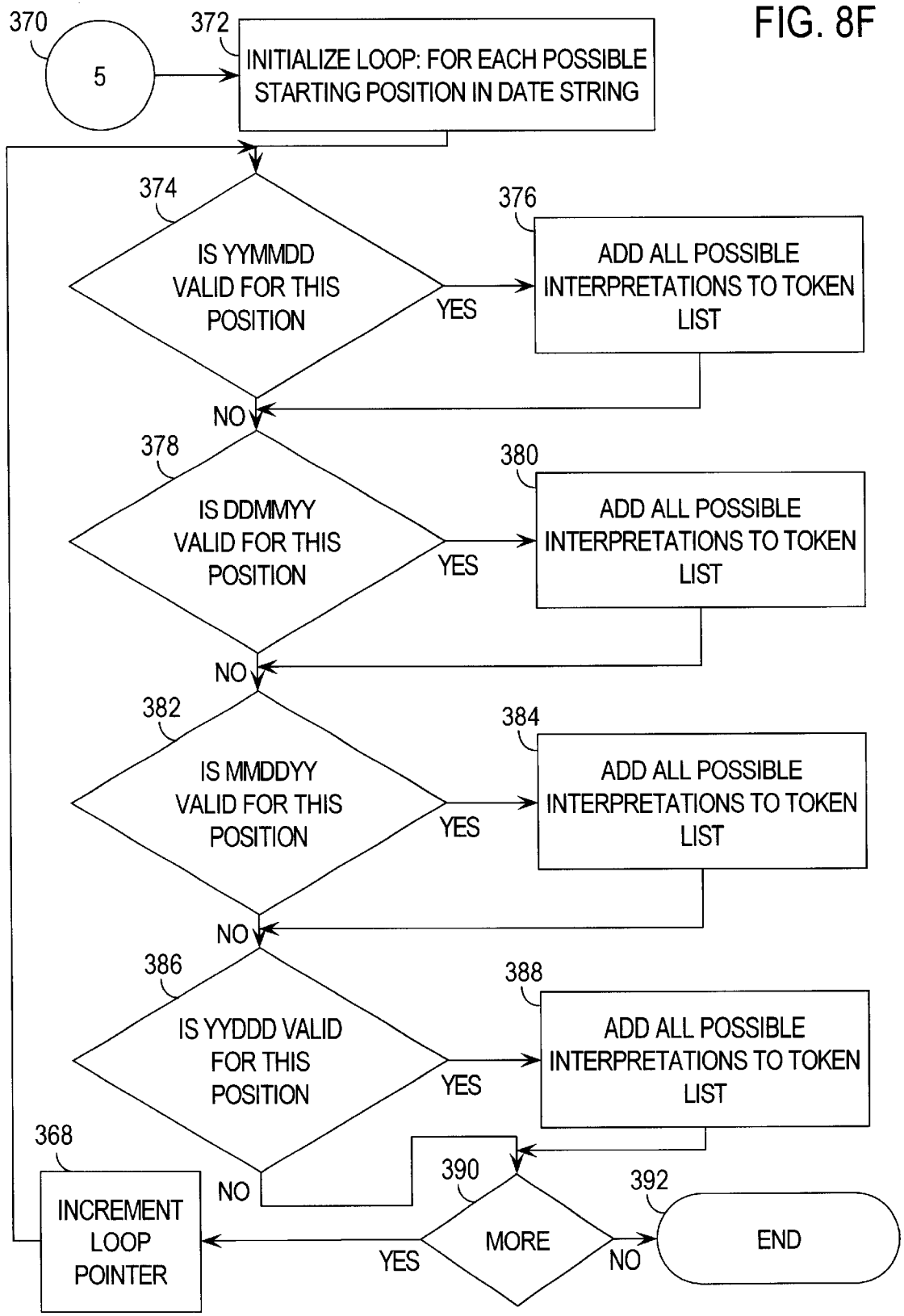
FIG. 8F illustrates the parsing step and is a continuation of FIG. 8E.

Under any conditions, processing continues at step 328 (FIG. 8D), as indicated by the connection ("3") and off-page connector 324 and off-page connector 326 in FIG. 8D. At step 328, the pointer is advanced toward the front of the token past any spaces, periods (following a character month) and commas checking for a slash, dash or period (following a numeric) which is stored at position zero for future use. At 328, this skipping continues until the next alphanumeric is encountered.

Processing continues at step 330 where it is checked if the current character is an alphabetic character. If it is an alphabetic character, then at step 332 the characters are attempted to be interpreted as a month. At step 334, the numeric interpretation of the month is stored in the structure at position zero.

If step 330 determined that the character was not alphabetic, then it is checked to see if it is numeric in step 336. If it is determined to be numeric, then at step 338 digits are copied from the place that the pointer points until the maximum number of characters are reached. The maximum number of characters for position zero is seven minus the number of characters stored in step 310 (FIG. 8C) minus the number of character stored in the first position or six minus the number of characters stored in the first position if there were not any characters stored in step 310 (FIG. 8C).

At step 340, certain internal constants in the generator are initialized as listed in the microfiche appendix function "generate_dates". The structure of the token is changed to a string of digits in step 342. The effect of this conversion to a string is that no matter what the source of the token which could have contained separators or character months, could have been unpacked, packed or binary format, this is converted to a common format. Other methods to generate date tokens from characters in a file will be apparent to persons skilled in the art of file processing after being taught the material in the present invention. Processing continues at step 348 (FIG. 8E) as indicated by the connection ("4") and the off-page connector 344 and a off-page connector 346 in FIG. 8E. At step 348 a loop is initialized which starts at the beginning of the string created in step 342 (FIG. 8D) and continues for each byte ending at the identified mismatch character.

At step 350, the characters starting at the loop pointer are checked to see if the format "YYYYMMDD" is valid. In other words, are the first four positions reasonable for years (the year 5302 is not reasonable, years should probably fall in the range 1800–2099), the next two positions are reasonable for months (this is, they vary from 01 to 12) and the final two digits are between 01 and 31 (or less for certain months that don't have 31 days in the month). If there is a flag indicating certain digits resulted from conversion of a character month, those bytes align with the fifth and sixth byte (as that is where the mask indicates the months are). The final requirement is that the string include the point of mismatch. If step 350 determines that the format is valid, that single date is added to a list of dates in step 352. A date with a four digit year has only one possible interpretation when the format has been specified. All dates added to this list of dates are added in a common format regardless of the initial format of the date, so that they are able to be easily compared later in processing.

At step 354, the characters starting at the loop pointer are checked to see if the format "DDMMYYYY" is valid. As in step 350, the days, months and years must all be reasonable. If month digits resulted from the conversion of a character month, the month digits must be in the third and fourth positions. The final requirement is that the string include the point of mismatch. If step 354 determines that the format is valid, that single date is added to a list of dates in step 356.

At step 358, the characters starting at the loop pointer are checked to see if the format "MMDDYYYY" is valid. As in step 350, the days, months and years must all be reasonable. If month digits resulted from the conversion of a character month, the month digits must be in the first and second positions. The final criterion is that the string include the point of mismatch. If step 358 determines that the format is valid, that single date is added to a list of dates in step 360.

At step 362, the characters starting at the loop pointer are checked to see if the format "DDDYYYY" is valid. As in step 350, the days and years must all be reasonable. None of the digits could have resulted from the conversion of a character month. Here, reasonable days are 1–365 for nonleap years and 1–366 for leap years. The final requirement is that the string include the point of mismatch. If step 362 determines that the format is valid, that single date is added to a list of dates in step 364.

At step 366, it is checked whether the point of mismatch is after the loop pointer. If so, the loop pointer is moved to the next position in step 367 and processing continues at step 350, in the same manner as described above. If the two pointers are equal, then processing continues at step 372 (FIG. 8F) as indicated by the connector ("5") and the off-page connector 368 and an off-page connector 370 in FIG. 8F. As was done in step 348 (FIG. 8E), a loop pointer is initialized in step 372 to the start of the string created in step 342 (FIG. 8D). The pointer will be incremented through the loop until it passes the identified mismatch character as the loop is executed.

At step 374, the characters starting at the loop pointer are checked to see if the format "YYMMDD" is valid. Valid means the same thing it did in step 350 (FIG. 8E), except there is now no limit on what digits are correct for the year (as long as they are actual digits). As in step 350 (FIG. 8E), the days and months must be reasonable. If month digits resulted from the conversion of a character month, the month digits must be in the third and fourth positions. The final requirement is that the string include the point of mismatch. If step 374 determines that the format is valid, all interpretations of that single date are added to a list of dates in step 376. Since the century digits have not been specified, the century could be 18xx, 19xx or 20xx. Therefore, three dates will typically be generated for the pattern considered valid in step 374, unless the user has specified that all dates with two digit years are to be considered to fall in a specific range through command line parameters. It is generally advisable for users to specify explicitly what range two digit dates will be interpreted to fall within. By specifying this, the comparison process will be as tight as if the user specified four digit years. The three ranges the dates fall in are 1800–1899, 1900–1999 and 2000–2099.

At step 378, the characters starting at the loop pointer are checked to see if the format "DDMMYY" is valid. "Valid" means the same thing it did in step 374. As in step 374 (FIG. 8E), the days and months must be reasonable. If step 378 determines that the format is valid, in step 380 three dates will typically be generated for the pattern, unless the user has specified that all dates with two digit years are to be considered to fall in a specific range. If not otherwise specified, the three default ranges the dates fall in are 1800–1899, 1900–1999 and 2000–2099.

At step 382, the characters starting at the loop pointer are checked to see if the format "MMDDYY" is valid. Valid means the same thing it did in step 374. As in step 374, the days and months must be reasonable. If step 382 determines that the format is valid, in step 384 three dates will typically be generated for the pattern, unless the user has specified that all dates with two digit years are to be considered to fall in a specific range through command line parameters. If not otherwise specified, the three default ranges the dates fall in are 1800–1899, 1900–1999 and 2000–2099.

At step 386, the characters starting at the loop pointer are checked to see if the format "YYDDD" is valid. As in step 374, the days must be reasonable (i.e. in the range 1–365 or 1–366, depending on whether it was a leap year or not). None of the digits could have resulted from the conversion of a character month. If step 386 determines that the format is valid, in step 388 three dates will typically be generated for the pattern, unless the user has specified that all dates with two digit years are to be considered to fall in a specific range through command line parameters. The three default ranges the dates fall in are 1800–1899, 1900–1999 and 2000–2099.

Figure 11A:
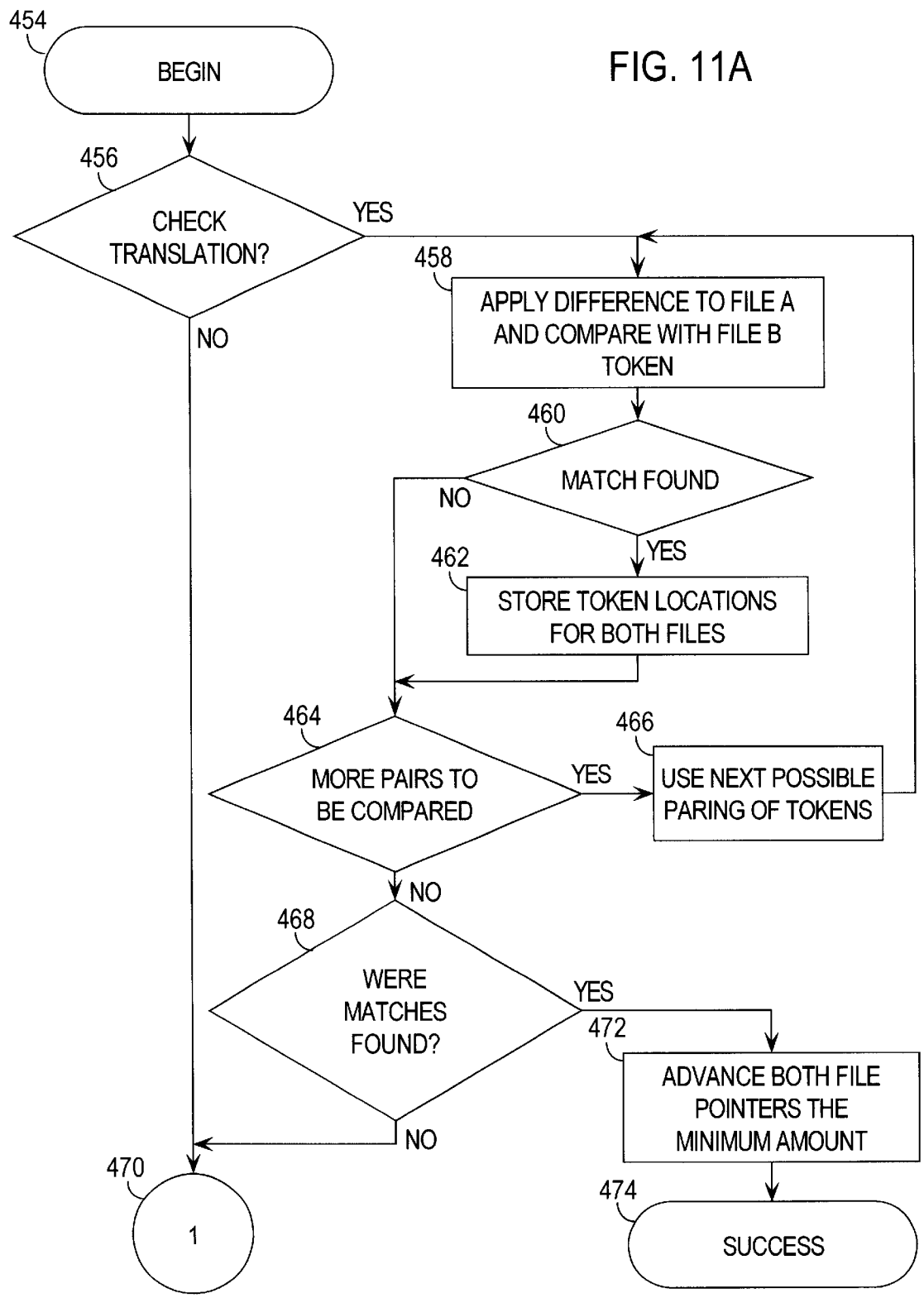
FIG. 11A illustrates an alternative group comparison or reconciliation step.
Figure 11B:
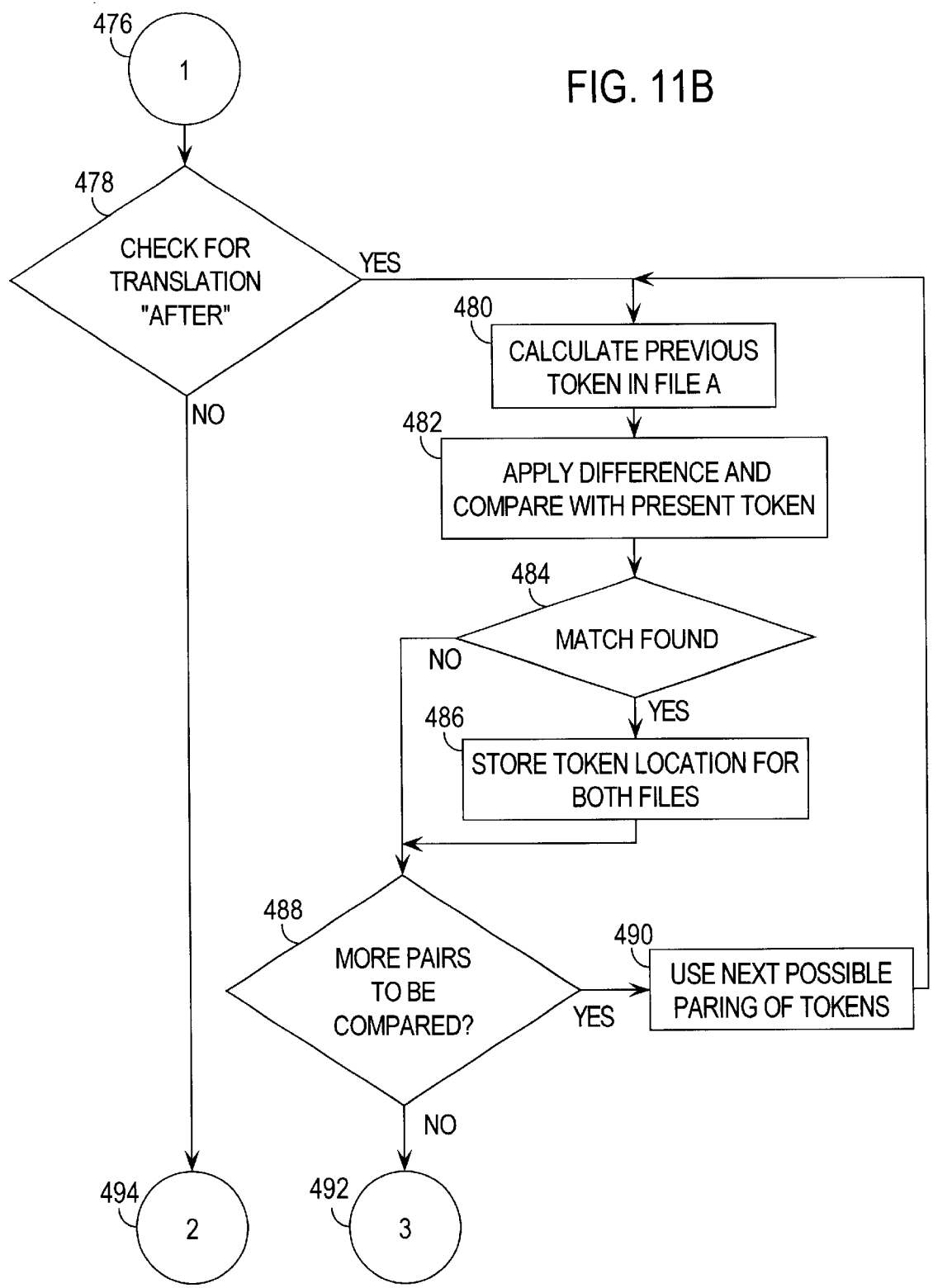
FIG. 11B illustrates the alternative group comparison or reconciliation step and is a continuation of FIG. 11A.

At step 390, it is checked whether the point of mismatch is after the loop pointer, then at step 391, the loop pointer is moved to the next position and processing continues at step 374, in the same manner as described above. If the two pointers are equal, then processing continues at step 392. At step 392, process continues at the step which called this procedure 116 (FIG. 5), 396 (FIG. 9A), 408 (FIG. 9A), 426 (FIG. 9B), 480 (FIG. 11B), 514 (FIG. 11C), 556 (FIG. 11E), 582 (FIG. 11F), 804 (FIG. 11G) and 828 (FIG. 11H).

Figure 9A:
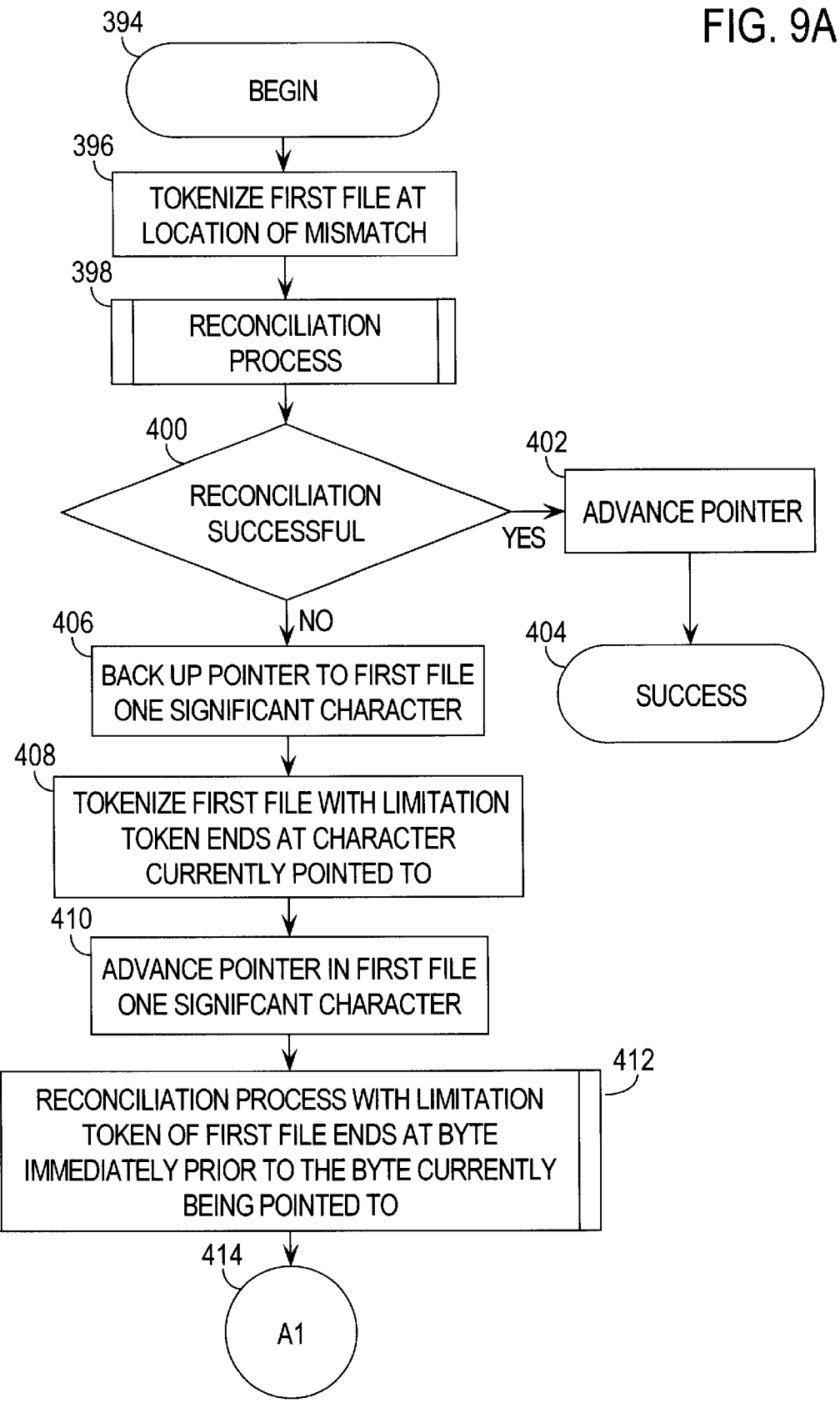
FIG. 9A illustrates the combined parsing and group comparison steps.

The method that, as stated above, is performed at step 120 (FIG. 5) is illustrated in FIG. 9A and begins at step 394. At step 396 data items read from the first file at the location of mismatch are parsed into a set of possible tokens or tokenized. This process is described above in further detail. Each token in the set represents a parsing of a group of data items in accordance with one of the possible date formats described above. At step 398 a reconciliation process, which is described in further detail below, is performed to determine whether the token matches a token in the second file at the location of mismatch. If it is determined at step 400 that the tokens match, i.e., that the reconciliation was successful, then at step 402 a pointer in at least one file is advanced. At step 404 processing returns to step 120 (FIG. 5) and continues as described above with regard to FIG. 5. A file pointer, as persons skilled in the art will understand, points to a location in a file and facilitates reading and writing data items to and from the file. Because the use of file pointers is well-understood by such persons, manipulation of the file pointers with respect to the two files is described only to such extent as may be useful for understanding the invention; further details of file pointer manipulation and other programming-related concerns that are within the knowledge of persons skilled in the art are omitted for purposes of clarity.

If it is determined at step 400 that the tokens do not match, then at step 406 the pointer in the first file is temporarily moved back one significant character. That is, the pointer is preferably moved back to the first character that is not a space or tab. The reason for this is there is a possibility that the current pointer in one file is pointing just past a token which had multiple possible interpretations with varying ending points. As will be explained below, the interpretation causing the pointer to move the shortest distance is always selected first. This approach will sometimes leave a token in one file pointing one character past the end of a token and the other file in the middle of the token. To solve the problem, the file which is past the end of the token must be backed up one significant character so that the token can be used to compare with the other file. At step 408 bytes read from the first file at the current pointer position are parsed into a group of possible tokens or tokenized. The group of bytes tokenized ends at the character to which the file pointer then points and its length is dependent on the formats valid for that data. At step 410 the pointer in the first file is advanced one significant character to reverse the temporary nature of step 406. At step 412 the same reconciliation process as performed at step 398 is performed to determine whether the token group from the first file matches a token in the second file at the location of mismatch. As indicated by the connection ("A1") between an off-page connector 414 and an off-page connector 416 in FIG. 9B, processing continues at step 418. If it is determined at step 418 that the tokens match, i.e., that the reconciliation was successful, then at step 420 a pointer in the second file is advanced to the end of the token. At step 422 processing returns to step 120 (FIG. 5) and continues as described above with regard to FIG. 5.

If it is determined at step 418 that the tokens do not match, then at step 424 the pointer in the second file is temporarily moved back one significant character in the same manner as was done for step 406. At step 426 bytes read from the second file at the current pointer position are parsed into a group of possible tokens or tokenized. The group of bytes tokenized ends at the character to which the file pointer then points and its length is dependent on the formats valid for that data. At step 428 the same reconciliation process as performed at step 398 and 412 is performed to determine whether the token group from the second file matches a token in the first file at the location of mismatch.

If it is determined at step 430 that the tokens match, i.e., that the reconciliation was successful, then at step 432 the pointer in the first file is advanced to the end of the token, and the pointer in the second file is advanced one significant character to reverse the temporary moving of the token pointer in step 424. At step 434 processing returns to step 120 (FIG. 5) and continues as described above with regard to FIG. 5. If it is determined at step 430 that the tokens do not match, i.e., that the reconciliation was not successful, then at step 436 processing returns to step 120 (FIG. 5) and continues as described above with regard to FIG. 5.

Figure 9B:
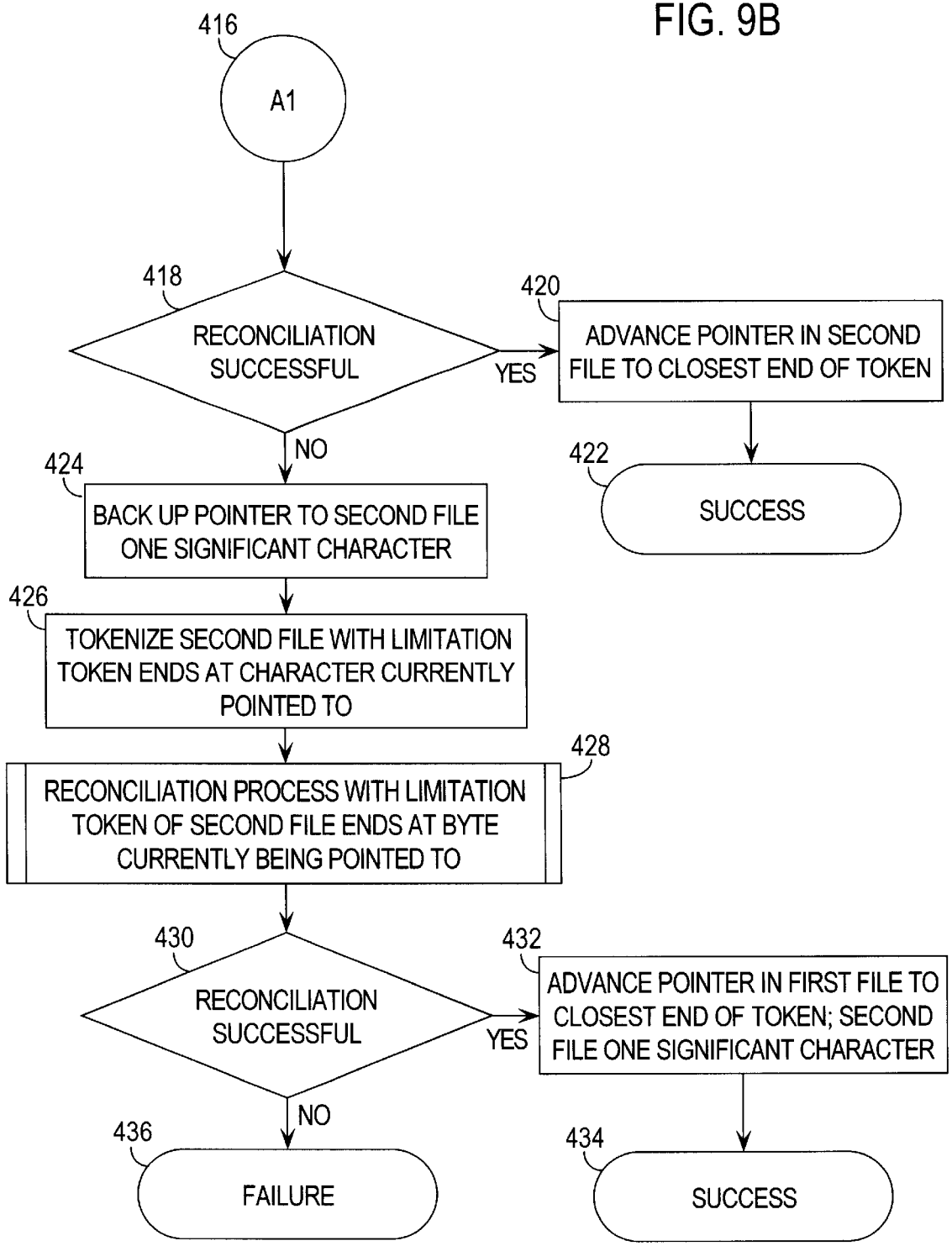
FIG. 9B illustrates the combined parsing and group comparison steps and is a continuation of FIG. 9A.
Figure 10:
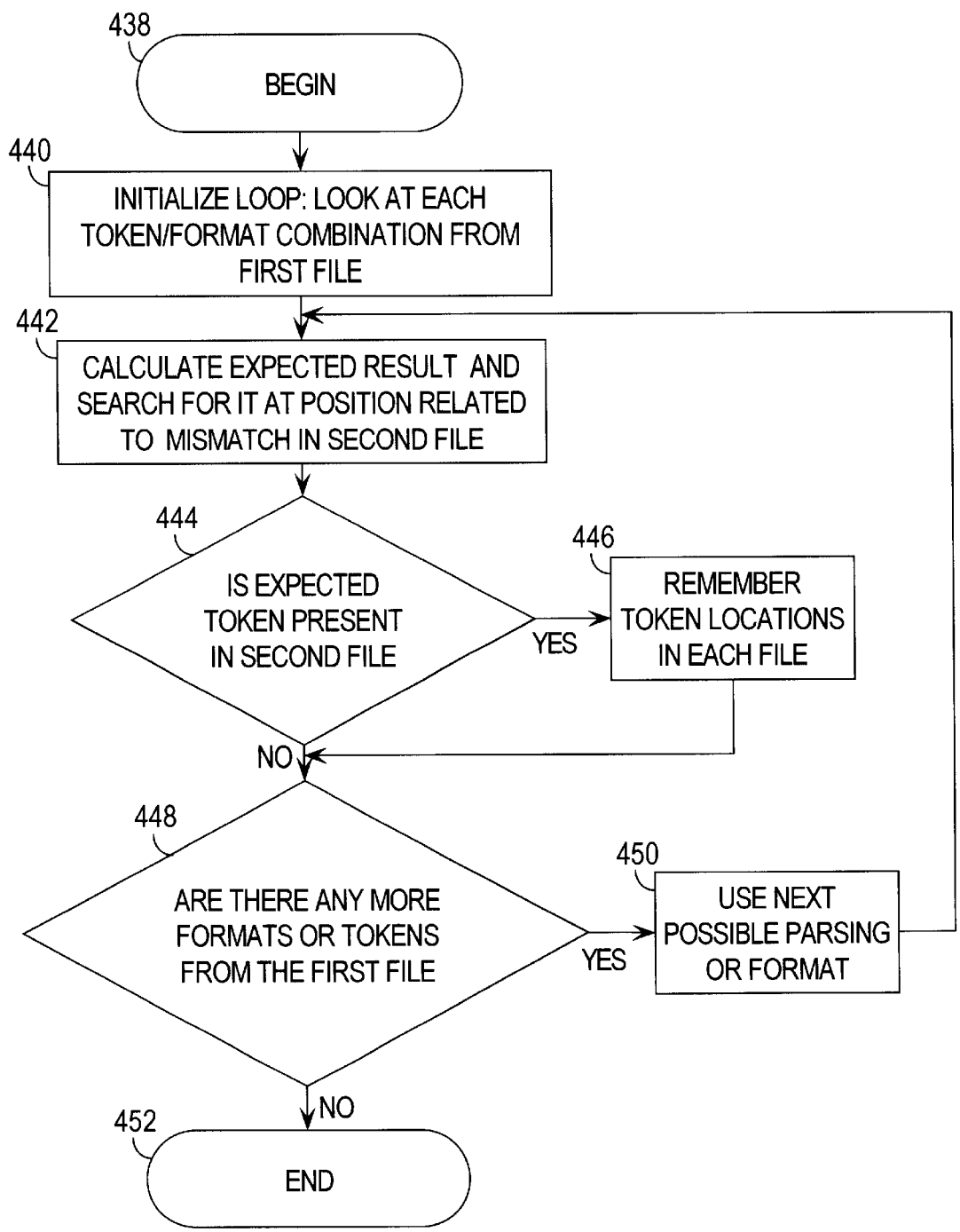
FIG. 10 illustrates the group comparison or reconciliation step.

An exemplary reconciliation process is illustrated in FIG. 10 beginning at step 438. Step 440 indicates that a loop or iterative process is begun, in which each token of the set obtained from the first file at step 396, 408 or 426 (FIGS. 9A–9B) is checked for a secondary relation with the characters appearing in the second file. On each iteration through the loop, the string corresponding to the token from the first file is generated and checked to see if it is present in the second file. Thus, at step 442, a string is generated based upon the current token, the expected difference between the files and the current format specified by the loop. For example, suppose the token from the first file is the equivalent of Dec. 12, 1998, and the expected difference is eleven days, and the format to be applied is MM/DD/YY. The resulting string would be 12/23/98. Generally, the rule will be that all dates will match the format of the date in the first file or the format of the date in the first file with century digits added. At step 444 it is determined whether the resulting string matches the second file. If a match is detected at step 444, then at step 446 the dates represented by the tokens and their locations in the first and second files are stored for later analysis to determine how far to advance the pointer. At step 448, it is determined if all possible combinations of tokens from the first file and formats from the list of pre-determined formats have been examined. Typically, the list of pre-determined formats will merely be a rule that the same format as the input is used for the output. Sometimes even this can cause several attempts to be generated. For example, if the input format was <May> <space> 15 <comma> <space> 1996, and the date equivalent of the resulting string after adding the expected difference is Jan. 15, 2000, the output format to be any of the following <Jan> <period> <space> 15 <comma> <space> 2000, <Jan> <space> 15 <comma> <space> 2000, <January> <space>15 <comma> <space> 2000, or something else. If no more token/format combinations are to be generated, then at step 452 processing returns to the one of steps 398, 412 and 428 (FIGS. 9A–B) that called the reconciliation process and continues as described above with regard to FIGS. 9A–B. If there is another token/format combination available that has not yet been generated, processing proceeds to step 450. Step 450 indicates that on the next iteration through the loop the next set of tokens parsed from the second file is parsed in accordance with another possible date format. Thus, processing continues at step 442 as described above, with a new date format or a new current token selected from the set of tokens obtained from the first file, and a new expected date is generated by applying the predetermined expected difference to the token and formatting it according to the specified format. Finally, the second file is checked for the presence of the bytes predicted. It may be a typical expectation in step 442 that the format of the second file will exactly match the format of the first file.

A reconciliation process that is an alternative to that illustrated in FIG. 10 and described above is illustrated in FIGS. 11A–J. As in the reconciliation process described above, this alternative reconciliation process can be called at step 398, 412 or 428 (FIGS. 9A–B). The alternative reconciliation process in FIGS. 11A–J is more general and powerful than that in FIG. 10. This alternative reconciliation process can be included in embodiments of the invention in which a token obtained from a location in the first file is compared to a token obtained from a different, i.e., non-corresponding, location in the second file. For example, such an embodiment can be used for comparing two files that include currency equivalents rather than dates. Referring briefly to FIGS. 12, 13, 14, 15, 16, 17 and 18 an exemplary file 636 in FIG. 12 includes monetary amounts 638, 640 and 642 embedded in text 644. FIG. 12 also contains an interfering digit 643 which is immediately adjacent to a monetary amount 642. The presence of an interfering digit makes a monetary amount appear to be a different number. In this case, monetary amount 642 appears to be "7300.00" rather than "300.00". It may be desirable to modify a program which creates file 636 (FIG. 12) to create an output file containing two different currency amounts. In other words, to handle the case where two different currencies are used locally, then be able to automatically compare the two files. All the possibilities where the two corresponding currency values appear adjacent to each other are shown in FIGS. 13, 14, 15, 16, 17 and 18. Note, if the goal is to strictly compare currency values, it may be possible to have the file reader step 130 (FIG. 6) preprocess all characters other than numbers and the local decimal character into white space, as the flow chart shows it did for tabs. Then, even if text is added to identify different currencies, the numbers will still appear immediately adjacent to each other as shown in FIGS. 13, 14, 15, 16, 17 and 18, but without most of the text 644. There may still be some occasional numbers present that were scattered in text 644 and a few of those may be interfering digits, such as interfering digit 643. File 636, contains monetary amounts 638 ("125.50"), 640 ("240.0"), and 642 ("300.00") are expressed in one country's or region's currency and, as illustrated by FIG. 13, these amounts may be converted into monetary amounts 646 ("62.75"), 648 ("120.00") and 650 ("150.00") expressed in a different country's or region's currency. The converted file 652 also contains the remaining text 644 that matches file 636. For example, monetary amount 638 that is converted may be expressed in U.S. dollars, and the corresponding converted amount 646 may be expressed in Euros. (The conversion rate in this example is two dollars per Euro and is, of course, merely exemplary.) In this example with regard to FIGS. 12–18, the conversion rate is 2.0 or 0.5 depending upon the direction of conversion, e.g., dollars to Euros or Euros to dollars. As FIG. 13 illustrates, the converted amounts 646, 648 and 650 can be written in file 652 immediately after monetary amounts 638, 640 and 642 that are converted. Equivalently, in FIG. 15, the file 656 is written with the converted amounts 646, 648 and 650 immediately before the monetary amounts 638, 640 and 642. Similarly, as FIG. 14 illustrates with regard to an alternative output file 654, the converted amounts 646, 648 and 650 can be written in file 654 immediately under or beneath monetary amount 638, 640 and 642 that are converted. Equivalently, in FIG. 17, the file 658 is written with the converted amounts 646, 648 and 650 immediately above the monetary amounts 638, 640 and 642. As FIG. 16 illustrates, there is an additional way for the converted amounts 646, 648 and 650 to appear above monetary amounts 638, 640 and 642. In this case, the converted amount is substituted for the corresponding monetary amount in the text 644 in file 657, then the monetary amounts are placed below the corresponding converted amounts. Finally, FIG. 18 illustrates the same substitution as FIG. 16, except that the monetary amounts 638, 640 and 642 appear above the corresponding converted amounts in file 659. Indeed, the amounts converted and the corresponding converted amounts can be written in any suitable relation to one another. This relation is thus predetermined or known to the user of the software of the present invention and can be input as a parameter selected by the user. Alternatively, the predetermined relation can be hard-coded into the software by the programmer who writes it and not selectable by the user. Alternatively, the computer can try each possible predetermined relation until the computer finds one which works. If the computer tries these possible predetermined relations one would probably try nine possible sets FIG. 13, FIG. 14, FIG. 15, FIG. 16, FIGS. 13 and 14, FIGS. 15 and 16, FIG. 17, FIG. 18, FIGS. 13 and 18, and FIGS. 15 and 17.

FIGS. 12–18 also illustrate that the difference between a quantity in a first file and a corresponding quantity in a second file may be multiplicative. In other words, for example, a monetary amount in a first file may differ from a corresponding monetary amount in a second file by a currency conversion factor or conversion rate.

Returning to FIG. 11A, the alternative reconciliation method begins at step 454. At step 456 it is determined whether to check if the predetermined relation between the amounts converted and the corresponding converted amounts is that the each converted amount in the second file or output file occupies the location occupied by the corresponding amount converted in the first file or input file. In other words, in addition to converted amounts being before the corresponding amounts converted, after the corresponding amounts converted, above the corresponding amounts converted, or below the corresponding amounts converted, they may take the place of the corresponding amounts converted. As in the method described above with regard to FIG. 10, a loop or iterative process is begun, in which each token of the set obtained from the first file at step 396, 408 or 426 (FIGS. 9A–B) is compared to a token of a set obtained from the second file. On each iteration through the loop, different sets of tokens from the second file in accordance with another possible monetary format and compared to a ("current") token of the set obtained from the first file. Steps 456, 478 (FIG. 11B), 506 (FIG. 11C), 552 (FIG. 11E), 578 (FIG. 11F), 802 (FIG. 11G) and 826 (FIG. 11H) are software switches which may be externally controlled by user parameters, hard coded in the program, or otherwise activated by means obvious to persons skilled in the are of programming. Thus, the initial time step 458 is encountered the difference between the first token from the first file and the first token from the second file is compared with the expected difference. At step 460 it is determined whether there was a match between the calculated difference and the expected difference calculated in step 458. Unless otherwise specified throughout this document, "file A" will be used interchangeably with the "first file" and "file B" will be used inerchangeably with the "second file". If a match is detected at step 460, then at step 462 the dates represented by the tokens and their locations in the first and second files are stored for later use in steps 468 and 472. Either way, at step 464 it is determined whether all possible combinations of the tokens from the set obtained from the first file have been matched with the tokens from the set obtained from the second file. If there is another token combination from the pair of files that has not yet been compared, processing proceeds to step 466. Step 466 indicates that on the next iteration through the loop the next unique combination of tokens from each file is used as the first and second file tokens. This time in step 458, the difference between the current token from the first file and the current token from the second file is compared with the expected difference and the loop continues as described above. Monetary formats are parsed a manner analogous to date formats. That is, a group of bytes is parsed into a token in accordance with each of a number of possible formats. For exampe, in the format prevalent in the United States, the separator between groups of thousands is the comma character (",") and the separator between the whole and fractional portions of an amount is the point character ("."). In contrast, in the format prevalent in Europe, the separator between groups of thousands is the point character, and the separator between the whole and fractional portions of an amount is the comma character. Also, a new current token is selected from the set of tokens obtained from the first file, and a new expected converted amount is determined. When referring to different boundaries, if there are no delimiters around the token the program will have to try different possible combinations of where the token begins or ends. It is necessary to have the ability to compare multiple tokens in this process, because of the possibility of interfering digits such as 643 in FIG. 13. Digits immediately adjacent to monetary amounts can cause the boundary of a monetary amount to be improperly determined, causing the failure of a comparison. For example, in FIG. 13 interfering digit 643 would cause monetary amount 642 to be interpreted as 7300.00 rather than 300.00. The comparison with 650 would fail because of the interfering digit. Therefore, a looping structure for the comparison process is required to find the correct boundaries of a monetary amount.

When it is determined at step 464 that no more tokens are to be compared, then at step 468 it is determined whether any matches were detected. If one or more matches were detected, then at step 472 the pointers in both the first and second files are advanced the minimum amount. The minimum amount is determined by looking at each file independently for the ending positions stored in step 462 and choosing the one that advances the file's pointer the least.

One additional character is advanced to put the cursor just past the end of the date rather than on the last character of the date. At step 474 processing returns to the one of steps 398, 412 and 428 (FIGS. 9A–B) that called the reconciliation process and continues as described above with regard to FIGS. 9A–B. If no matches were detected, then processing continues at step 478 (FIG. 11B), as indicated by the connection ("1") between an off-page connector 470 and an off-page connector 476 in FIG. 11B. Alternatively, flow could have reached step 478 by the switch in 456 not having been set to check for a straight translation.

At step 478 it is determined whether the predetermined relation between the amounts converted and the corresponding converted amounts is that the each converted amount in the first file is after or follows the corresponding amount converted. This is the condition illustrated by the first file being as shown in FIG. 12 and the second file being as shown in FIG. 13. Note that in this configuration, monetary amount 638 from FIG. 12 matched monetary amount 638 from FIG. 13 when doing the comparison at step 112 in FIG. 5. As the computer reaches this point in the program, it is comparing a character past the end of monetary amount 638 in FIG. 13 with a character past monetary amount 638 in FIG. 12 and a mismatch has been discovered. As in the method described above with regard to FIGS. 10 and 11A, a loop or iterative process is begun, in which each token of the set obtained from the first file at step 396, 408 or 426 (FIGS. 9A–B) is compared to a token of a set obtained during execution of this loop. On each iteration through the loop, tokens are parsed from the token immediately prior to the current token in either file in accordance with another possible monetary format or boundary and compared to a ("current") token of the set obtained from the first file. Note, that since the data matched from the token immediately prior to the current token in the first file, the same data is available from either file, specifically, from monetary amount 638 in FIG. 12 or FIG. 13. Thus, at step 480 a token from the set immediately prior to the current token from either file is calculated. At step 482 the difference between the first token from the first file and the first token from the second file is compared with the expected difference. At step 484 it is determined whether the token comparison from step 482 matched the expected difference. If a match is detected at step 484, then at step 486 the locations in the first and second files are stored for future use, such as in step 502. Either way, at step 488 it is determined whether all possible tokens pairs have been compared between the current token in the first file and the previous token in one of the files. If there is another unique combination of token pairs that has not yet been compared, processing proceeds to step 490. Step 490 indicates that on the next iteration through the loop the next combination of two tokens selected to be compared. Processing continues at step 480 as described above, with the next token combination being used.

Figure 11C:
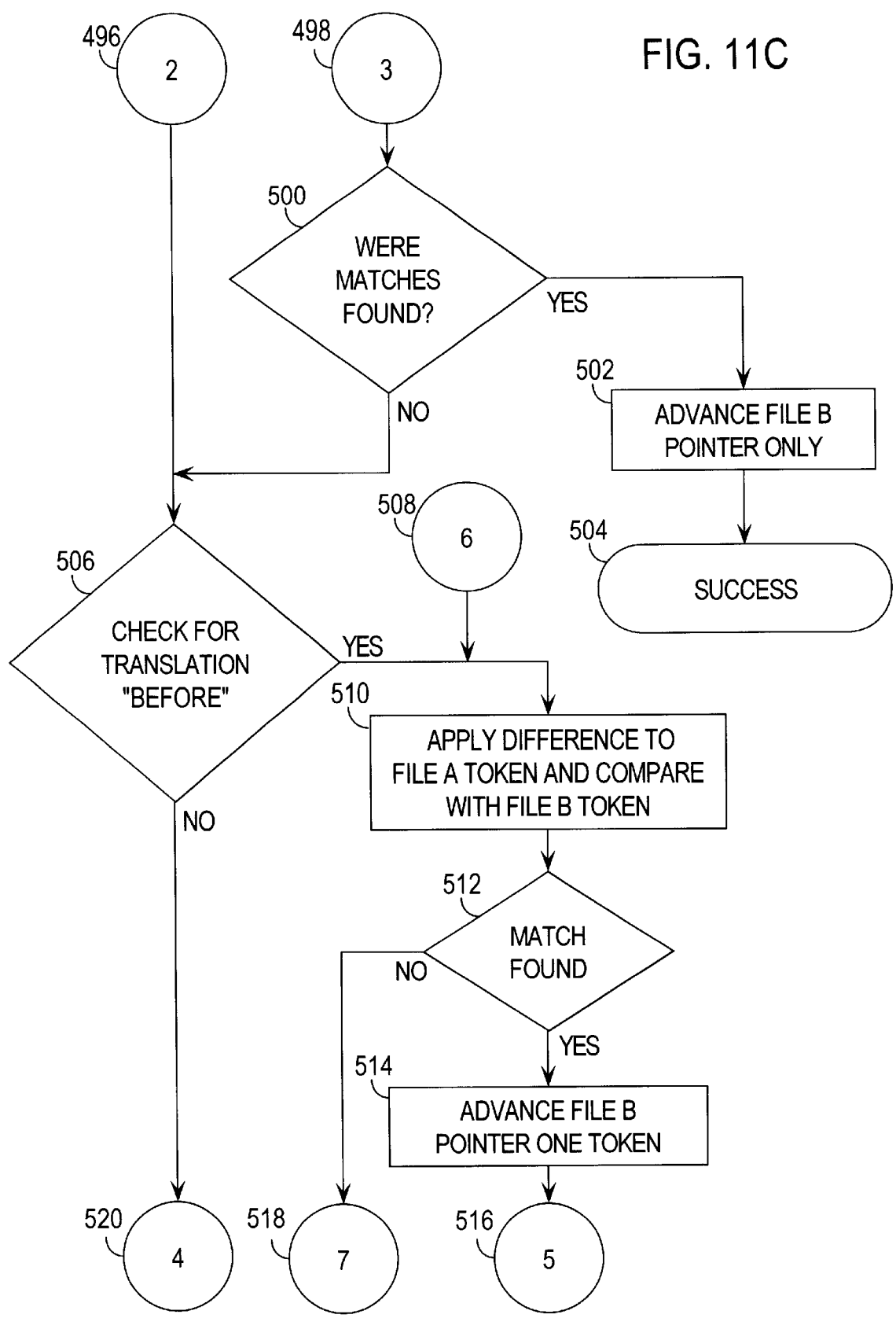
FIG. 11C illustrates the alternative group comparison or reconciliation step and is a continuation of FIG. 11B.
Figure 11D:
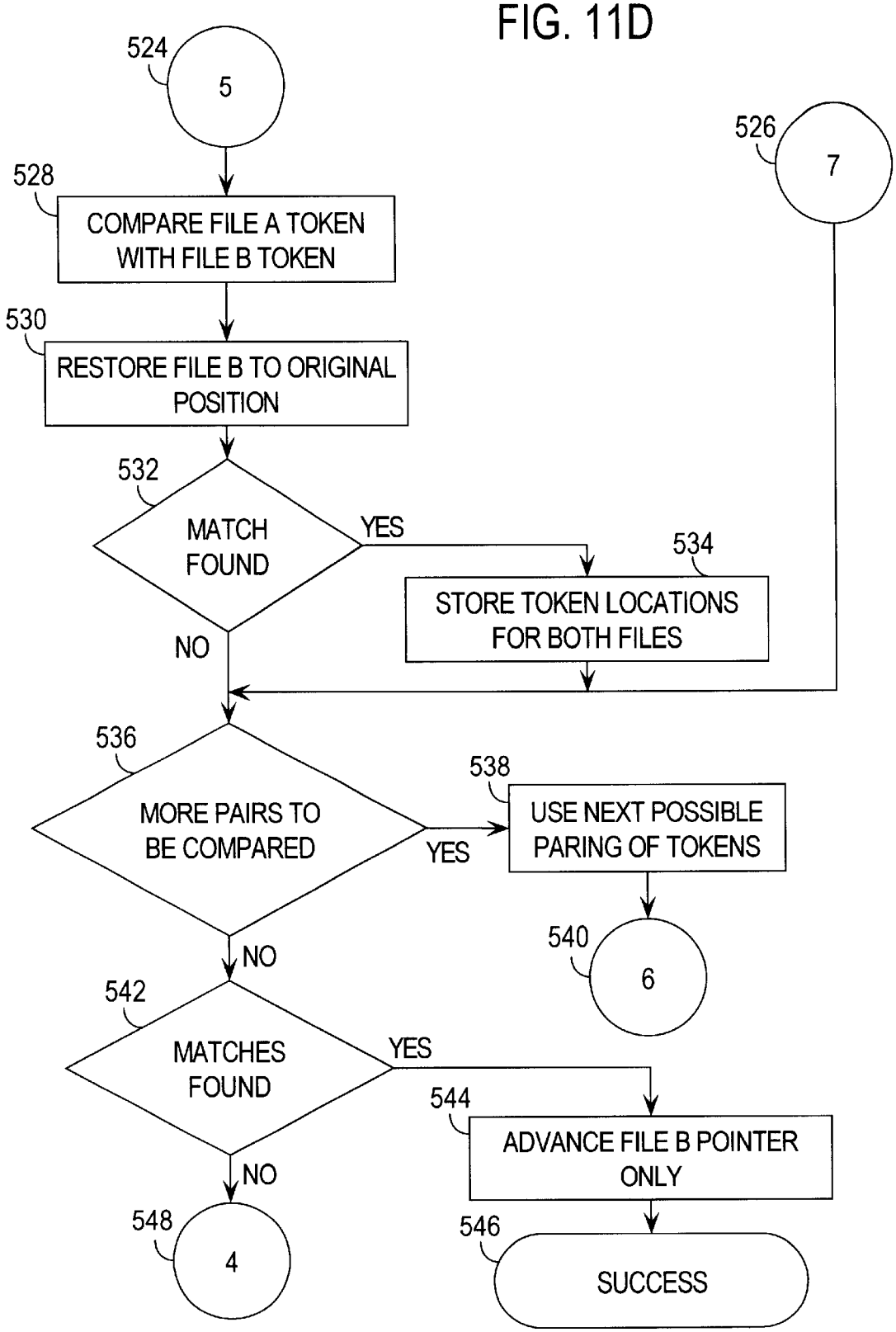
FIG. 11D illustrates the alternative group comparison or reconciliation step and is a continuation of FIG. 11C.

When it is determined at step 488 that no more unique token pairs are to be compared, then processing continues at step 500 (FIG. 11C), as indicated by the connection ("3") between an off-page connector 492 and an off-page connector 498 in FIG. 11C. At step 500 it is determined whether any matches were detected. If matches were detected, then at step 502 the pointer in the second file only is advanced just beyond the end of the characters representing the token which requires the pointer to move the shortest distance. At step 504 processing returns to the one of steps 398, 412 and 428 (FIGS. 9A–B) that called the reconciliation process and continues as described above with regard to FIGS. 9A–B.

If at step 478 (FIG. 11B), it was determined that the software switch was not set to check for the type of file structure shown in FIGS. 12 and 13, then flow continues to step 506, as indicated by the connection ("2") between an off-page connector 494 (FIG. 11B) and an off-page connector 496 in FIG. 11C. Alternatively, flow could have reached step 506 by not having found any matches in step 500. At step 506 it is determined whether the software switches specify checking for a predetermined relation between the amounts converted and the corresponding converted amounts is that the each converted amount in the second file is before or precedes the corresponding amount converted. As in the method described above with regard to FIGS. 10, 11A and 11B, a loop or iterative process is begun, in which each token of the set obtained from the first file at step 396, 408 or 426 (FIGS. 9A–B) is compared to a token of a set found at a predetermined relationship to the point of mismatch in either file. On each iteration through the loop, a set of tokens is parsed from the second file in accordance with another possible monetary format and compared to a ("current") token of the set obtained from the first file. It will help to understand the process if one examines the difference between FIG. 12 and FIG. 15. In this discussion, FIG. 12 can be considered "file A" and FIG. 15 can be considered "file B". In this discussion, "file A" and "first file" are used interchangeably. The term "file B" is used interchangeably with "second file". Thus, at step 510 a set of tokens is obtained from the second file by parsing a group of bytes at the location of mismatch. Also at step 510 an expected converted amount is determined in the manner described above with regard to steps 458 (FIG. 11A) and 482 (FIG. 11B). Because the comparison at step 510 is the identical one to that performed at step 458 (FIG. 11A), one would normally turn off the software switch that would activate at step 456 (FIG. 11A), the software switch 506 in FIG. 11C is active, as a match will never be found as a result of step 510 that would not have been found earlier. At step 512, the results of the comparison at step 510 is checked. If no match is found in step 512, then processing continues at step 536 (FIG. 11D) as indicated by the off-page connection ("7") between off-page connector 518 and a off-page connector 526 in FIG. 11D, as described below. If a match is detected at step 512, then at step 514 the pointer in the second file is temporarily advanced to the end of the token. Processing continues at step 528 (FIG. 11D), as indicated by the connection ("5") between an off-page connector 516 and an off-page connector 524 in FIG. 11D. Then, at step 528 the first file token is compared to the second file token. At step 530, the first file pointer is restored to its original position to undo the temporary of advancing of its pointer in step 514 (FIG. 11C). At step 532, the results of the comparison performed in step 528 is checked. If a match is detected at step 532, then at step 534, the then current locations for both files are stored in a list of tokens for future use, such as in step 544. At step 536, it is determined if there are any more combinations of tokens which have not been checked in the loop initiated at step 510 (FIG. 11C). If there are more tokens pairs to be compared as determined in step 536, then, at step 538, the next possible paring is selected for use in the loop and processing continues at step 510 (FIG. 11C) as indicated by the connection ("6") between off-page connector 540 and an off-page connector 508 in FIG. 11C. When there are no more pairs as determined by step 536, processing continues to step 542. At step 542, it is checked if step 534 had found any matches during execution of the loop. If matches were found, then at step 544, the second file's pointer is advanced. At step 546 processing returns to the one of steps 398, 412 and 428 (FIGS. 9A–B) that called the reconciliation process and continues as described above with regard to FIGS. 9A–B. If at step 542, it is determined that no matches were found, then processing continues at step 552 (FIG. 11E), as indicated by the connection ("4") between an off-page connector 548 and an off-page connector 550 in FIG. 11E.

Figure 11E:
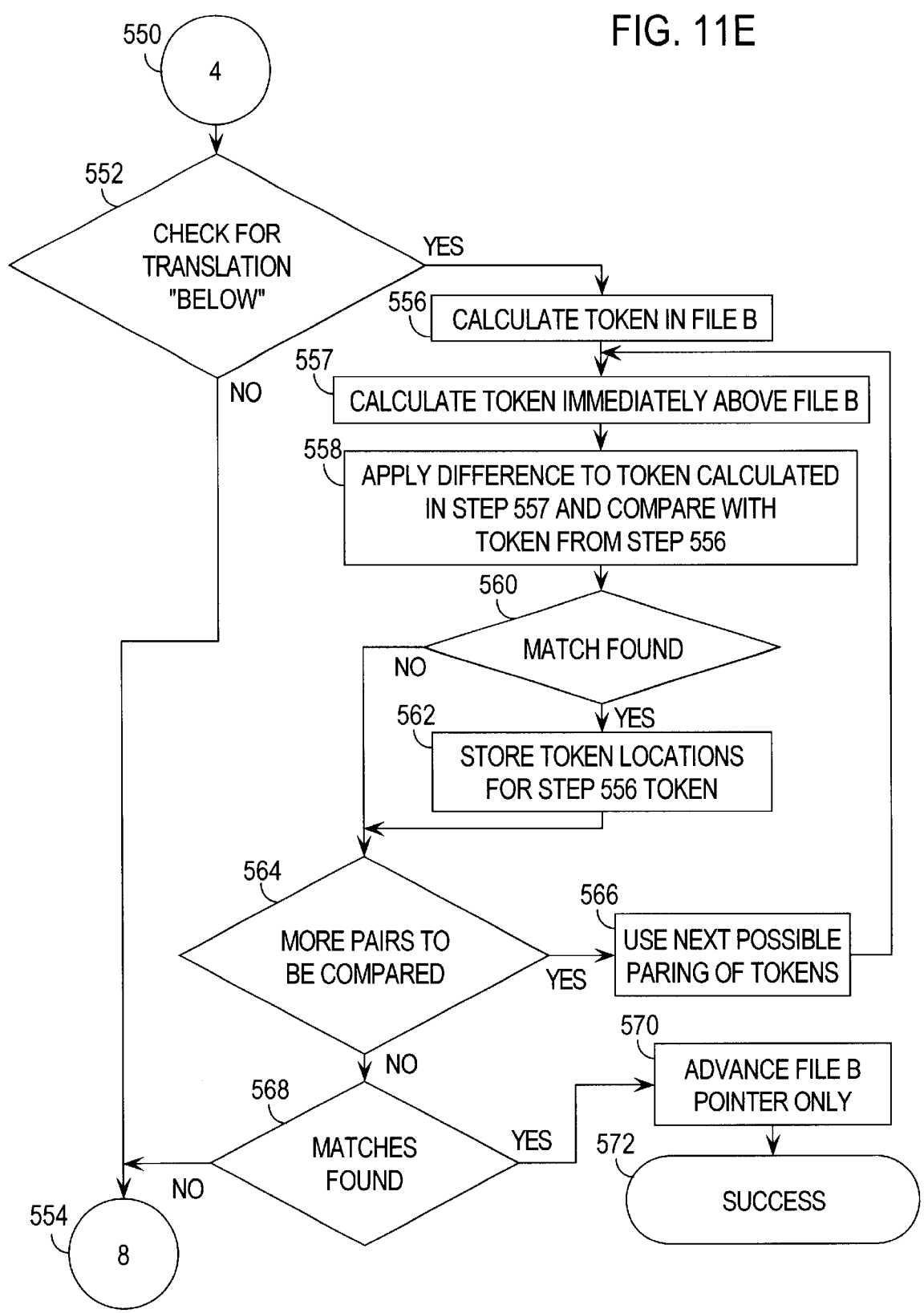
FIG. 11E illustrates the alternative group comparison or reconciliation step and is a continuation of FIG. 11D.
Figure 11F:
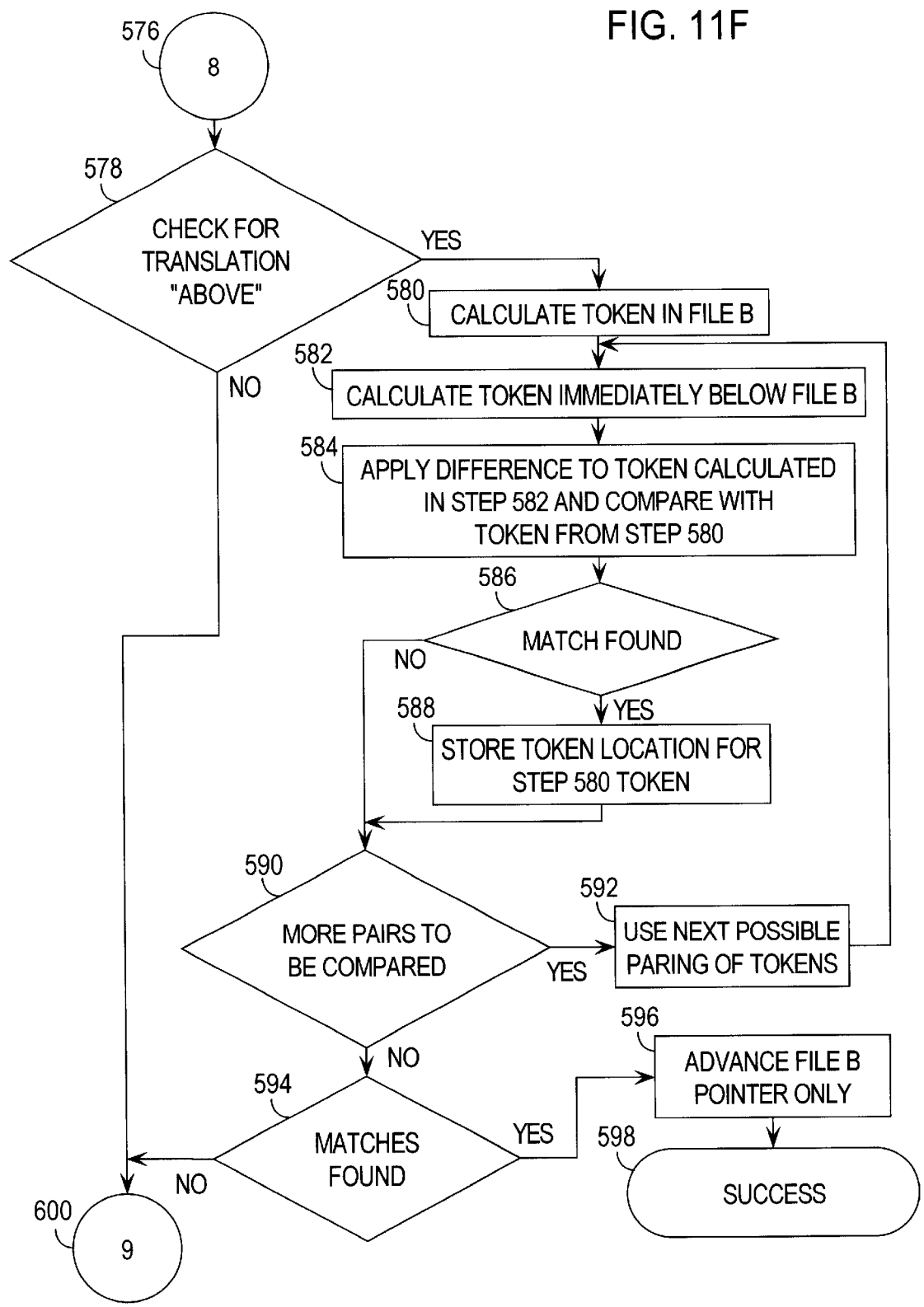
FIG. 11F illustrates the alternative group comparison or reconciliation step and is a continuation of FIG. 11E.
Figure 11G:
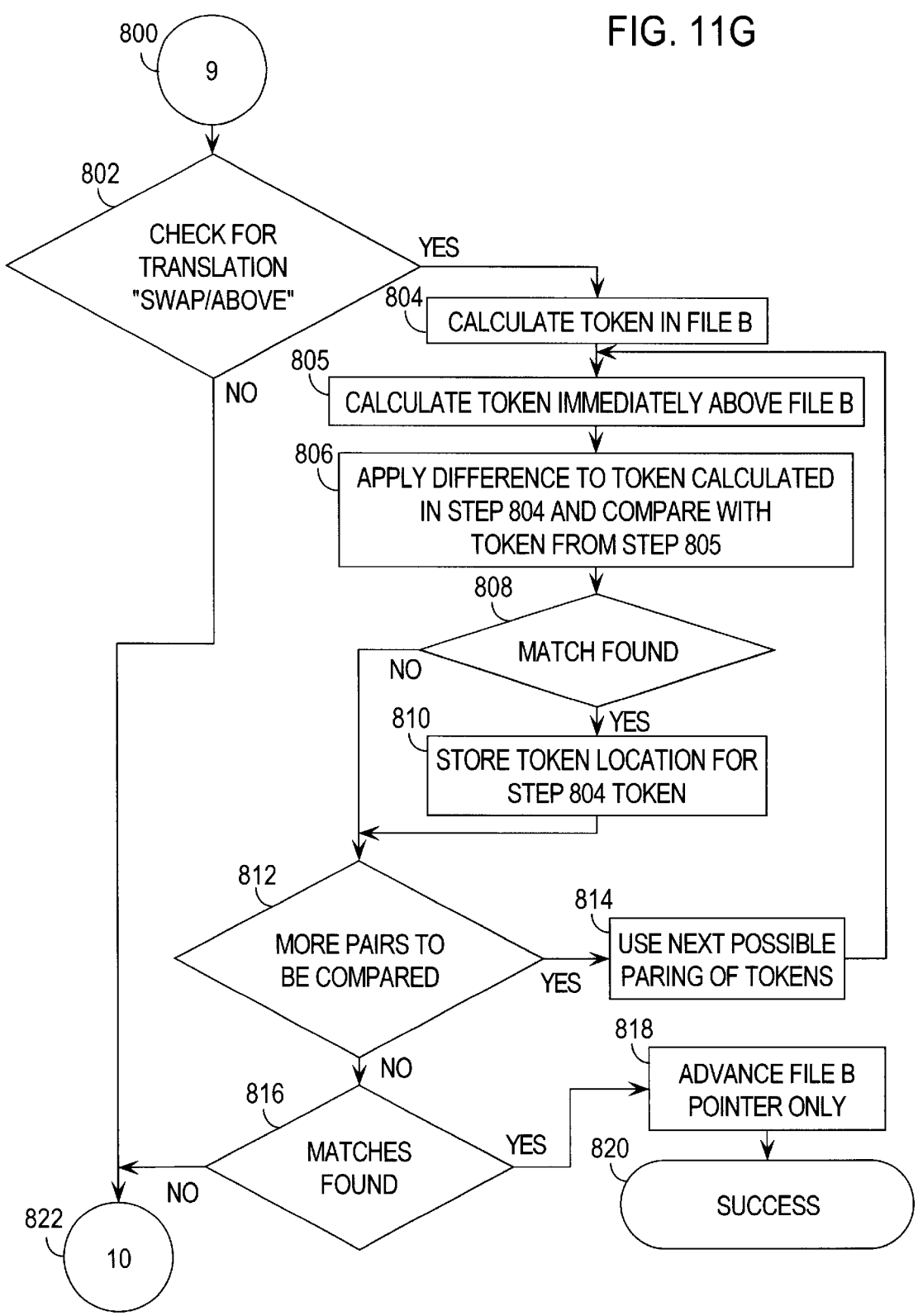
FIG. 11G illustrates the alternative group comparison or reconciliation step and is a continuation of FIG. 11F.
Figure 11H:
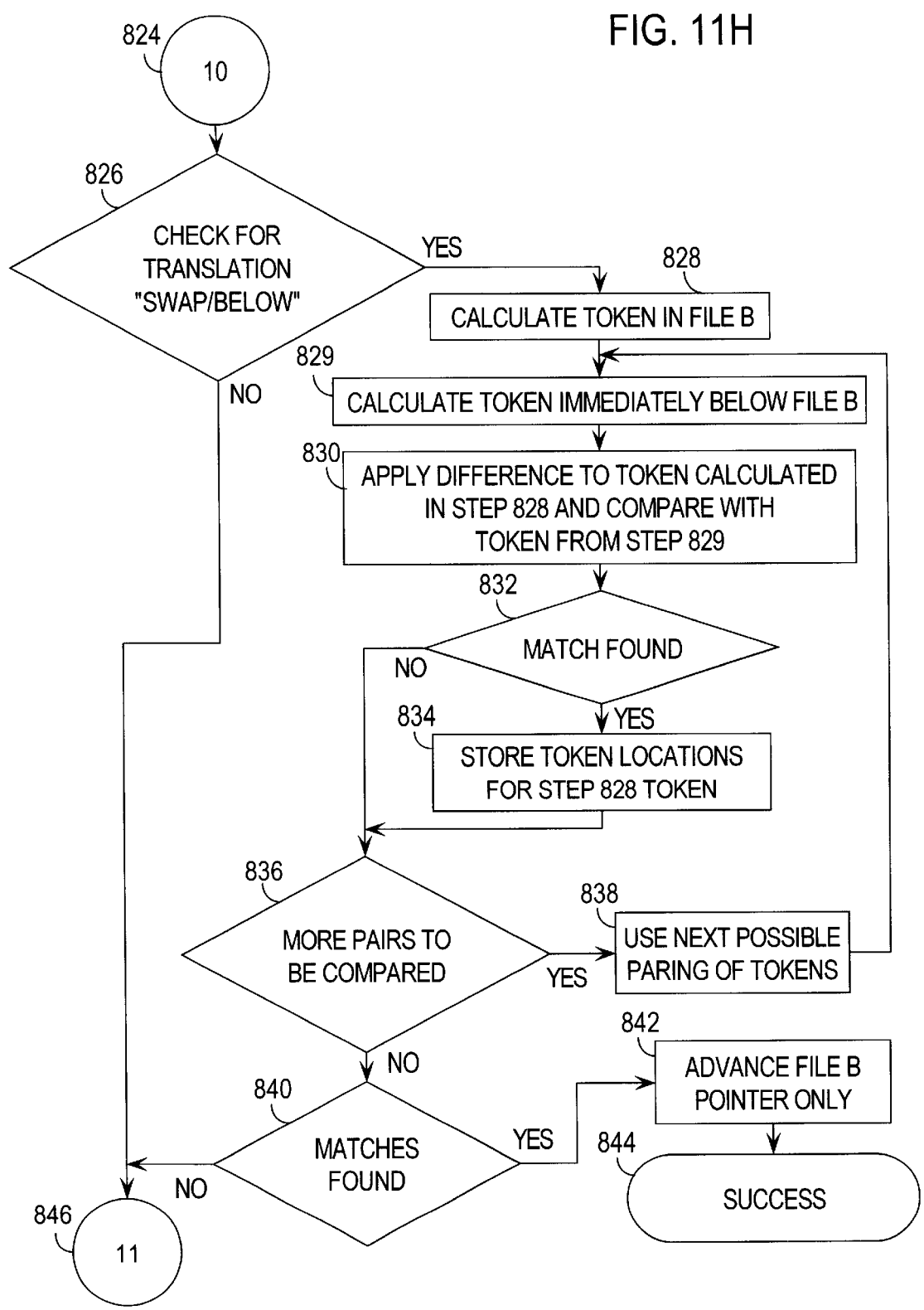
FIG. 11H illustrates the alternative group comparison or reconciliation step and is a continuation of FIG. 11G.
Figure 11I:
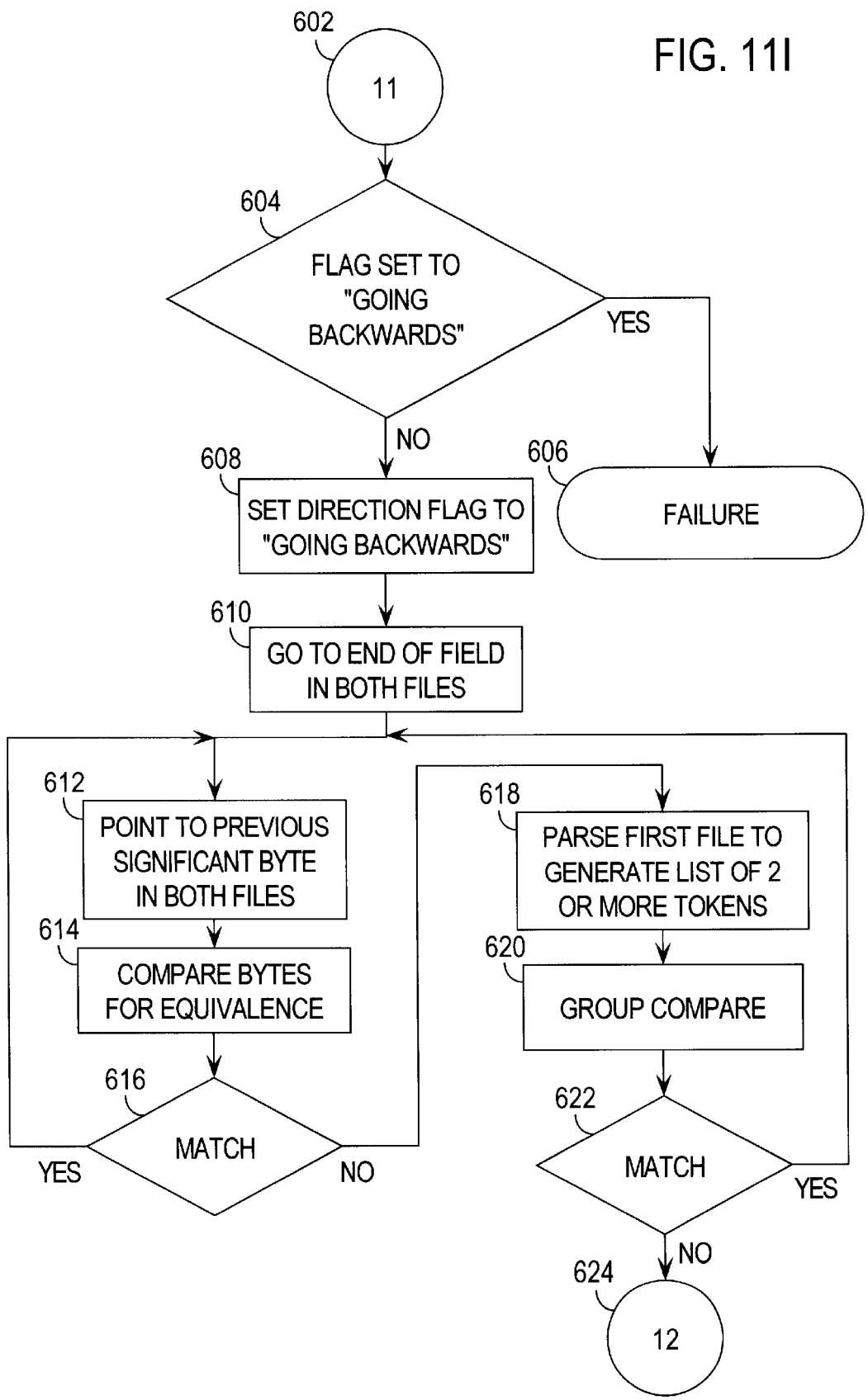
FIG. 11I illustrates the alternative group comparison or reconciliation step and is a continuation of FIG. 11H.
Figure 11J:
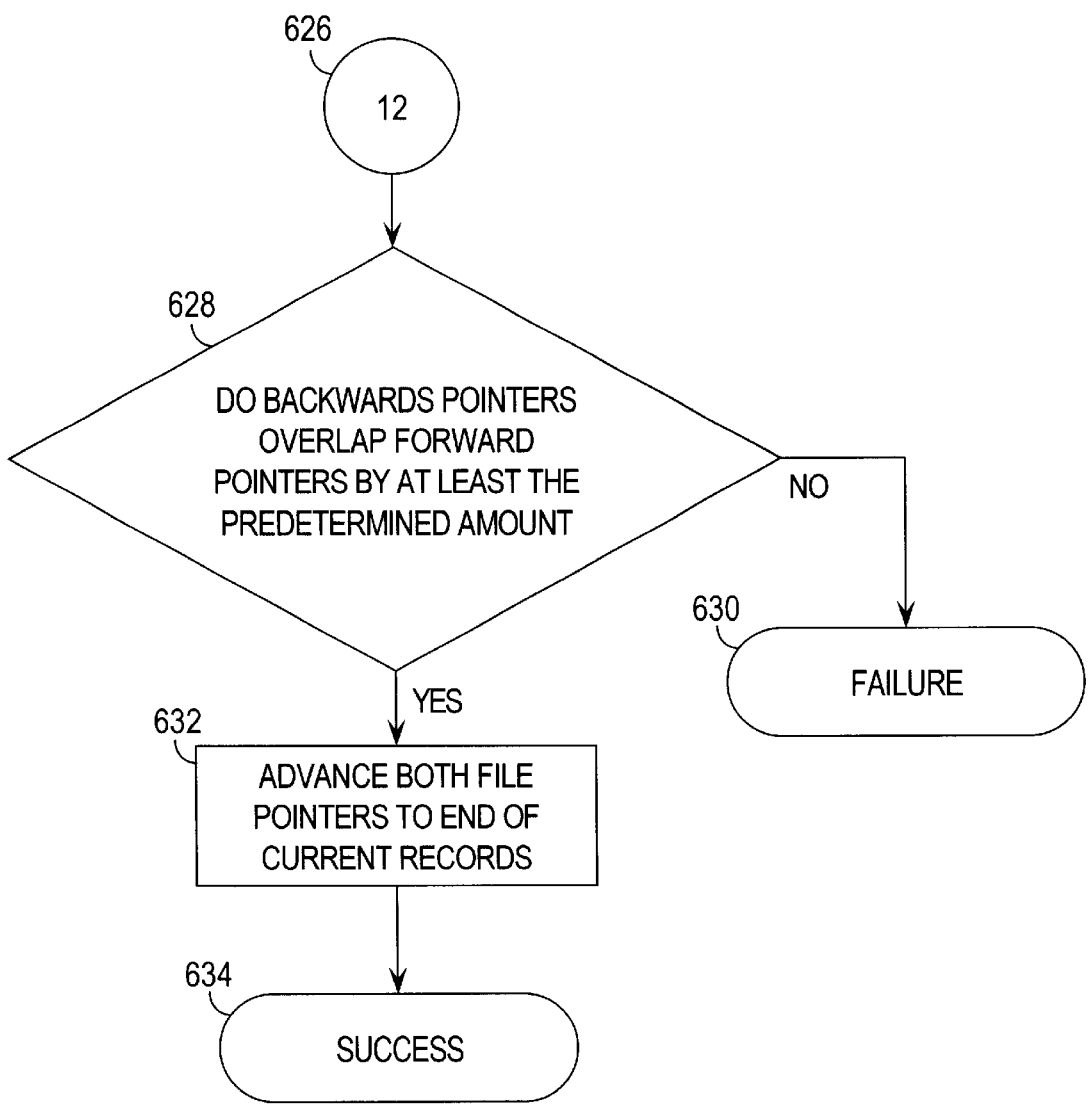
FIG. 11J illustrates the alternative group comparison or reconciliation step and is a continuation of FIG. 11I.

If, at step 506 (FIG. 11C), the software switch was not set to check for such processing, then processing continues at step 552 in FIG. 11E as indicated by the connection ("4") between off-page connector 520 (FIG. 11C) and off-page connector 550.

At step 552 it is determined whether the predetermined relation between the amounts converted and the corresponding converted amounts is that the each converted amount in the second file is on the line immediately following or below the corresponding amount converted, as in the example illustrated in FIGS. 12 and 14. File A and first file will be used interchangeably in this discussion. File B and second file will be used interchangeably. File A is illustrated in FIG. 12 and File B is illustrated in FIG. 14. As in the method described above with regard to FIGS. 10 and 11A–D, a loop or iterative process is begun, in which each token of the set obtained from the second file's point of mismatch and is compared to a token of a set obtained from immediately above the second file point of mismatch. Thus, at step 556, the token currently pointed to in the second file is calculated, then at step 557 the token immediately above the second file's point of mismatch is calculated. At step 558 the difference is applied to the token as calculated in step 557 and compared with the token calculated in step 556. At step 560 it is determined whether the token from step 556 matches any token obtained from step 557. If a match is detected at step 560, the locations are stored for future use in step 562. Either way, processing continues at step 564, where it is determined if all possible combinations of tokens from both files have been compared. If it is determined there are more pairs to be compared, then processing continues at step 566. At step 566, the next pair of tokens is selected for use in the next execution of the loop and control passes to the start of the loop at step 556. When step 564 determines there are no more pairs to be compared in the loop, processing continues at step 568. At step 568, it is checked to see if any tokens were added to the list of tokens in step 562. If there were tokens added to the match list, then at step 570, the one which will cause the second file to advance the minimum amount is used to advance the second file in step 570. Then, at step 572 processing returns to the one of steps 398, 412 and 428 (FIGS. 9A–B) that called the reconciliation process and continues as described above with regard to FIGS. 9A–B. If a match is not detected at step 568, then processing continues at step 578 (FIG. 11F), as indicated by the connection ("8") between an off-page connector 554 and an off-page connector 576 in FIG. 11F.

At step 578 it is determined whether the predetermined relation between the amounts converted and the corresponding converted amounts is that the each converted amount in the second file is on the line immediately preceding or above the corresponding amount converted. As in the method described above with regard to FIG. 11E, a loop or iterative process is begun, in which each token of the set obtained from the second file at step 580 is compared to a token of a set obtained from the second file immediately below the current token. The reader will be aided in understanding by considering FIG. 17 a sample of the second file and FIG. 12 a sample of the first file. The term "first file" will be used interchangeably with "File A", as will the term "second file" be used interchangeably with "File B". On each iteration through the loop, a set of tokens is parsed from the second file in accordance with another possible monetary format and compared to a ("current") token of the set obtained from the first file. Thus, at step 580, the current token at the point of mismatch in the second file is calculated. At step 582 the token immediately below the point of mismatch in the second file is calculated. At step 584, the expected difference is applied to the token from step 582 and compared with the token from step 580. At step 586, it is checked if a match is obtained from the comparison at 584. If it was determined at step 586 that a match was found, the boundaries of the token from step 580 is stored in step 588. Either way, processing continues at step 590, where it is checked to see if all possible pairings of the tokens from both locations in the second file have been compared. If not every possible pairing has been compared, then at step 592 the next possible pairing is selected for the next iteration of the loop which starts again at step 582. When it is determined at step 590 that all possible pairings have been tried through the loop, processing continues to step 594. At step 594, it is determined if any tokens were added to the list in step 588. If there were tokens added to the list, then in step 596, the second file is advanced just past the token from the list that causes the pointer to be moved the shortest distance to move past the end of the token. Then, at step 598 processing returns to the one of steps 398, 412 and 428 (FIGS. 9A–B) that called the reconciliation process and continues as described above with regard to FIGS. 9A–B. If a match is not detected at step 594, processing continues at step 802 (FIG. 11G), as indicated by the connector ("9") and the off-page connector 600 and a off-page connector 800 in FIG. 11G.

At step 802 it is determined whether the predetermined relation between the amounts converted and the corresponding converted amounts is that the each converted amount in the second file is on the line immediately preceding or above the corresponding amount converted. As in the method described above with regard to FIGS. 11E and 11F, a loop or iterative process is begun, in which each token of the set obtained from the second file at step 580 is compared to a token of a set obtained from the second file immediately below the current token. The reader will be aided in understanding by considering FIG. 16 a sample of the second file and FIG. 12 a sample of the first file. The term "first file" will be used interchangeably with "File A", as will the term "second file" be used interchangeably with "File B". On each iteration through the loop, a set of tokens is parsed from the second file in accordance with another possible monetary format and compared to a ("current") token of the set obtained from the first file. Thus, at step 804, the current token at the point of mismatch in the second file is calculated. At step 805 the token immediately above the point of mismatch in the second file is calculated. At step 806, the expected difference is applied to the token from step 805 and compared with the token from step 804. At step 808, it is checked if a match is obtained from the comparison at 806. If it was determined at step 808 that a match was found, the boundaries of the token from step 804 is stored in step 810. Either way, processing continues at step 812, where it is checked to see if all possible pairings of the tokens from both locations in the second file have been compared. If not every possible pairing has been compared, then at step 814 the next possible pairing is selected for the next iteration of the loop which starts again at step 805. When it is determined at step 812 that all possible pairings have been tried through the loop, processing continues to step 816. At step 816, it is determined if any tokens were added to the list in step 818. If there were tokens added to the list, then in step

818, the second file is advanced just past the token from the list that causes the pointer to be moved the shortest distance to move past the end of the token. Then, at step 820 processing returns to the one of steps 398, 412 and 428 (FIGS. 9A–B) that called the reconciliation process and continues as described above with regard to FIGS. 9A–B. If a match is not detected at step 816, processing continues at step 826 (FIG. 11H), as indicated by the connector ("10") and the off-page connector 822 and a off-page connector 824 in FIG. 11H.

At step 826 it is determined whether the predetermined relation between the amounts converted and the corresponding converted amounts is that the each converted amount in the second file is on the line immediately below or after the corresponding amount converted. As in the method described above with regard to FIGS. 11E–11G, a loop or iterative process is begun, in which each token of the set obtained from the second file at step 828 is compared to a token of a set obtained from the second file immediately below the current token. The reader will be aided in understanding by considering FIG. 18 a sample of the second file and FIG. 12 a sample of the first file. The term "first file" will be used interchangeably with "File A", as will the term "second file" be used interchangeably with "File B". On each iteration through the loop, a set of tokens is parsed from the second file in accordance with another possible monetary format and compared to a ("current") token of the set obtained from the first file. Thus, at step 828, the current token at the point of mismatch in the second file is calculated. At step 829 the token immediately above the point of mismatch in the second file is calculated. At step 830, the expected difference is applied to the token from step 829 and compared with the token from step 828. At step 832, it is checked if a match is obtained from the comparison at 830. If it was determined at step 832 that a match was found, the boundaries of the token from step 828 is stored in step 834. Either way, processing continues at step 836, where it is checked to see if all possible pairings of the tokens from both locations in the second file have been compared. If not every possible pairing has been compared, then at step 838 the next possible pairing is selected for the next iteration of the loop which starts again at step 829. When it is determined at step 836 that all possible pairings have been tried through the loop, processing continues to step 840. At step 840, it is determined if any tokens were added to the list in step 834. If there were tokens added to the list, then in step 842, the second file is advanced just past the token from the list that causes the pointer to be moved the shortest distance to move past the end of the token. Then, at step 844 processing returns to the one of steps 398, 412 and 428 (FIGS. 9A–B) that called the reconciliation process and continues as described above with regard to FIGS. 9A–B. If a match is not detected at step 836, processing continues at step 604 (FIG. 11I), as indicated by the connector ("11") and the off-page connector 846 and a off-page connector 602 in FIG. 11I.

If program control reaches step 604, all analysis on the file has failed to this point and a different approach has to be applied. Such a situation is shown in FIG. 23 where the comparison process described so far loses the correspondence between dates. A general process for handling this situation is to handle shorter, common, units at one time (such as aligning on record boundaries) and scan that portion of the file both going forward from the start and backwards from the end of the unit. If the resultant coverage overlaps by a sufficient amount (at least equal to a token), the smaller unit can be considered to match. If the unit still lacks coverage, then it will be necessary to find common substrings (of one or more characters) in both files on which an alignment can be performed and scan in both directions from the common substrings. Again, if the resultant coverage all overlaps sufficiently, the record can be declared to be matching even if no single parsing through the record can explain everything.

At step 604, a check is made to see if this point has already been reached. The software code corresponding to these steps can be designed to be recursive, and if it is reached after the backwards flag has been set, then it was not sufficient to just scan the record backwards, and the process fails at step 606. If it is determined that the backwards flag was not set at step 604, then at step 608, the backwards flag is set so that it will be available the next time step 604 is reached. At step 610, a pointer is set to the end of record for each file. This pointer will be advanced toward the beginning of the records as processing is conducted starting from just past the end of both files. At step 612, a process starts that mirrors that in FIG. 5, and each pointer is advanced to the previous byte. At step 614, the bytes are compared for equivalence. If a match is detected, at step 616 processing continues to step 612, and the previous byte is checked from each file. If a match is not detected at step 616, then the bytes in the first file are parsed into tokens in step 618. In step 620, processing continues as described in FIGS. 9A–B to check for group level comparisons. Such group level comparisons are either at the token or record level. At step 622, it is checked whether the checking in step 620 succeeded. If the match was found in step 622, processing continues at step 612 and the next byte is checked from each file. If step 622 revealed that the matching in step 620 failed, then processing continues at step 628 (FIG. 11J) as indicated by the connection ("12") and the off-page connector 624 and an off-page connector 626 in FIG. 11J. At step 628, it is determined whether the pointers from going in the forward direction overlapped the pointers going in the backwards direction a sufficient amount. The sufficient amount is a variable entered by the user as a run-time parameter. For dates, a value of eight is generally sufficient if all dates are expected to be numeric with two separators embedded and two digit years. A value of eight would be expected for the corresponding file with four digit years. The sufficient amount may be different for each file. If the pointers do not overlap by a sufficient value as determined in step 628, then at step 630 processing returns to the one of steps 398, 412 and 428 (FIGS. 9A–B) that called the reconciliation process and continues as described above with regard to FIGS. 9A–B. If the pointers do overlap by the sufficient amount as determined in step 628, then at step 632, both forward pointers are advanced to the end of the record in step 632. At step 634, processing returns to the one of steps 398, 412 and 428 (FIGS. 9A–B) that called the reconciliation process and continues as described above with regard to FIGS. 9A–B.

Figure 26A:
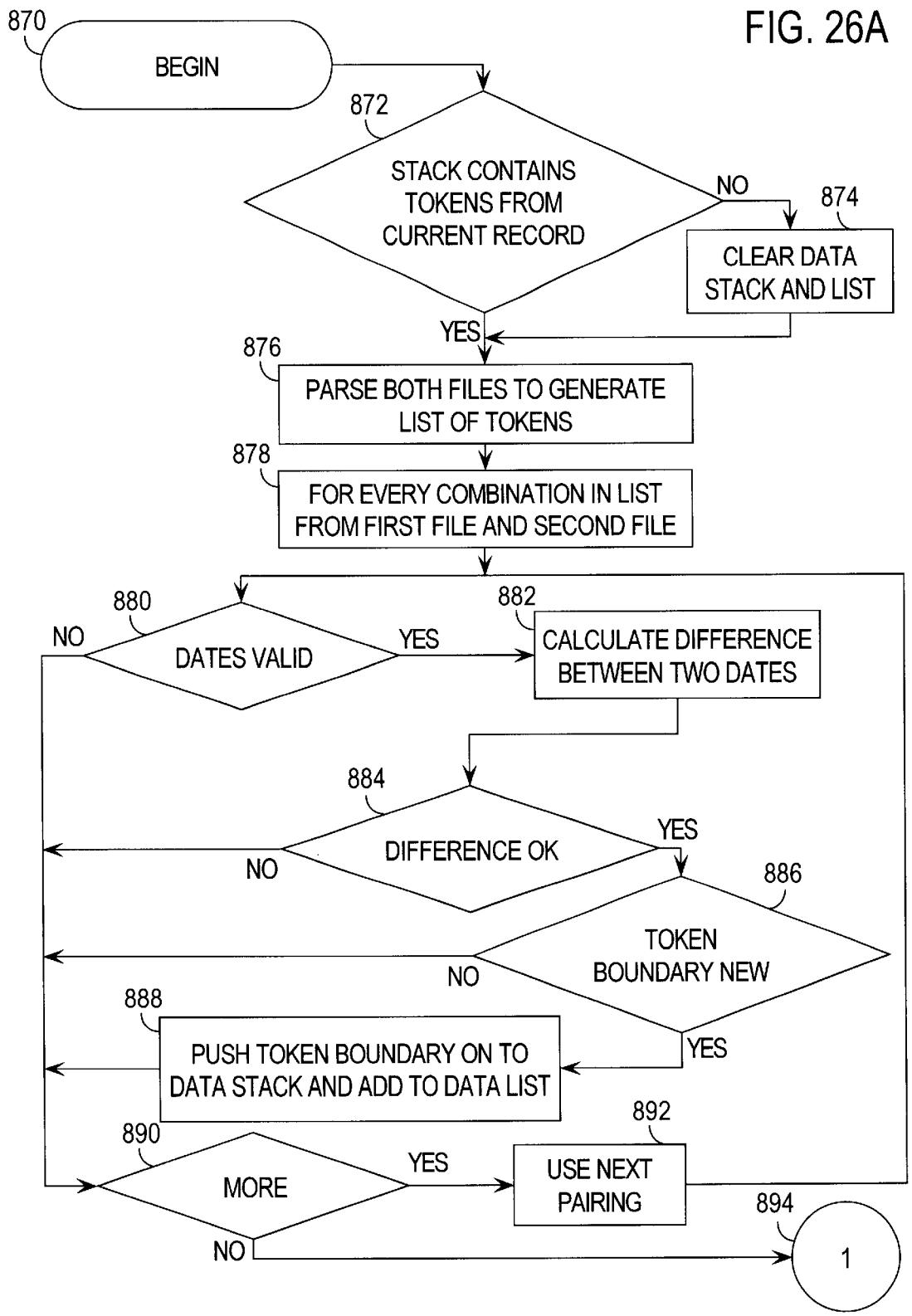
FIG. 26A illustrates an alternative group comparison or reconciliation step.

An alternative method for the parsing and group comparing step that, as stated above, is performed at step 120 (FIG. 5) is illustrated in FIG. 26A. The method is to use a data stack to allow easier backtracking if the program picks a wrong alternative for the interpretation of a date field. The data stack is augmented with a data list to prevent looping of the method. Obviously, this method may be used with files that differ in areas other than dates, but dates will be used to make the process clear. The process begins in step 870. In step 872, a check is made to see if the data stack or list contains tokens from the current record. The data stack and list are can only contain information from the current record. In step 874, the data stack and list are cleared if they do not contain information from the current record. In either case, processing continues at step 876, where both files are parsed into a list of tokens. At step 878, as what was done in the other embodiments (step 146 in FIG. 7A, step 440 in FIG. 10, step 458 in FIG. 11A, step 480 in FIG. 11B, step 510 in FIG. 11C, step 556 in FIG. 11E, step 580 in FIG. 11F, step 804 in FIG. 11G and step 828 in FIG. 11H), a loop is initialized that compares every possible combination of dates that could be possible at some predetermined location in the files. In step 880 a check is made to see if the current representation in each file is a valid format. If step 880 determines the two formats are valid then in step 882 a calculation is made to compare the two dates. This may require converting the dates into a common format, then calculating the difference between the two dates. In step 884, the results of the comparison of the two dates is checked. If the user indicated that dates were to differ by a specific amount, then that amount is checked for, otherwise they should match exactly. If they do match, then in step 886, a check is made to see that no previously identified pair of tokens exist in the list of possible dates to check at the same locations relative to the start of their records. The token boundaries, or more specifically, the position of the end of the token (when scanning forward, the token beginning when scanning backwards), is the single piece of important data from the tokens. If they are new to the list, then in step 888, the token boundary information is added to the data list and pushed on the data stack.

Under any condition, processing continues at step 890, where it is determined if there are any more token pairs possible in the loop begun in step 878. If there are more pairs, then in step 892, the next possible combination is selected in step 892 and processing continues as described above in step 880.

Figure 26B:
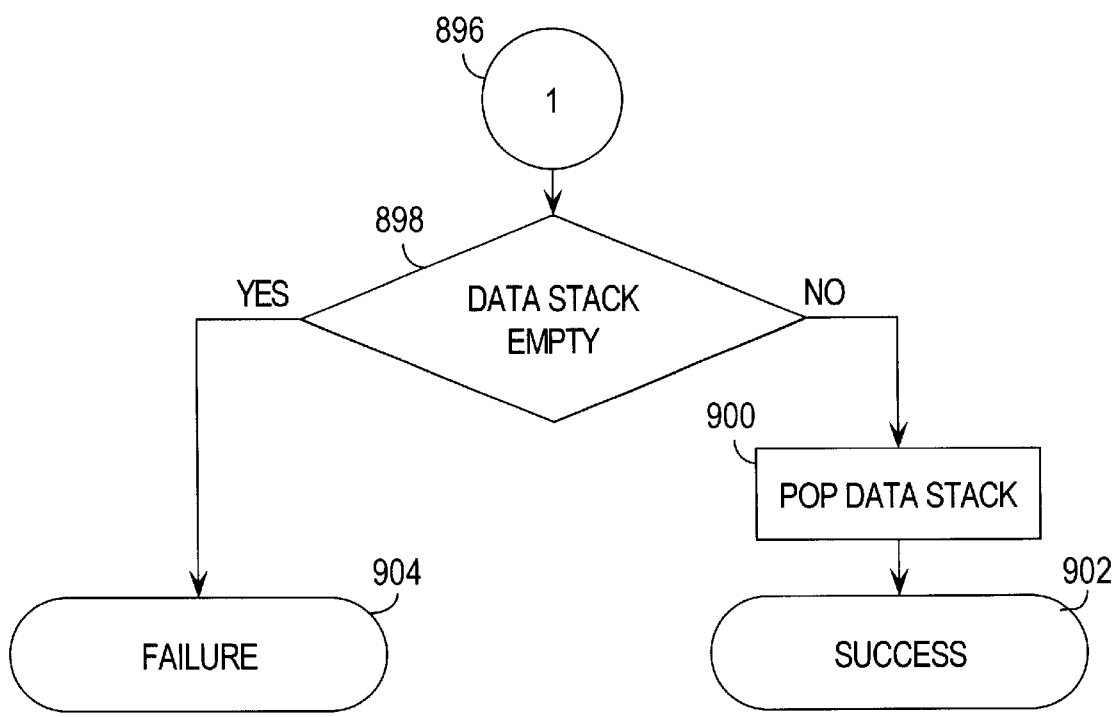
FIG. 26B illustrates the alternative group comparison or reconciliation step and is a continuation of FIG. 26A.

When there are no more combinations in step 890, then processing continues at step 898 (FIG. 26B) as indicated by the off page connector 894 ("1") and an off page connector 896 in FIG. 26B. In step 898, it is determined if the data stack has any elements remaining in it. If so, then in step 900, the data stack is poped updating the current file locations in each record. At step 902, control is returned to step 120 (FIG. 5) that called the reconciliation process and continues as described above with respect to FIG. 5. If step 898 determined that the data stack is empty, control is returned to step 120 (FIG. 5) that called the reconciliation process and continues as described above with respect to FIG. 5.

Figure 7A:
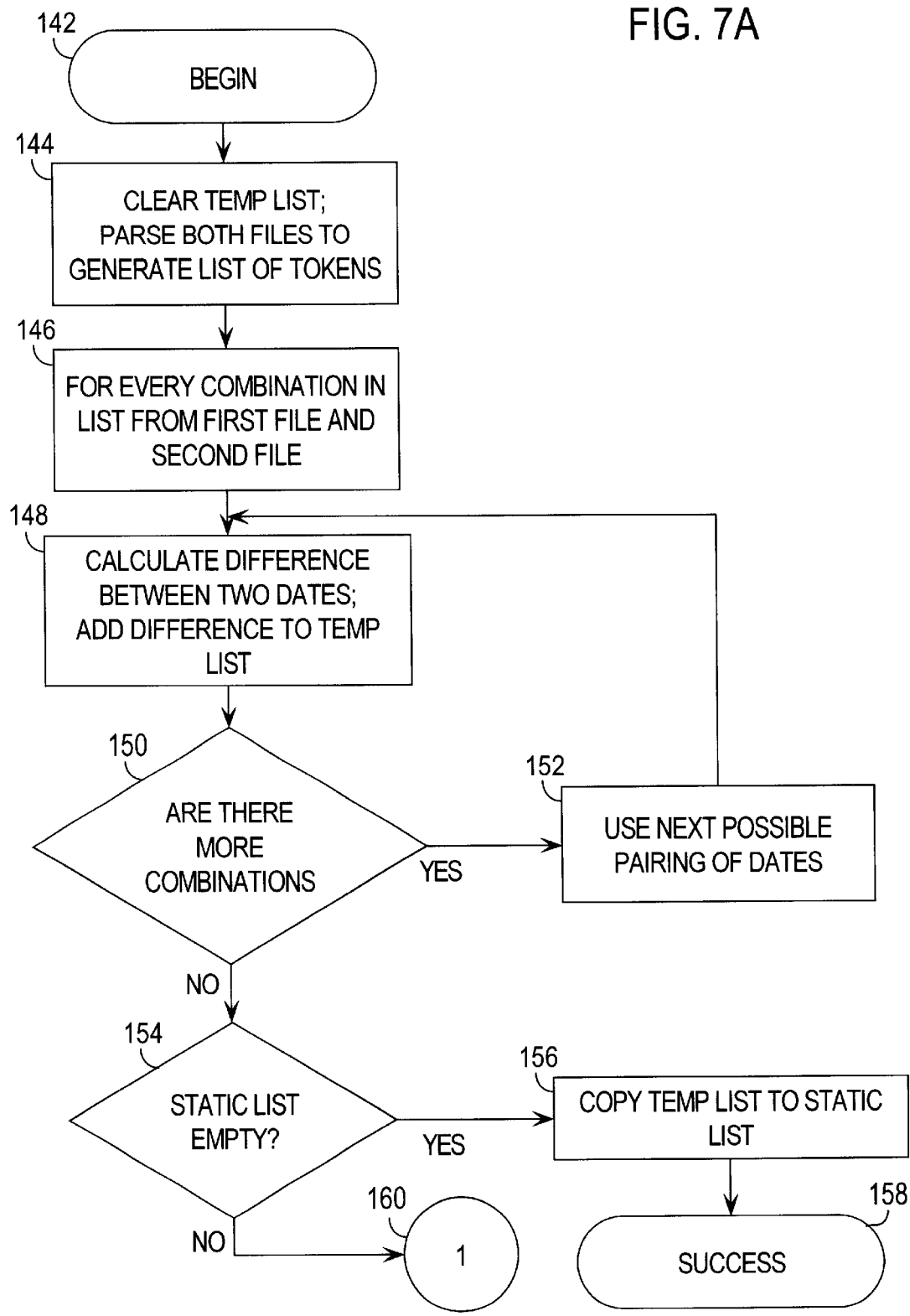
FIG. 7A illustrates the step of comparing data items read from the files.
Figure 7B:
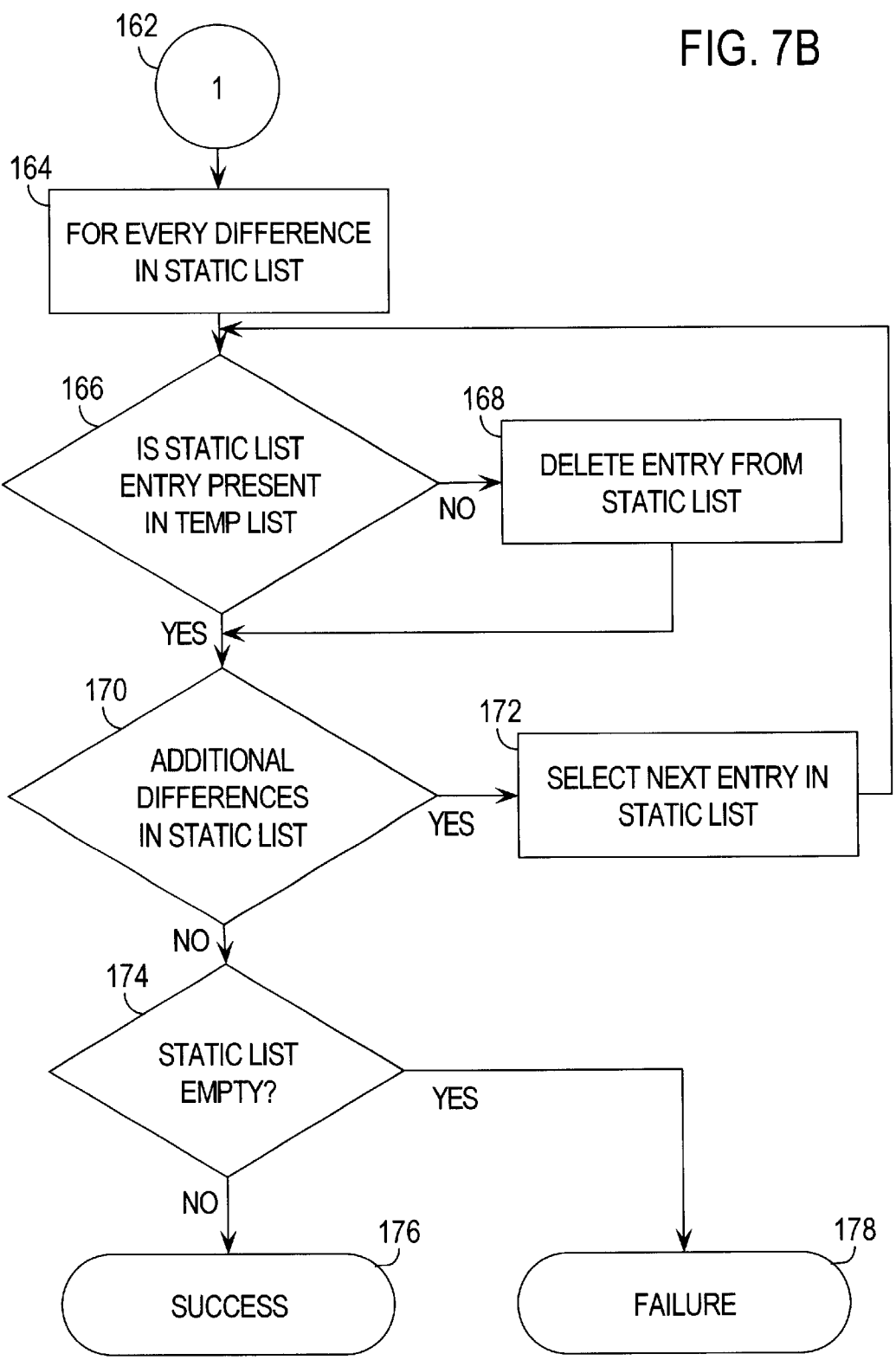
FIG. 7B illustrates the step of comparing data items read from the files and is a continuation of FIG. 7A.

An alternative method for the parsing and group comparing step that, as stated above, is performed at step 120 (FIG. 5) is illustrated in FIG. 7A. This method may be used in embodiments in which no predetermined expected difference is provided. In other words, it may be used if the user does not know the amount by which dates in the two files are expected to differ. The method is to exhaustively consider all possibilities or candidates and eliminate those that do not occur more than once. The method is appropriate for only for files where it is known that the format of the dates is has not been changed between the two files or that the files have sufficient delimiters such as would occur in a report file.

Processing begins at step 142 in FIG. 7A. At step 144, a temporary list, "temp list" is cleared. Also at step 144, both files are parsed to generate a list of date tokens.

At step 146, a loop is initiated that combines every possible date from the first file with every possible date from the second file. At step 148, for each pairing of dates the difference is calculated between the two dates and the result added to temp list. At step 150, it is determined if there are more combinations to be looked at for the loop that began at step 146. If there are more combinations, at step 152, the next pair of dates is selected for use in the next iteration of the loop. Processing then continues at step 148 for another time through the loop.

When it is determined at step 150 that all possible combinations have been generated in the loop, the static list is checked to see if it is empty at step 154. The only reason the static list would be empty is that it had not yet been used in the program, therefore this is a way to determine if this is the first pass through this portion of the code. If the list is empty, then at step 156, the temp list is copied to the static list to initialize it. At step 158, control is returned to step 120 (FIG. 5) that called the reconciliation process and continues as described above with regard to FIG. 5. If at step 154, it is determined that the static list is not empty, then processing continues at step 164 (FIG. 7B) as indicated by the connection ("1") and the off-page connector 160 and a off-page connector 162 in FIG. 7B.

Another loop is initiated in step 164 which increments through every entry in the static list. In this loop, at step 166, it is determined if the entry in the static list is present in the temp list. If it is determined that an entry in the static list is not present in the temp list, then it is deleted from the static list at step 168. Either way, at step 170, it is checked if all elements in the static list have been checked. If there are additional elements in the static list, then at step 172, the next entry in the static list is selected for the next iteration through the list and control passes to step 166.

When it is determined that all entries in the static list have been processed at step 170, control is passed to step 174. At step 174, the static list is checked to see if it is empty. If it is empty, then control passes to step 178. At step 178, control is returned to step 120 (FIG. 5) that called the reconciliation process and continues as described above with regard to FIG. 5. If is not empty, then control passes to step 176. At step 176, control is returned to step 120 (FIG. 5) that called the reconciliation process and continues as described above with regard to FIG. 5.

Figure 25:
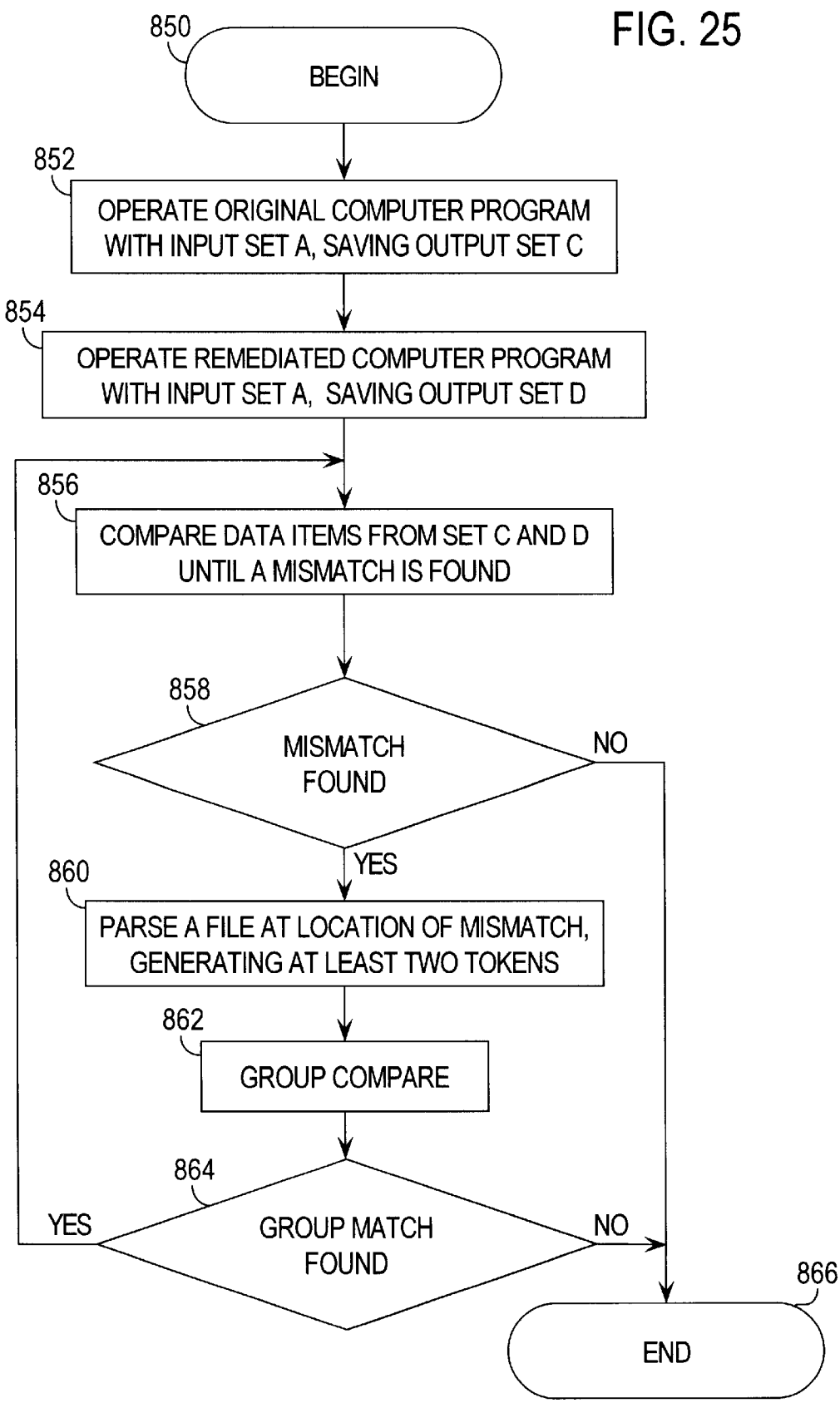
FIG. 25 illustrates a method for comparing two files to verify functionality of a program has been retained after program modification.

FIG. 25 shows how the process shown in FIG. 5 is used to accomplish regression testing. Regression testing is the process of verifying that a program has not lost any of its pre-existing functionality through the remediation process. The process begins in step 850. In step 852, a computer program is used to process data which has been prepared for this test. The data may consist of production data, or it may consist of data extracted and altered from production data, or it may be data that was created expressly for the purpose of testing. It is desirable to have a significant variety of data to thoroughly exercise the program being tested. Steps 852 and 854 refer to an input set which means data files used for input, keystrokes recorded by a capture-replay program or on paper and the system date or run date controlled through other means (such as simulation or manually input system date over ride). The output set consists of data files, captured screen images and other program output, such as electronic pulses over a modem.

In step 854, a second output set is created by running the remediated computer program against the same input set to product output set D. As mentioned above, an input set consists of both data and the system date. The system date is aged by the same amount as the file data and keystrokes.

In step 856, a process begins which largely parallels FIG. 5. Data from the two files is read, compared until a mismatch is found, as in steps 110 and 112 (FIG. 5). In step 858, a test is made to see if a mismatch was found in step 856, as in step 114 (FIG. 5). If not, processing concludes at step 866 as a success. At step 860, the first file is parsed at location of mismatch to generate at least two tokens, as in step 116 (FIG. 5). At step 862, the various group compare tests are run, such as those performed in response to step 118 (FIG. 5). In step 864, it is checked if a group match was found, as in step 112 (FIG. 5). If a match was not found, the process fails at step 866. If a match was found, the next bytes are read at step 856.

Figure 19:
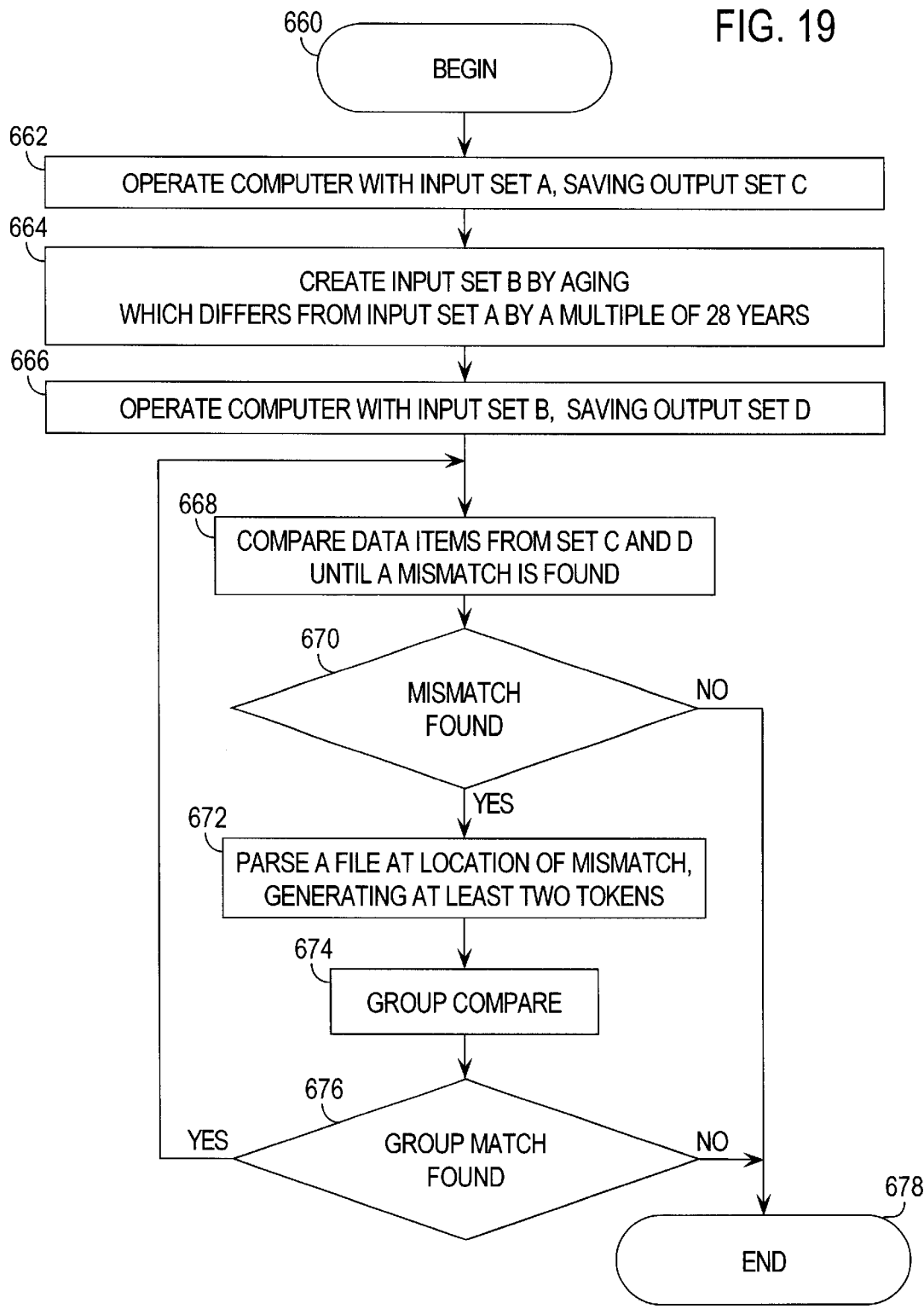
FIG. 19 illustrates a method for comparing two files to evaluate Year 2000 remediation efforts.

FIG. 19 shows how the process shown in FIG. 5 is used to accomplish Year 2000 testing. Year 2000 testing is the process of verifying that a program which functions in the current century will function the same when data spans two centuries. The process begins in step 660. In step 662, a computer program is used to process data which has been prepared for this test. The data may consist of production data, or it may consist of data extracted and altered from production data, or it may be data that was created expressly for the purpose of testing. It is desirable to have a significant variety of data to thoroughly exercise the program being tested. Steps 662 and 666 refer to an input set which means data files used for input, keystrokes recorded by a capture-replay program or on paper and the system date or run date controlled through other means (such as simulation or manually input system date over ride). The output set consists of data files, captured screen images and other program output, such as electronic pulses over a modem. The data for the input set may have been created from production data through a process of aging. Step 662 generates output set C.

In step 664, a second input data set is created from the first, by aging the data a multiple of 28 years. By aging a multiple of 28 years, the exact relationship between day of week, day of month and month of year is maintained. The result is two sets of input files should be indistinguishable by the program, except for the 28 year difference. There should be no difference between the data caused by such problems as the day of week not matching. The data may be created by directly aging input set A by a multiple of 28 years. Alternatively, if input set A was created by aging some other data, input set B may be created by aging the original set by the same amount it was to create input set A plus a multiple of 28 years.

In step 666, a second output set is created by running the remediated computer program against input set B to product output set D. As mentioned above, an input set consists of both data and the system date. The system date is aged by the same amount as the file data and keystrokes.

In step 668, a process begins which largely parallels FIG. 5. Data from the two files is read, compared until a mismatch is found, as in steps 110 and 112 (FIG. 5). In step 670, a test is made to see if a mismatch was found in step 668, as in step 114 (FIG. 5). If not, processing concludes at step 678 as a success. At step 672, the first file is parsed at location of mismatch to generate at least two tokens, as in step 116 (FIG. 5). At step 674, the various group compare tests are run, such as those performed in response to step 118 (FIG. 5). In step 676, it is checked if a group match was found, as in step 112 (FIG. 5). If a match was not found, the process fails at step 678. If a match was found, the next bytes are read at step 668.

Other embodiments and modifications of the present invention will occur readily to those of ordinary skill in the art in view of these teachings. Thus, for example, although certain methods are described herein as relating to alternative embodiments, it should be noted that the various alternatives can be included in a single computer program by providing suitable software switches selectable by a user of the program. For example, a user can select whether the program receives a predetermined expected difference or computes a difference from among multiple possible differences. Similarly, a user can select whether the program considers or does not consider certain date or monetary formats. Therefore, this invention is to be limited only by the following claims, which include all such other embodiments and modifications when viewed in conjunction with the above specification and accompanying drawings.

What is claimed is:

1. A method performed on a programmed computer for comparing a first data file and a second data file, comprising the steps of:

reading data items from said first data file in a predetermined sequence;

reading data items from said second data file in said predetermined sequence simultaneously with the step of reading data items from said first data file;

comparing data items in said first data file to data items in said second data file to determine whether mismatches exist between data items of the first and second data files;

parsing a first group of data items in said first data file located in predetermined relation to an each single location of mismatch a plurality of times to generate a first list of a plurality of tokens, each token in said first list representing a quantity corresponding to said first group of data items; and performing a group comparison by making continuous forward progress in the quantity of data compared which includes a token generated from said first group of data items and data from a second group of data items located in predetermined relation to the each single location of mismatch to find matching data in one of the first and second groups.

2. The method recited in claim 1, wherein said first and second groups of data items are in said first data file.

3. The method recited in claim 1, wherein said first and second groups of data items are in said second data file.

4. The method recited in claim 1, wherein each time said first group of data items is parsed in response to a format selected from a rules based system and different from said format selected each other time said first group of data items is parsed.

5. The method recited in claim 1, wherein said quantities are units of time, and a difference represents a temporal difference between said units of time of a desired accuracy.

6. The method recited in claim 1, wherein said quantities are monetary amounts, and a difference represents an exchange conversion between two currencies.

7. The method recited in claim 1, wherein said second group of data items is located on a line of said second data file correspondingly adjacent to a line of said first data file in which said first group of data items is located.

8. The method recited in claim 1, wherein said second group of data items comprises a location of a next point of mismatch after a current token.

9. The method recited in claim 1, wherein said step of performing a group comparison comprises the steps of:

determining a test group of data items in response to each successive token; and comparing said test group of data items to said second group of data items.

10. The method recited in claim 9, wherein:
said test group of data items corresponds to a quantity differing from said quantity represented by said successive token by a predetermined amount, whereby said group comparison identifies whether said quantity corresponding to said first group of data items and said quantity corresponding to a second group of data items differ by said predetermined amount.

11. The method recited in claim 10, wherein for a pairing of said first group of data items differing from said second group of data items by said predetermined amount, said step of performing a group comparison further consists of:
identifying a token boundary of said first group's data item within said first data file;
storing said token boundary of said first group's data item within said first data file; and
sorting said token boundary of said second group's data item within said second data file.

12. The method as claimed in 11, wherein:
said storage of token boundaries is cleared when a new record is encountered within said first data file.

13. The method recited in claim 1, wherein said step of performing a group comparison comprises the steps of:
parsing a second group of data items in predetermined relation to the each single location of mismatch a plurality of times to generate a second list of a corresponding plurality of tokens, each time said group of data items is parsed in response to a format selected from a rules based system and different from said format selected each other time said second group of data items is parsed, each token in said second list representing a quantity corresponding to said second group of data items; and
successively comparing unique combinations of a token of said first list and a token of said second list to produce a set of candidate quantifiable differences.

14. The method recited in claim 13 wherein said second group of data items is in said second data file.

15. The method recited in claim 13, further comprising the step of:
continuing to sequentially compare data items in said first data file to data items in said second data file to determine if a mismatch exists at another single location, and in response to a mismatch at each said another single location performing said steps of parsing a first group of data items in said first data file to generate a first list of a plurality of tokens, parsing a second group of data items in said second data file, and successively comparing unique combinations of a token of said first list and a token of said second list;
wherein said step of performing a comparison further comprises the step of identifying each candidate quantifiable difference that is produced in response to every mismatch.

16. The method recited in claim 15, wherein said quantities represented by tokens corresponding to said data items are units of time, and each candidate quantifiable difference represents a temporal difference between two units of time.

17. The method recited in claim 16, wherein said step of identifying each candidate quantifiable difference that is produced in response to more than one mismatch comprises the steps of:
storing said set of candidate quantifiable differences in a temporary list; and
updating a static list if a mismatch is found at another location by removing from said static list all quantifiable differences not present in said temporary list.

18. The method recited in claim 1, wherein:
said quantities represented by tokens corresponding to said data items are units of time; and
said step of comparing data items in said first data file to data items in said second data file in said predetermined sequence comprises the step of skipping comparing each byte that represents a character selected from the group consisting of tab character and space character.

19. The method recited in claim 1, wherein:
said quantities represented by tokens corresponding to said data items are monetary amounts; and
said step of comparing data items in said first data file to data in said second data file in said predetermined sequence comprises the step of skipping comparing each byte that does not represent a character selected from the group consisting of currency symbols, numeric characters and separator characters.

20. The method recited in claim 1, wherein said step of performing a group comparison comprises the steps of:
processing test data items in a direction toward an end of a file, and
processing said test data items in a direction toward a beginning of said file.

21. The method recited in claim 20, wherein
said step of processing data items in a direction toward the end of the file begins at a beginning of a record, and
said step of processing data items in a direction toward the beginning of the file begins at a end of a record.

22. The method recited in claim 21, wherein said record at which said processing begins in a direction toward the end of the file is said record at which processing begins in a direction toward the beginning of the file.

23. The method recited in claim 21, wherein said step of processing comprises the steps of:
comparing data items, one at a time, in one of said directions in said first data file to data items in said second data file until a mismatch exists between data items at a single location of a plurality of locations;
parsing a first group of data items in said first data file located in predetermined relation to each single location of the plurality of locations of mismatch a plurality of times to generate a first list of a plurality of tokens, each token in said first list representing a quantity corresponding to said first group of data items; and
performing a group comparison by making continuous forward progress in the quantity of data compared which includes a token from said first group of data items and data from a second group of data items located in predetermined relation to each single location of mismatch to find matching data in one of the first and second groups, said comparison performed in response to successive tokens in said first list.

24. The method as recited in claim 20, wherein said records are matched by overlap of said test data items processed in said direction toward the end of said file and said test data items processed in said direction toward the beginning of said file.

25. A method performed on a programmed computer for determining whether two computer programs process data equivalently, comprising the steps of:
operating a first computer program on a computer in response to a first input data set to produce a first output data set;
altering said first input data set by a predetermined quantity to produce a second input data set;

operating a second computer program on the computer in response to said second input data set to produce a second output data set;

comparing data items in said first output data set to data items in said second output data set in a predetermined sequence to determine if at least one mismatch exists between data items of the first and second output data sets, said first output data set accessed by said programmed computer simultaneously with said second output data set;

parsing a first group of data items at each location of mismatch of the at least one mismatch to produce a plurality of tokens, said tokens representing quantities corresponding to said first group of data items; and performing a group comparison process by making continuous forward progress in a quantity of data which includes a token from said first group of data items and data from a second group of data items located in predetermined relation to the each location of mismatch to find matching data in one of the first and second groups, said comparison performed in response to successive tokens corresponding to said first group.

26. The method recited in claim 25, wherein said plurality of tokens represent units of time.

27. The method recited in claim 26, wherein said step of altering of said first input data set by a predetermined quantity comprises the step of aging said input data set by said predetermined quantity.

28. A method performed on a programmed computer for determining whether a remediated computer program and an original computer program are functionally equivalent, comprising the steps of:

operating said original computer program in response to a first input data file to produce a first output data file;

operating said remediated computer program in response to said first input data file to produce a second output data file, said second output data file having a percentage of structural elements identical to structural elements of said first output file;

comparing data items in said first output data file to data items in said second output data file in said predetermined sequence to determine if mismatches exist between data items in said first and second output data files, said programmed computer simultaneously accessing said first and second output data files;

parsing data items at each single location of mismatch in said first output data file into a first plurality of tokens and data items at the each single location of mismatch in said second output data file into a second plurality of tokens, said first and second plurality of tokens representing units of time corresponding to said data items; and determining a difference between a unit of time represented by a token of the first plurality of tokens to a unit of time represented by a token of the second plurality of tokens.

29. A method performed on a programmed computer for determining whether a remediated computer program and an original computer program are functionally equivalent, comprising the steps of:

operating said original computer program on a computer having a system date set to a first date, said computer program operating in response to a first input data file to produce a first output data file;

aging said first input data file by a quantity representing a predetermined amount of time to produce a second input data file;

changing said system date of said computer by said predetermined amount of time;

operating said remediated computer program on a computer having a system date set to a second date differing from said first date by said predetermined amount of time, said computer program operating in response to said second input data file to produce a second output data file;

comparing data items in said first output data file to data items in said second output data file in a predetermined sequence to determine if a mismatch exists between data items at a location in a file;

parsing data items at a location of mismatch in said first file into a plurality of tokens and data items at a location of mismatch in said second file into a plurality of tokens, said tokens representing dates corresponding to said data items; and determining a difference between a date represented by a token into which data items in said first file at a location of mismatch have been parsed to a date represented by a token into which data items in said second file at a location of mismatch have been parsed.

30. A computer program product for use in a computer system, said computer program product comprising a computer-readable data storage medium carrying thereon:

a file reader for reading data items from a first data file in a predetermined sequence and for reading data items from a second data file in said predetermined sequence, said first data file simultaneously accessed with said second data file, said second data file having a percentage structural elements identical to structural elements of the first data file;

a file comparer for comparing data items in said first data file to data items in said second data file to determine whether mismatches exist between data items of said first and second data files;

a parser for parsing a first group of data items in said first data file located in predetermined relation to an each single location of mismatch a plurality of times to generate a first list of a plurality of tokens, each token in said first list representing a quantity corresponding to said first group of data items; and a group comparer for performing a comparison which includes a token corresponding to said first group of data items and data from a second group of data items located in predetermined relation to the each single location of mismatch to find matching data, said comparison performed in response to successive tokens in said first list.

31. The computer program product recited in claim 30, wherein said first and second groups of data items are in said first data file.

32. The computer program product recited in claim 30, wherein said first and second groups of data items are in said second data file.

33. The computer program product recited in claim 30, wherein said parser each time parses said first group of data items in response to a format selected from a rules based system and different from said format selected each other time said parser parses said first group of data items.

34. The computer program product recited in claim 30, wherein said quantities are units of time, and said difference represents a temporal difference between two units of time of a desired accuracy.

35. The computer program product recited in claim 30, wherein said quantities are monetary amounts, and said difference represents an exchange conversion between two currencies.

36. The computer program product recited in claim 30, wherein said second group of data items is located on a line of said second data file correspondingly adjacent to a line of said first data file in which said first group of data items is located.

37. The computer program product recited in claim 30, wherein said second group of data items is located on a line of said first data file adjacent to a line of said first data file in which said first group of data items is located.

38. The computer program product recited in claim 30, wherein said group comparer determines a test group of data items in response to each successive token and compares said test group of data items to said second group of data items.

39. The computer program product recited in claim 38, wherein:

said test group of data items corresponds to a quantity differing from said quantity represented by said successive token by a predetermined amount;

whereby said comparison identifies whether said quantity corresponding to said first group of data items and said quantity corresponding to a second group of data items differ by said predetermined amount.

40. The computer program product recited in claim 30, wherein:

said group comparer parses a second group of data items in predetermined relation to the each single location of mismatch a plurality of times to generate a second list of a corresponding plurality of tokens, each time said group of data items is parsed in response to a format selected from a rules based system and different from said format selected each other time said second group of data items is parsed, each token in said second list representing a quantity corresponding to said second group of data items; and said group comparer successively compares unique combinations of a token of said first list and a token of said second list to produce a set of candidate quantifiable differences.

41. The computer program product recited in claim 40, wherein said second group of data items is in said first data file at a location other than the single location of mismatch.

42. The computer program product recited in claim 40, wherein said second group of data items is in said second data file.

43. The computer program product recited in claim 40, wherein:

said file comparer continues to sequentially compare data items in said first data file to data items in said second data file to determine if a mismatch exists at another location, and in response to a mismatch at each said another location said parser parses a first group of data items in said first data file and parses a second group of data items in said second data file, and said group comparer successively compares unique combinations of a token of said first list and a token of said second list; and said group comparer identifies each candidate quantifiable difference that is produced in response to every mismatch.

44. The computer program product recited in claim 43, wherein said quantities represented by tokens corresponding to said data items are units of time, and each candidate quantifiable difference represents a temporal difference between two units of time of a desired accuracy.

45. The computer program product recited in claim 44, wherein said group comparer stores said set of candidate quantifiable differences in a temporary list and updates a static list if a mismatch is found at another location by removing from said static list all quantifiable differences not present in said temporary list.

46. The computer program product recited in claim 30, wherein:

said quantities represented by tokens corresponding to said data items are units of time; and said file comparer skips comparing each byte that represents a character selected from the group consisting of tab character and space character.

47. The computer program product recited in claim 30, wherein:

said quantities represented by tokens corresponding to said data items are monetary amounts; and said file comparer skips comparing each byte that does not represent a character selected from the group consisting of currency symbols, numeric characters and separator characters.

48. The computer program product recited in claim 30, wherein:

said group comparer processes test data items in a direction toward an end of a file and processes said test data items in a direction toward a beginning of the file.

49. The computer program product recited in claim 48, wherein said group comparer processes data items in a direction toward the end of the file beginning at a beginning of a record; and said group comparer processes data items in a direction toward the beginning of the file beginning at an end of a record.

50. The computer program product recited in claim 49, wherein said record at which said processing begins in a direction toward the end of the file is said record at which processing ends in a direction toward the beginning of the file.

51. The computer program product recited in claim 49, wherein:

said group comparer compares data items, one at a time, in one of said directions in said first data file to data items in said second data file until a mismatch exists between data items;

said group comparer parses a first group of data items in said first data file located in predetermined relation to the each single location of mismatch a plurality of times to generate a first list of a plurality of tokens, each token in said first list representing a quantity corresponding to said first group of data items; and said group comparer performs a comparison including a token corresponding to said first group of data items and data corresponding to a second group of data items located in predetermined relation to the each single location of mismatch to find matching data, said comparison performed in response to successive tokens in said first list.

52. A computer program product for use in a computer system, said computer program product comprising a computer-readable data storage medium carrying thereon:

file reader means for reading data items from a first data file in a predetermined sequence and for reading data items from a second data file in said predetermined sequence, wherein said first and second data files are accessed simultaneously, and wherein said second data file has no more than two percent of its structural elements identical to said first data file;

file comparer means for comparing data items in said first data file to data items in said second data file in said predetermined sequence to determine if at least one mismatch exists between data items of said first and second data files;

parser means for parsing a first group of data items in said first data file located in predetermined relation to each single location of mismatch of the at least one mismatch a plurality of times to generate a first list of a plurality of tokens, each token in said first list representing a quantity corresponding to said first group of data items; and group comparer means for performing a comparison including a token from said first group of data items and data from a second group of data items located in predetermined relation to the each single location of mismatch to find matching data in one of the first and second groups, said comparison performed in response to successive tokens in said first list.

53. A method performed on a programmed computer for determining whether a remediated computer program and an original computer program are functionally equivalent, comprising the steps of:

operating said original computer program on a computer having a system date set to a first date, said computer program operating in response to a first input data file to produce a first output data file;

aging said first input data file by a quantity representing a predetermined amount of time to produce a second input data file;

changing said system date of said computer by said predetermined amount of time;

operating said remediated computer program on a computer having a system date set to a second date differing from said first date by said predetermined amount of time, said computer program operating in response to said second input data file to produce a second output data file;

comparing data items in said first output data file to data items in said second output data file in a predetermined sequence to determine if a mismatch exists between data items at a single location;

parsing data items at the single location of mismatch in said first output data file into a first plurality of tokens and data items at the single location of mismatch in said second output data file into a second plurality of tokens, said first and second plurality of tokens representing units of time corresponding to said data items; and determining a difference between a date represented by a token into which data items in said first file at a single location of mismatch have been parsed to a date represented by a token into which data items in said second file at a single location of mismatch have been parsed.

54. A method performed on a programmed computer for comparing a first and second data file to find matching data, comprising the steps of:

reading data items from the first data file in a predetermined sequence;

reading data items from the second data file in said predetermined sequence;

comparing data items in said first data file to data items in said second data file to determine if at least one mismatch exists between data items of the first and second data files;

parsing a first group of data items in said first data file located in predetermined relation to a location of mismatch a plurality of times to generate a first list of a plurality of tokens, each token in said first list representing an exchange conversion between monetary amounts corresponding to said first group of data items; and performing a group comparison by making continuous forward progress in the quantity of data compared which includes a token from said first group of data items and data from a second group of data items located in predetermined relation to the location of mismatch to find the matching data, said comparison performed in response to successive tokens in said first list.

55. The method recited in claim 54, wherein:

said step of comparing data items in said first data file to data in said second data file in said predetermined sequence comprises the step of skipping comparing each byte that does not represent a character selected from the group consisting of currency symbols, numeric characters and separator characters.

56. A method performed on a programmed computer for comparing a first and second data file to find matching data, comprising the steps of:

reading data items from the first data file in a predetermined sequence;

reading data items from the second data file in said predetermined sequence;

comparing data items in the first data file to data items in the second data file to determine if at least one mismatch exists between data items;

parsing a first group of data items in said first data file located in predetermined relation to a location of mismatch a plurality of times to generate a first list of a plurality of tokens, each token in said first list representing a quantity corresponding to said first group of data items; and performing a group comparison comprising the steps of:
    determining a test group of data items in response to each successive token of a plurality of successive tokens in said first list; and
    comparing said test group of data items to a second group of data items located in predetermined relation to the location of mismatch to find the matching data;
    wherein said test group of data items corresponds to a quantity differing from said quantity represented by said each successive token by a predetermined amount, whereby said group comparison identifies whether said quantity corresponding to said first group of data items and said quantity corresponding to the second group of data items differ by said predetermined amount.

57. The method recited in claim 56, wherein for a pairing of said first group of data items differing from said second group of data items by said predetermined amount, said step of performing a group comparison further consists of:

identifying a token boundary of said first group's data item within said first data file;

storing said token boundary of said first group's data item within said first data file; and sorting said token boundary of said second group's data item within said second data file.

58. A method performed on a programmed computer for comparing a first and second data file to find matching data, comprising the steps of:

reading data items from the first data file in a predetermined sequence;

reading data items from the second data file in said predetermined sequence;

comparing data items in the first data file to data items in the second data file to determine if mismatches exists between data items of the first and second data files, wherein a byte of data of the data items that corresponds to a character selected from a group consisting of tab character and space character are skipped;

parsing a first group of data items in the first data file located in predetermined relation to a location of mismatch a plurality of times to generate a first list of a plurality of tokens, each token in said first list representing a unit of time corresponding to said first group of data items; and performing a group comparison by making continuous forward progress in the quantity of data compared which includes a token from said first group of data items and data from a second group of data items located in predetermined relation to the location of mismatch to find matching data in one of the first and second groups, said comparison performed in response to successive tokens in said first list.

59. A method performed on a programmed computer for comparing a first data file and a second data file, comprising the steps of:

reading data items simultaneously from said first data file and said second data file in a predetermined sequence;

comparing data items in said first data file to data items in said second data file to determine whether at least one correspondence exists between data items of the first and second data files;

parsing a first group of data items in said first data file located in predetermined relation to an each single location of the at least one correspondence a plurality of times to generate a first list of a plurality of tokens, each token in said first list representing a quantity; and performing a group comparison by making continuous forward progress in the quantity of data compared which includes a token generated from said first group of data items and data from a second group of data items located in predetermined relation to the each single location of correspondence to find matching data in one of the first and second groups, said comparison performed in response to successive tokens in said first list.

60. A method performed on a programmed computer as in claim 59, wherein the at least one correspondence is at least one match.

61. A method performed on a programmed computer as in claim 59, wherein the at least one correspondence is at least one mismatch.

\* \* \* \* \*